US009489932B2

(12) United States Patent
Morell et al.

(10) Patent No.: US 9,489,932 B2
(45) Date of Patent: *Nov. 8, 2016

(54) SYSTEMS AND METHODS FOR CREATING CUSTOMIZED MUSIC ARRANGEMENTS

(71) Applicant: NiceChart LLC, San Diego, CA (US)

(72) Inventors: Steve Morell, San Diego, CA (US); Tammy Morell, San Diego, CA (US)

(73) Assignee: NiceChart, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,296

(22) Filed: Dec. 1, 2015

(65) Prior Publication Data

US 2016/0133242 A1 May 12, 2016

Related U.S. Application Data

(63) Continuation of application No. 14/469,783, filed on Aug. 27, 2014, now Pat. No. 9,202,448.

(60) Provisional application No. 61/870,777, filed on Aug. 27, 2013.

(51) Int. Cl.
*G10H 7/00* (2006.01)
*H02M 5/00* (2006.01)
*G10H 1/00* (2006.01)

(52) U.S. Cl.
CPC ....... *G10H 1/0025* (2013.01); *G10H 2210/111* (2013.01); *G10H 2240/131* (2013.01)

(58) Field of Classification Search
CPC ......... G10H 1/0025; G10H 2210/111; G10H 2240/131
USPC .................................................... 84/619, 657
See application file for complete search history.

(56) References Cited

U.S. PATENT DOCUMENTS 5,533,903 A 7/1996 Kennedy
5,590,282 A * 12/1996 Clynes ................ G10H 1/0041 725/115
6,175,070 B1 1/2001 Naples et al.
6,211,451 B1 4/2001 Tohgi et al.
6,287,124 B1 9/2001 Yamaura et al.
6,348,648 B1 * 2/2002 Connick, Jr. ........ G09B 15/023 84/477 R
6,635,815 B2 * 10/2003 Kosakaya ................ G10G 1/00 84/471 R
6,897,367 B2 5/2005 Leach
7,199,298 B2 4/2007 Funaki
(Continued)

*Primary Examiner* — Jeffrey Donels
(74) *Attorney, Agent, or Firm* — The Salerno Law Firm, P.C.

(57) ABSTRACT

Systems and methods for creating customized music arrangements based on multiple criteria are provided herein. A user selects a musical composition and provides ensemble information about an ensemble, such as the number of instruments, instrument types, and playing ability of each member of an ensemble to the system. When inputted instrumentation or proficiency does not work within the pre-determined parameters of the musical selection, notification is provided to the user, and the system rebalances the arrangement to accommodate the proficiencies of the ensemble. In embodiments, the system is configured to transpose portions of a musical score into a range suitable for a substitute instrument or a player of limited skill. The user receives a conductor's score arrangement that has been adapted for each member of the ensemble and tailored to balance the entire ensemble. The system is capable of receiving ensemble information and creating customized musical arrangements in real-time.

20 Claims, 95 Drawing Sheets

(56) References Cited

U.S. PATENT DOCUMENTS 7,435,891 B2 10/2008 Perla
7,977,560 B2 7/2011 Marcus
7,985,912 B2 * 7/2011 Copperwhite ........... G10G 1/00 84/609
7,989,689 B2 * 8/2011 Sitrick ................. G09B 15/023 84/477 R
8,058,544 B2 11/2011 Hoeberechts et al.
8,106,281 B2 1/2012 Minamitaka
8,273,976 B1 * 9/2012 Dalby .................. G10H 1/0066 84/477 R
8,552,281 B1 * 10/2013 Cotrone ................. G09B 15/00 84/477 R
8,859,875 B2 * 10/2014 Daniels ................ G09B 15/023 84/634
9,202,448 B2 * 12/2015 Morell ................. G10H 1/0025
2002/0165921 A1 * 11/2002 Sapieyevski ......... G10H 1/0058 709/204
2003/0036046 A1 2/2003 Smolover
2003/0094093 A1 * 5/2003 Smith .................. G10H 1/0058 84/609
2005/0016368 A1 * 1/2005 Perla ...................... G09B 15/00 84/723
2006/0016323 A1 * 1/2006 Hayakawa ............... G10H 1/20 84/619
2006/0150804 A1 * 7/2006 Hiratsuka ............ G10H 1/0016 84/619
2007/0137463 A1 6/2007 Lumsden

* cited by examiner

SYSTEMS AND METHODS FOR CREATING CUSTOMIZED MUSIC ARRANGEMENTS

CROSS-REFERENCE TO RELATED APPLICATIONS

This application is a continuation of U.S. Utility application Ser. No. 14/469,783, filed Aug. 27, 2014 and entitled "SYSTEMS AND METHODS FOR CREATING CUSTOMIZED MUSIC ARRANGEMENTS" which claims the benefit of and priority to U.S. Provisional Application Ser. No. 61/870,777, filed Aug. 27, 2013 and entitled "SYSTEMS AND METHODS FOR CREATING CUSTOMIZED MUSIC ARRANGEMENTS", the entirety of each of which is hereby incorporated by reference herein for all purposes.

BACKGROUND

1Technical Field

The present disclosure relates to the arrangement of musical compositions, and more particularly, to the automated creation of customized music arrangements based upon ensemble size, instrumentation, and performer proficiency levels.

2. Background of Related Art

Musical arrangements are fixed documents written for specific instrumentations. For instance, arrangements may be written for orchestral, concert band, jazz big band, jazz combo, or chamber ensembles. Arrangements, also known as scores, are prepared based upon the assumption that the ensemble has specific instruments, and that the players are at the same playing level. Further, written arrangements can require that critical parts be played by specific instruments. Generally, the arrangement is selected and/or purchased by a musical arrangement user, such as a band director, conductor, or producer.

In practice, most ensembles do not meet the exact requirements of the arrangement. For example, the ensemble may have different types and numbers of instruments than those called for by the arrangement, and may include players having disparate proficiency levels. In cases where the ensemble lineup differs from that which is called for by the musical arrangement, the outcome will not be optimal. For instance, the melody or harmony parts might not be played by anyone, the bass part or counterpoints may be lacking, and musicians may be given parts that they are incapable of playing. In ensembles consisting of players with varying capabilities, if the user purchases a musical arrangement designed for higher proficiency level players, the inferior players' weaknesses will be highlighted. If the user purchases an arrangement designed for lower proficiency players, the better players will not be able to showcase their talents.

Consequently, musical arrangement users are typically required to manually revise scores to accommodate the instruments available and the capability of the players. Users may be required to move lead parts to strong players, and create easy parts for less capable ones. Parts for unavailable instruments may be given to other instruments, and may require rewriting to accommodate the characteristics (such as timbre and key) of the substitute instrument. This process requires a high degree of skill, can be time consuming, and may cause frustration after already having made an investment in purchasing the arrangement. In some cases, ensemble users may lack the skills to rewrite the fixed musical arrangement, therefore they are limited in their options and often end up with less than optimal results.

SUMMARY

Systems and methods are provided for creating customized musical arrangements by receiving ensemble information, assessing the ensemble information based on numerous factors and selecting customized arrangements for each member of the ensemble based on the ensemble information. The ensemble information may include a number of instruments in the ensemble, a type of each instrument in the ensemble, and a musical capability of each member of the ensemble performing the piece. The user may select a musical selection, enter the ensemble information into the system or load a previously used ensemble, and then receive a customized arrangement of the selection for each ensemble member and a conductor's score without requiring any additional arrangement or processing by the user.

Accordingly, several advantages are provided, including the ability for users to specify the number of instruments in the ensemble, the types of instruments available, and the proficiency level of each musician. Preset musical arrangement parameters are stored, which are utilized to notify the user if specific arrangements are not suitable for their specific ensemble needs. If presets are satisfied, the system will determine parts (solo, melody, tethered harmony, non-tethered harmony, bass, supplemental bass, or others) and rearrange accordingly depending on the user's ensemble specifications. Individual parts, preloaded into the system and selected through the processes, will print along with the score, providing a complete arrangement that will identify and feature strong players while providing weaker players with parts suitable to their level. These parts are not instrument-specific and instead are an example of the ideal range and shape of the part. The parts can be manipulated later to allow for key changes and instrument changes. In embodiments, systems in accordance with the present disclosure can account for small ensembles, solo parts, improvised solo parts, and beginners, as well as large bands, orchestras and highly advanced players. Embodiments may include the ability to change the priority of instrument assignment depending on the makeup of the ensemble. For example, an ensemble with many string players would be deemed "string heavy" and therefore a violin may be selected to be highlighted in the melody, rather than, for example, a trumpet.

In one aspect, embodiments of the present disclosure are directed to a method of generating a musical score for an ensemble of instruments, each instrument having an instrument characteristic and an instrument proficiency. The method includes storing, in a database, alternative arrangements of a musical score that are each suited for an ensemble having a predetermined ensemble characteristic; retrieving, from the database, one of the alternative arrangements based upon the predetermined ensemble characteristic of the ensemble of instruments; and assigning an instrument of the ensemble to a part of the retrieved arrangement in accordance with at least one of the instrument characteristic or the instrument proficiency.

In embodiments, the predetermined characteristic includes an aggregate proficiency, such as elementary school level (EL) or high school level (HS). In embodiments, the predetermined characteristic includes an ensemble size, such as a small ensemble (SL).

In embodiments, the disclosed method includes retrieving, from the database, a different one of the alternative arrangements in response to a determination that the number of available parts in the first retrieved arrangement exceeds the number of instruments in the ensemble having an instrument proficiency exceeding a predetermined proficiency threshold. In embodiments, the method includes characterizing the parts of the retrieved arrangement as one of a melody part, a harmony part, a tethered harmony part, a non-tethered harmony part, a bass part, a solo part, an improvisation part, a pitched percussion part, or a non-pitched percussion part.

In embodiments, the method includes retrieving, from the database, a second one of the alternative arrangements in response to a determination that the number of melody and tethered harmony parts in the retrieved arrangement exceeds the number of instruments in the ensemble whose instrument proficiency exceeds a predetermined proficiency threshold. In embodiments, the method includes characterizing the instruments of the ensemble as one of a non-bass or a bass instrument.

In embodiments, the method includes assigning a guitar instrument of the ensemble to a bass part of the retrieved arrangement in response to a determination that the number of bass parts in the retrieved arrangement exceeds the number of bass instruments in the ensemble.

In embodiments, the method includes characterizing the instruments of the ensemble as a melody/harmony instrument or a harmony/bass instrument and assigning one of a melody/harmony or a harmony/bass instrument of the ensemble to a bass part of the retrieved arrangement in response to a determination that the number of bass parts in the retrieved arrangement exceeds the number of bass instruments in the ensemble.

In embodiments, the method includes delivering the generated musical score to a user device. In embodiments, the delivered score may be in Portable Document Format (Adobe® PDF format), Music XML, MIDI file format, NoteFlight®, Finale®, Sibelius® and/or any other output format suitable for musical scoring now or in the future known.

In another aspect, embodiments of the present disclosure are directed to a method for performing instrument range correction in a musical part. The method includes the steps of identifying a passage within the musical part; identifying notes within the passage which fall outside a target note range; transposing, by an octave, the identified notes into the target note range in response to a determination that the identified notes are of the same pitch; and transposing, in accordance with a transposition function, the identified notes toward the target note range in response to a determination that the identified notes are not of the same pitch.

In embodiments, the transposition function includes transposing, by an octave, the passage towards the target note range in response to a determination that all identified notes fall outside the target note range. In embodiments, the transposition function includes identifying an issue within the passage characterized by one or more consecutive notes which fall outside the target range. In embodiments, the transposition function includes identifying a sub-passage consisting of the issue and a note group immediately preceding the first note of the issue; and transposing, by an octave, the sub-passage toward the target note range in response to a determination that the interval between any two consecutive notes of the note group and the first note of the issue is no greater than a whole step. In embodiments, the transposition function includes identifying a sub-passage consisting of the issue and a note group immediately following the last note of the issue; and transposing, by an octave, the sub-passage toward the target note range in response to a determination that the interval between any two consecutive notes of the note group and the last note of the issue is no greater than a whole step.

In another aspect, embodiments of the present disclosure are directed to a system for generating a musical score for an ensemble of instruments. In one embodiment, the system includes a database storing alternative arrangements of a musical score that are each suited for an ensemble having a predetermined characteristic, and a processor in operable communication with the database. The system also includes a memory in operable communication with the processor storing a set of executable instructions which, when executed by the processor, cause the processor to retrieve from the database one of the alternative arrangements based upon the predetermined characteristic of the ensemble of instruments, assign an instrument of the ensemble to a part of the retrieved arrangement in accordance with the instrument proficiency of the instrument, and transmit the generated musical score to a user device.

In embodiments, the memory further stores executable instructions which, when executed by the processor, cause the processor to retrieve, from the database, a different one of the alternative arrangements in response to a determination that the number of available parts in the first retrieved arrangement exceeds the number of instruments in the ensemble having an instrument proficiency exceeding a predetermined proficiency threshold.

In embodiments, the memory further stores executable instructions which, when executed by the processor, cause the processor to characterize the parts of the retrieved arrangement as one of a melody part, a harmony part, a tethered harmony part, a bass part, or a solo part; and retrieve, from the database, a second one of the alternative arrangements in response to a determination that the number of melody and tethered harmony parts in the retrieved arrangement exceeds the number of instruments in the ensemble whose instrument proficiency exceeds a predetermined proficiency threshold.

In embodiments, the memory further stores executable instructions which, when executed by the processor, cause the processor to assign a guitar instrument of the ensemble to a bass part of the retrieved arrangement in response to a determination that the number of bass parts in the retrieved arrangement exceeds the number of bass instruments in the ensemble.

In embodiments, the memory further stores executable instructions which, when executed by the processor, cause the processor to characterize the instruments of the ensemble as one of a melody/harmony instrument, a harmony/bass instrument, a guitar instrument, or a bass instrument; and assign one of a melody/harmony or a harmony/bass instrument of the ensemble to a bass part of the retrieved arrangement in response to a determination that the number of bass parts in the retrieved arrangement exceeds the number of bass instruments in the ensemble.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments.

Figure 1:
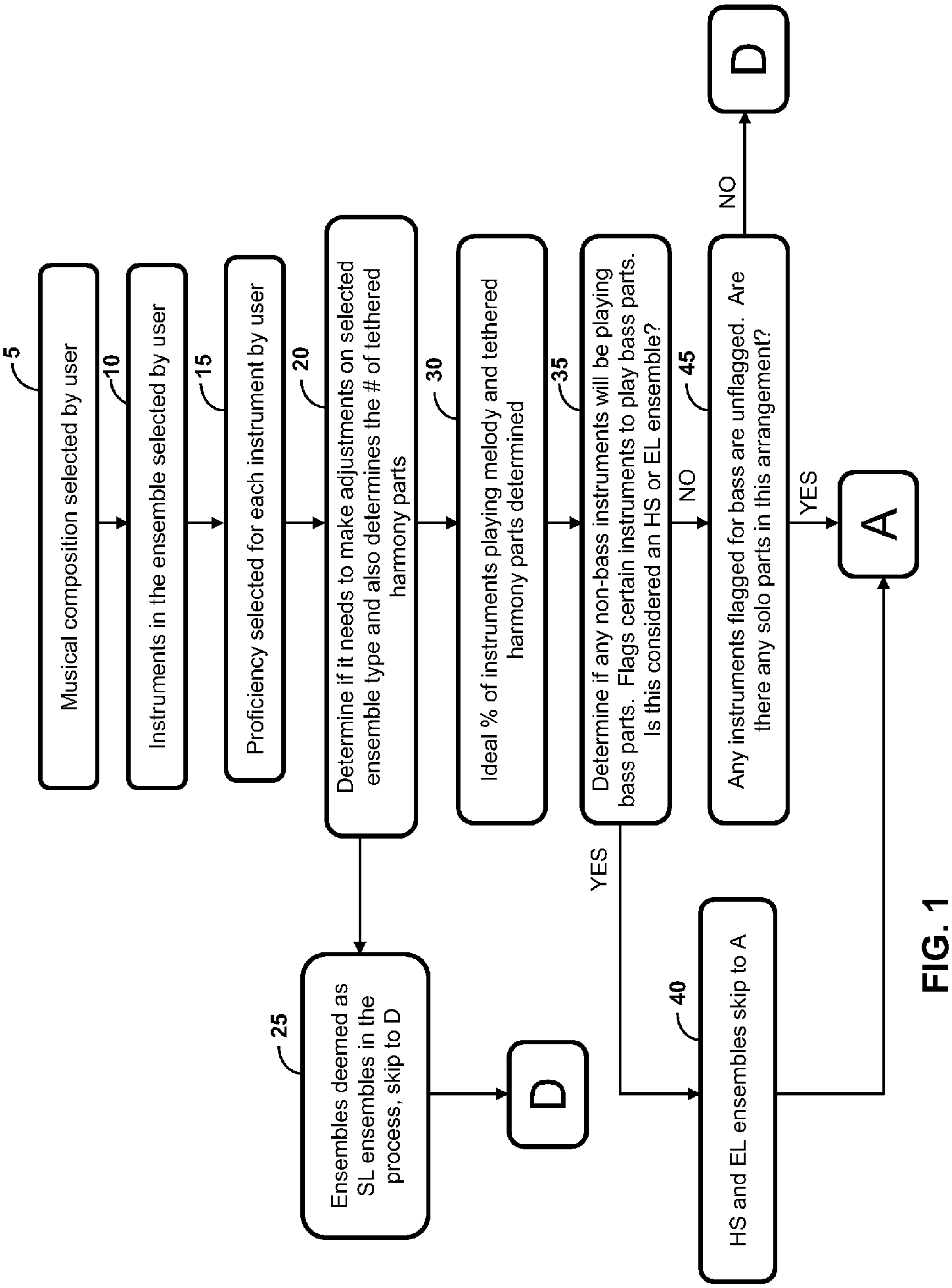
FIGS. 1-5 depict a high level flowchart of a method for creating customized music arrangements according to an embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed by any device having a data connection capable of connecting to the Internet, on a variety of operating systems including without limitation Apple OSX®, Apple iOS®, Google Android®, HP WebOS®, Linux, UNIX®, Microsoft Windows®, and/or Microsoft Windows Mobile®.

It should be appreciated that the particular implementations described herein are illustrative of the disclosure and its best mode and are not intended to otherwise limit the scope of the present disclosure in any way. Examples are presented herein which may include sample data items which are intended as examples and are not to be construed as limiting. Indeed, for the sake of brevity, conventional data networking, application development and other functional aspects of the systems (and components of the individual operating components of the systems) may not be described in detail herein. It should be noted that many alternative or additional functional relationships or physical or virtual connections may be present in a practical electronic system or apparatus. In the discussion contained herein, the terms user interface element and/or button are understood to be non-limiting, and include other user interface elements such as, without limitation, a hyperlink, clickable image, and the like.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., flash memory, USB thumb drives) and/or the like.

Computer program instructions embodying the present disclosure may also be stored in a computer-readable memory that can direct a computer or other programmable data processing apparatus to function in a particular manner, such that the instructions stored in the computer-readable memory produce an article of manufacture, including instruction means, that implement the function specified in the description or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the present disclosure.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like The steps recited herein may be executed in any order and are not limited to the order presented. Moreover, two or more steps or actions recited herein may be conducted concurrently.

The disclosed systems and/or methods may be embodied, at least in part, in application software that may be downloaded, in whole or in part, from either a website or an application store ("app store") to the mobile device. In another embodiment, the disclosed system and method may be included in the mobile device firmware, hardware, and/or software. In another embodiment, the disclosed systems and/or methods may be embodied, at least in part, in application software executing within a webserver to provide a web-based interface to the described functionality.

In yet other embodiments, all or part of the disclosed systems and/or methods may be provided as one or more callable modules, an application programming interface (e.g., an API), a source library, an object library, a plug-in or snap-in, a dynamic link library (e.g., DLL), or any software architecture capable of providing the functionality disclosed herein.

Systems and methods for creating customized music arrangements based on multiple criteria are provided herein. In an embodiment, a user, typically a band leader or conductor, inputs into the system information about an ensemble, such as, without limitation, the number of instruments, instrument types, an aggregate playing ability of the ensemble, and the playing ability of each individual member of the ensemble. Any ensemble (with the exception of circumstances such a percussion only ensemble) can play any composition stored in the database because of the system's ability to cater the arrangements. The user may then choose a musical selection from the list of candidate selections, whereupon the system delivers to the user a musical arrangement of the candidate selection as a score that has been customized for each member of the ensemble and the accompanying individual instrument parts. Additionally, the delivered score may be customized to balance the entire ensemble with regard to tonal balance, allocation of featured parts (including, without limitation, solo parts, featured parts, melody parts, harmony parts, improvisational parts, and so forth). In some embodiments, the system includes the capability of receiving ensemble information and creating the customized musical arrangements in real time for display to the user and/or to the members of the ensemble.

In another aspect, embodiments of the disclosed system and method may be configured with musical ensemble parameters and individual parts as played by a variety of instruments. Each part is predefined at several proficiency levels to accommodate players with differing proficiency levels. In this manner, each part is scored appropriately in view of the skills of the player who will be playing the part. In embodiment, proficiency levels may be grouped using a scholastic designation, for example, elementary school level, middle school level, high school level, college level, and professional level. Parts are divided into several categories: solo, melody, harmony, featured harmony, bass, percussion, pitched percussion, keyboards, and guitar.

Woodwind, brass, and string instruments are often assigned to the melody, harmony and bass categories. This assignment is dependent upon the role that each instrument plays within the musical composition. The system seeks to rebalance the score to give an aesthetically balanced sound to each part, and additionally or alternatively seeks to highlight strong musicians in the ensemble if and when possible. Additionally or alternatively, the user may provide input on which instruments and/or players should be featured.

Instruments are defined to have typical part roles. These functions are: Melody/Harmony (or Melody/harmony), Harmony/Bass (or Harmony/bass), Dedicated Bass (Bass), Keyboard, Guitar, Pitched Percussion, Glockenspiel, Chimes, Bass Drum, Snare Drum, Drum Set, Timpani, Cymbals, Auxiliary (Aux) Percussion, and Harp. The described process focuses primarily on Melody/Harmony, Harmony/Bass and Bass Instruments, which customarily form the backbone of an arrangement. These part roles are typically played by instruments in the traditional woodwind, brass, and string families.

In another aspect, the user first enters the number of total musicians in the ensemble. In an embodiment, a series of menus with a + and − sign are present to enable the user to expand and collapse hierarchically-arranged instrument selection groups. The user chooses the instruments available in the ensemble, adds each instrument to the score, and then specifies the quantity of each instrument available in the ensemble. Under each instrument, one or more user interface elements, such as sliders, radio buttons, and the like, are presented to enable the user to select the proficiency level of each musician playing that instrument (e.g., early beginner, beginner, low intermediate, high intermediate, and advanced). The user also indicates the overall proficiency level of the ensemble, e.g., elementary school level (ES), middle school level (MS), high school level (HS), college level (CL), professional (PL), and so forth). In this manner, the degree of difficulty of the intended arrangements is defined as a starting point which reflects how the user perceives the ensemble. In certain instances, for example, the described process may dictate that an ensemble originally selected as HS, should be actually playing an EL arrangement instead.

In one aspect, the described process displays a running total of instruments selected to help the user be sure it matches the number of musicians they intend to have in the ensemble.

From a musical perspective, an arrangement should articulate the main theme or melody of the piece, which is typically performed by the higher-pitched instruments (e.g., flute, alto sax, clarinet, trumpet, violin, etc.).

In one aspect, the present disclosure is directed to a database having multiple variations of each musical composition for which customized arrangements are offered. The melody of each composition is analyzed by an experienced arranger, who creates simplified versions of the arrangement, each of which is suited to for a particular ensemble playing level. Each simplified arrangement is stored into the database for use by the described process, together with corresponding data (arrangement parameters) describing various aspects to the arrangement, e.g., the role of each part, identification of improvisational parts, related arrangements, note ranges, and so forth as described in more detail below.

The experienced arranger utilizes his professional judgment create the alternative simplified arrangements. A desired ("ideal") number of instruments needed to cover the melody, tethered harmony, non-tethered or featured harmony, bass, and other parts is determined and stored in the database in conjunction with the corresponding simplified arrangement, as described in more detail below.

The experienced arranger may modify various elements of the arrangement to achieve the desired simplification. For example, a melody made up of eighth notes may be turned into quarter notes by eliminating every other note, if the note is repeated, or if the second note of an eighth note pairing does not carry the same importance as the first. In some cases, the arrangement may be changed to allow eighth notes to be re-written as quarter notes. This results in a much slower but playable version of the same melody.

In addition to meter and tempo, articulation and other instrument-specific instructions are considered in simplifying parts. For example, ensuring that string parts are marked pizzicato where appropriate, but not on a trumpet part (which alternatively may be assigned the simplified phrase).

In embodiments, the database stores variations of the same part by instrument and to provide part variants when necessary. For example, if a string variant was created for a Melody 1 part which was originally scored for a horn, a separate Melody 1-String Variant version suitable for a violin player may also be stored.

In embodiments, the disclosed process generates an output file in XML format, e.g., in MusicXML format, to enable generated arrangements to be displayed by any XML rendering software. In embodiments, the disclosed process generates output in additional or alternative human- or machine-readable formats, such as, without limitation, MIDI file format and/or PDF format.

Embodiments of systems and methods according to the present disclosure may have several instrument choices available to the user, and provides the process with which the scores and instrument parts are assembled. Although the original musical compositions can vary in the types of parts found, the described process advantageously provides the same selection logic, available instruments, and predetermined instrument ranges by proficiency, for all compositions stored the database. In this manner, the user is able to generate scores for any desired musical composition regardless of the instrument lineup of the user's ensemble.

The arrangement parameters include such settings as, without limitation:

- the number of melody, harmony, bass, solo, tethered harmony, and featured harmony parts;
- the minimum proficiency level for each part;
- the default key of the arrangement;
- recommended instrument choices for melody, solos, etc.;
- an order of priority of preferred instruments to play bass parts when no bass-enabled instruments are available;
- solo instrument restrictions.

According to embodiments of the present disclosure, a method, process and system is provided that enables a user to generate a customized musical arrangement that will fit specific ensemble requirements.

Overview

In FIG. 1, the process begins in step 5 wherein the desired musical composition is selected by the user and retrieved from the database. In step 10, the instruments which make up the ensemble are defined. In step 15, the proficiency of the player of each instrument is defined. In this manner, the targeted musical composition, the instruments of the ensemble, and the proficiency of the player of each instrument of the ensemble ("instrument proficiency") are defined.

In step 20, a determination is made as to whether the ensemble as defined may be identified as a small ensemble (SL) with no solo parts, and if so, the ensemble is reclassified as an SL ensemble in step 25, and processing continues with step 120 (connector "D").

A determination is made as to the number of tethered harmony parts in the selected composition, and in step 30, an ideal percentage of instruments to play melody and tethered harmony parts is determined.

In step 35, a determination is made as to whether any bass parts will need to be played by non-bass instruments, and if so, flag the non-bass instrument(s) which will be assigned a bass part. If the ensemble is a HS or EL ensemble, processing continues at step 50 (connector "A"). If the ensemble is any other type of ensemble, in step 45 any non-bass instruments which were flagged are reverted to an un-flagged state. If the selected composition includes at least one solo part, processing continues at step 50, otherwise, processing continues at step 120.

Figure 4:
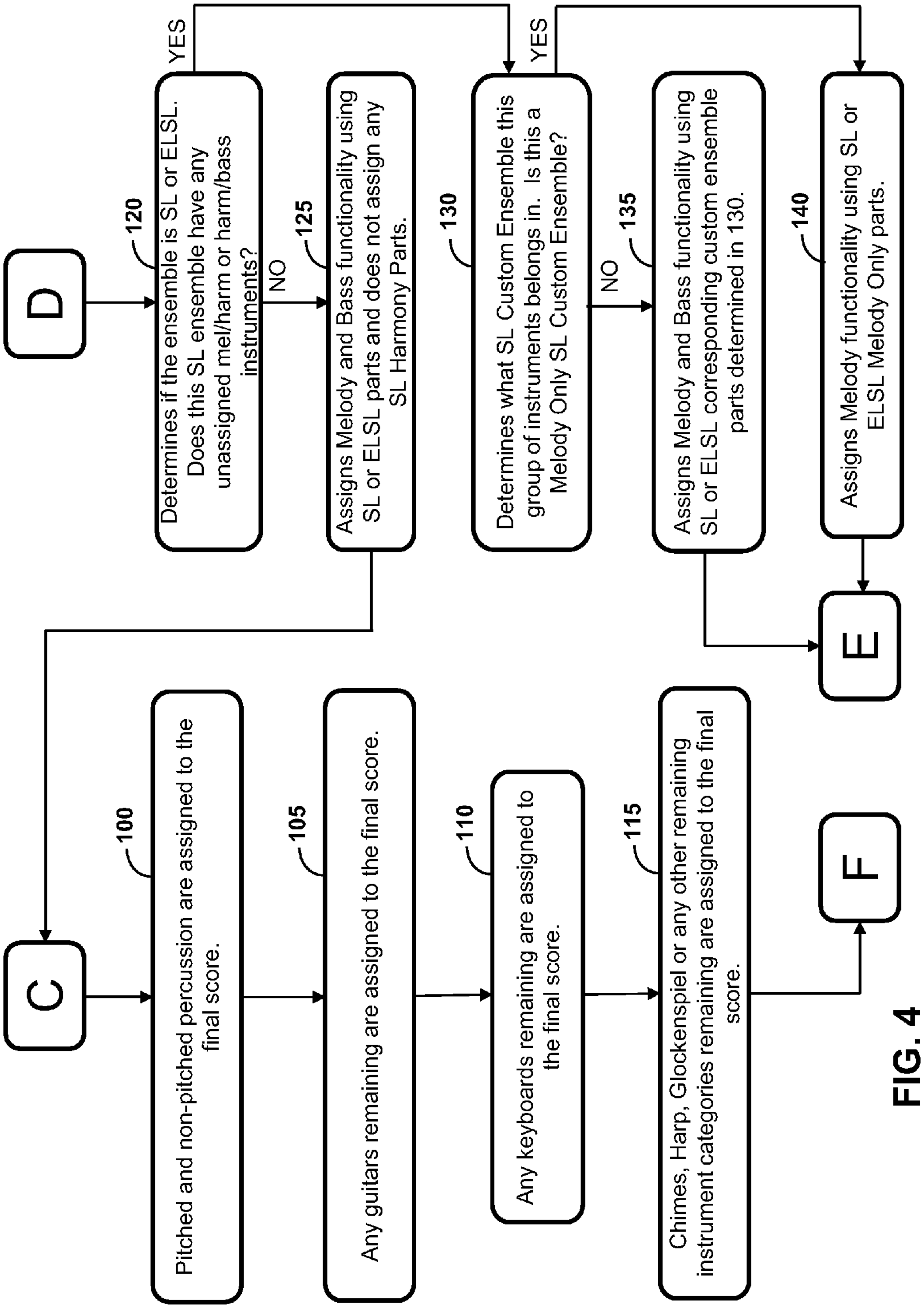
Figure 5:
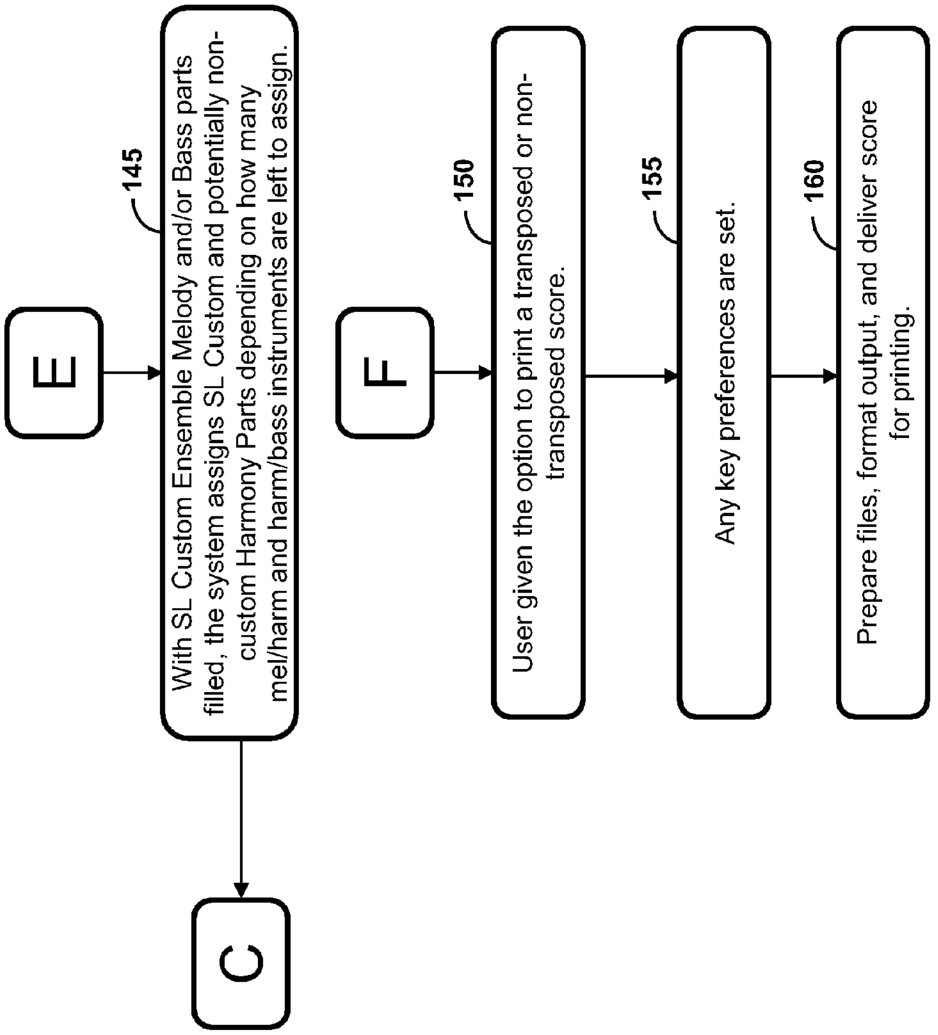

In step 120 (FIG. 4), a determination is made as to whether the ensemble is an SL or ELSL (elementary level, small) ensemble, and whether any unassigned melody/harmony instruments or harmony/bass instruments remain. If not, the remaining melody and bass instruments are assigned, and no harmony parts are assigned, whereupon processing continues with step 100 (discussed below). If so, the process continues with step 130 in which it is determined whether the ensemble requires a melody-only (highly simplified) arrangement. If it does, in step 140 the melody instrument(s) is assigned using the simplified SL or ELSL parts. If not, in step 135, melody and bass instruments are assigned. In step 145 (connector "E"), SL harmony parts are assigned to the remaining melodic (e.g., tonal non-percussion) instruments. Processing continues with step 100.

Figure 2:
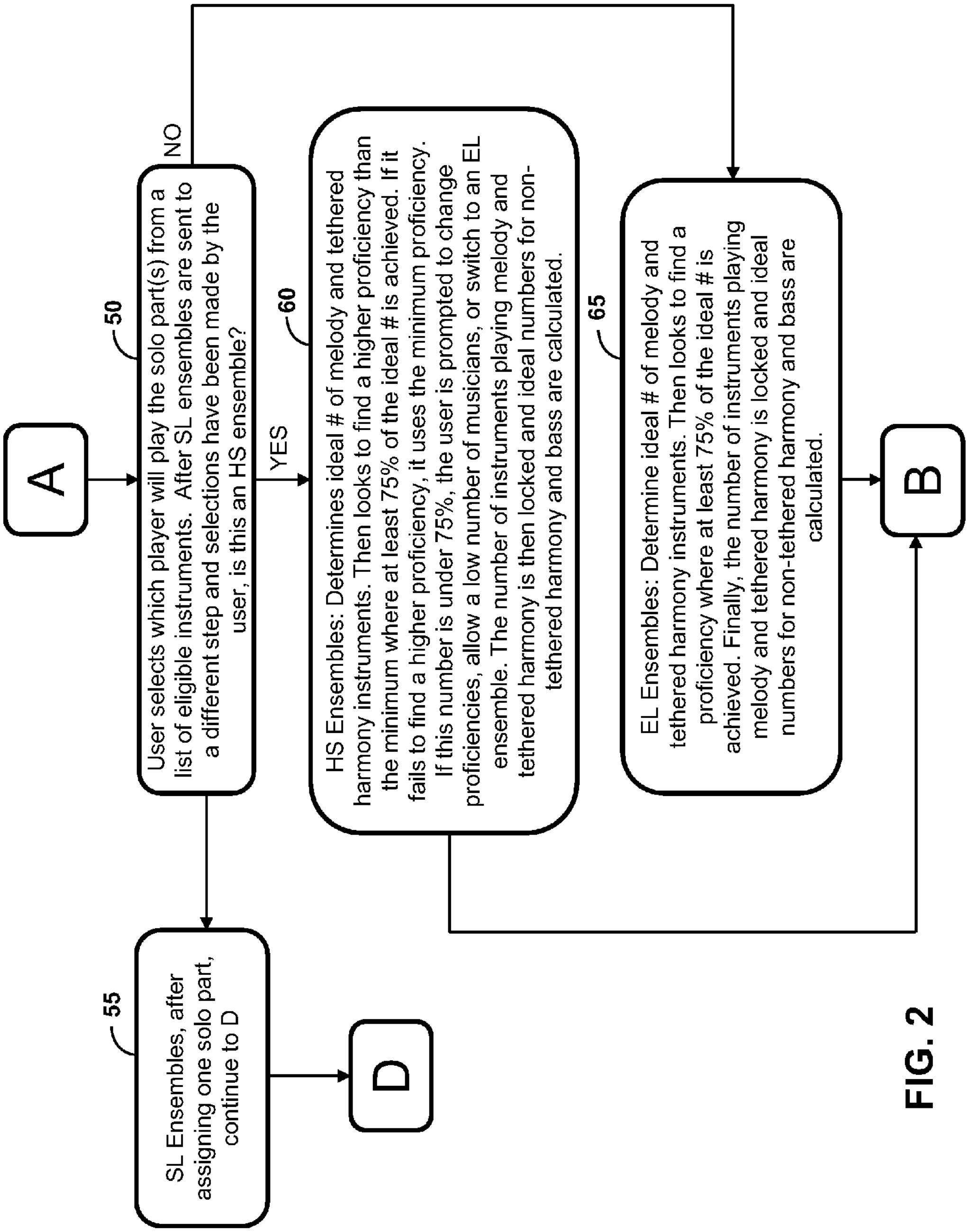
Figure 3:
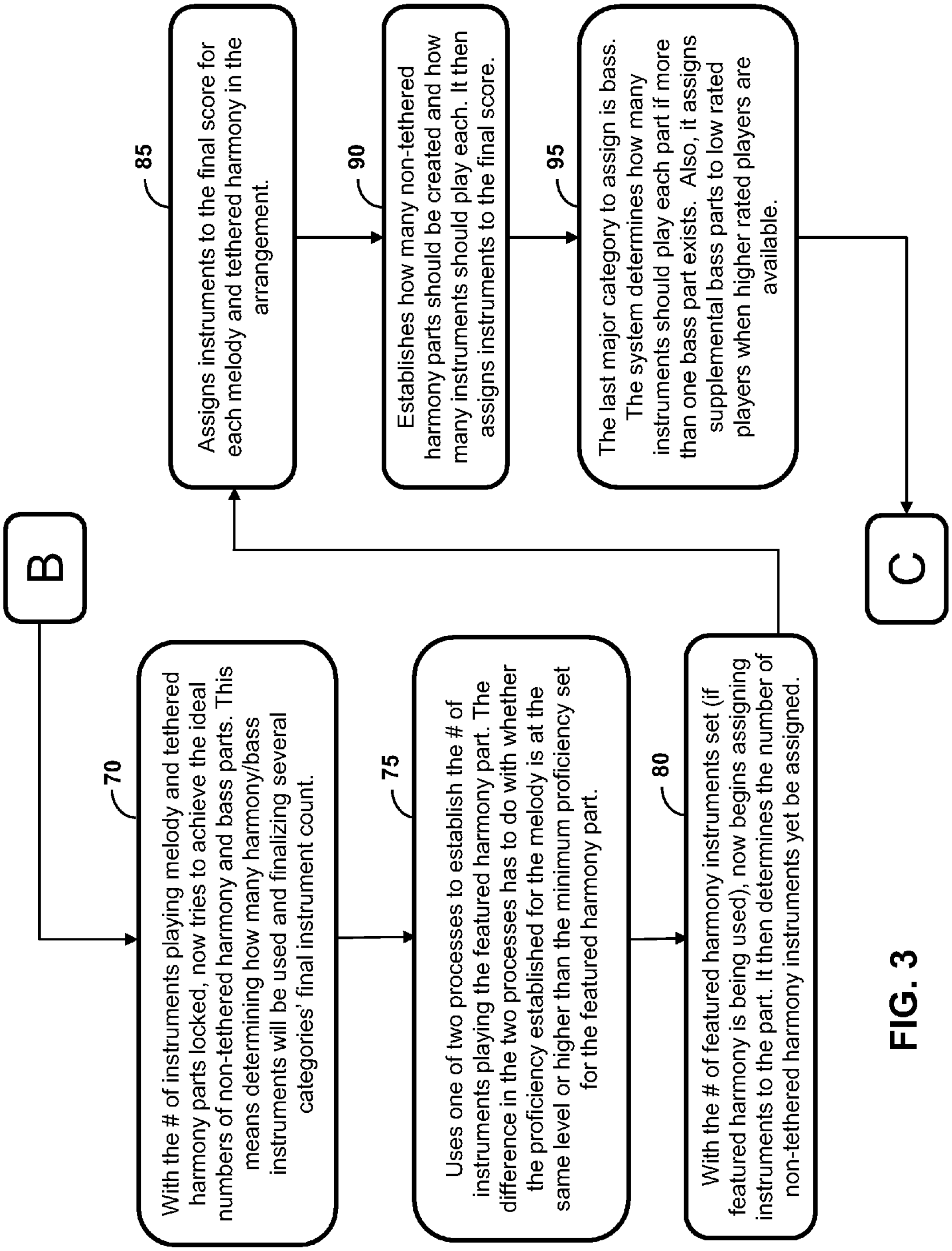

Referring now to FIG. 2, in step 50 a list of solo-eligible instruments is presented from which the instrument to play the solo part(s) is selected. If the ensemble is an SL ensemble, processing proceeds with step 20. Otherwise, processing continues based upon whether the ensemble is an HS ensemble or an EL ensemble. If the ensemble is an HS ensemble, processing proceeds with step 60, otherwise, for an EL ensemble, processing proceeds with step 65.

In step 60, the desired ("ideal") number of melody and tethered harmony instruments is determined. Since the melody and tethered harmony parts require at least a minimum proficiency level to be eligible to play the melody and/or tethered harmony part, the number of eligible instrument proficiencies for those instruments suitable for playing a melody and/or tethered harmony part is determined. If at least a threshold percentage (e.g., 75%) of the suitable instruments have an eligible proficiency, these instruments are assigned to the melody and tethered harmony parts, and the remaining number of instruments available for non-tethered harmony and pass parts is determined. If fewer than the threshold percentage of suitable instruments are eligible, the user is presented with the choice of either changing the instrument proficiencies or reclassifying the ensemble as an EL ensemble. Processing then proceeds with step 70 (connector "B").

In step 65, the desired ("ideal") number of melody and tethered harmony instruments is determined. A threshold percentage (e.g., 75%) of the suitable instruments should have an eligible proficiency and are assigned to the melody and tethered harmony parts, and the remaining number of instruments available for non-tethered harmony and bass parts is determined. Processing then proceeds with step 70 (connector "B").

In steps 70-90, any non-tethered harmony (or featured harmony) parts, and bass parts, are assigned. Any non-tethered harmony or featured harmony part is assigned based, at least in part, on whether the minimum proficiency for the melody part(s) is the same as, or greater than, the minimum proficiency for the associated harmony part, as described in detail below. Processing continues with step 90, wherein bass parts are assigned to the remaining instruments. Supplemental bass parts are assigned to the lowest-rated players of suitable tonal instruments.

In step 100, non-pitched percussion instruments and pitched percussion instruments are assigned to the score; in step 105, any guitars are assigned to the score; and in step 110 any keyboards are assigned to the score; and in step 115 any remaining instruments (e.g., chimes, harps, glockenspiel, etc.) are assigned. Processing continues with steps 150-160 (connector "F") in which the score options are finalized (e.g., transposed or non-transposed score is selected, any individual part key preferences are selected, and output file(s) of the final score are prepared and delivered to the user).

A more detailed discussion of aspects of the present disclosure is presented below.

Initial Selections

Figure 6:
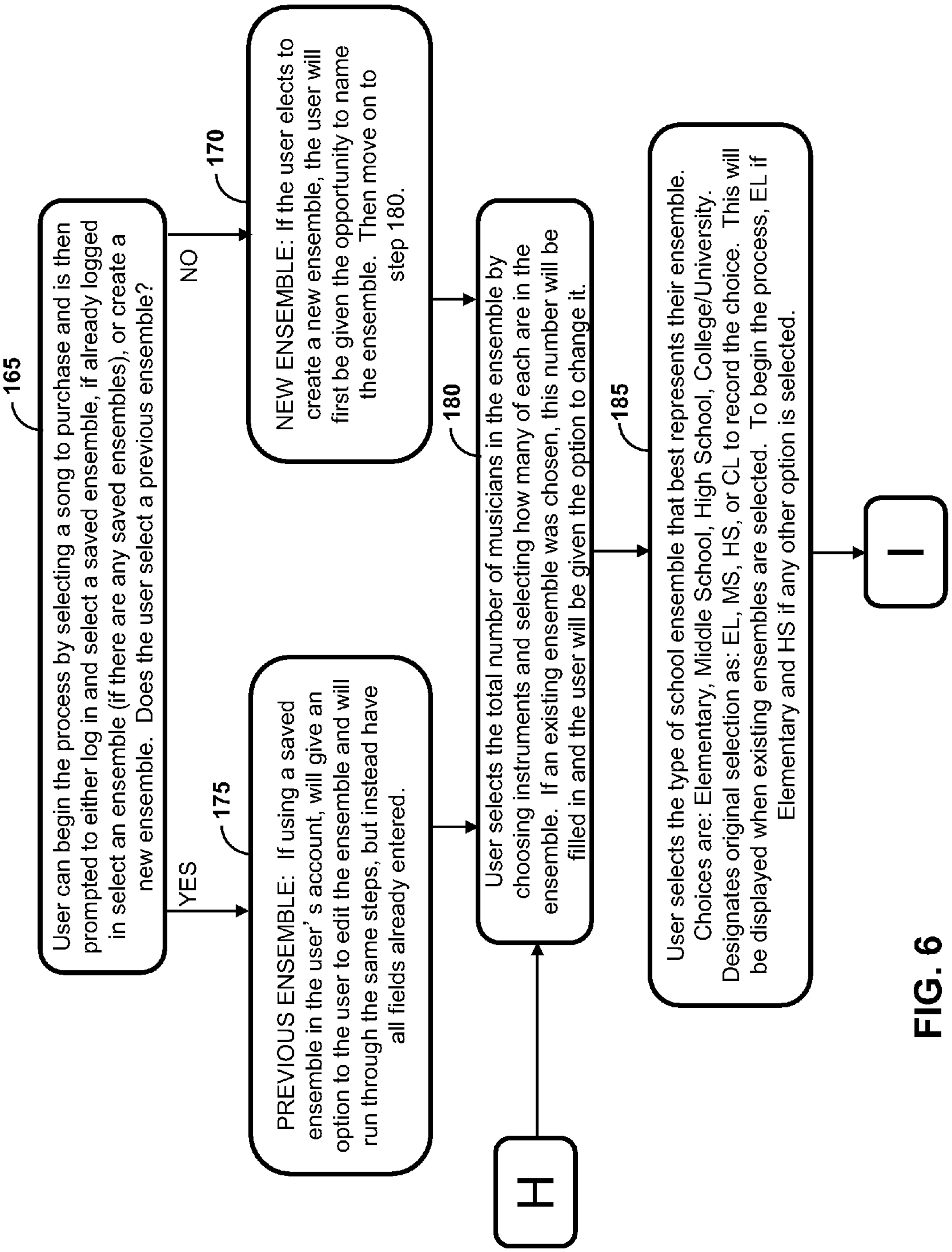
FIGS. 6-80 depict a detailed flowchart of a method for creating customized music arrangements according to an embodiment of the present disclosure.

In the step 165 (FIG. 6), the user selects a composition to work on, and/or to purchase. If the user is an existing customer, in step 175 they can select a previously saved ensemble they have already set up, edit an existing ensemble, or, in step 170, create a new ensemble. The user may define an ensemble name to facilitate the retrieval or re-use of the ensemble with various scores at a later time. For example, an existing ensemble may be used as a template defining a typical starting point for an ensemble, needing only minor revisions to tailor the ensemble to the current lineup of players. In step 180, the user defines the total number of players in the ensemble by choosing how many of each instrument is represented in the ensemble. Alternatively, if the user selected a previously saved ensemble, that ensemble will be retrieved and the user given an opportunity to make any desired changes.

In step 185, the type of ensemble is specified (e.g., Elementary School, Middle School, High School, or College). This information is referenced for the settings of the arrangement parameters and will effect what types of proficiencies are available for the user to select as well as the output of the parts which are generated. Middle School, High School, and College ensembles are treated as High School (HS), thus ensembles specified as anything except Elementary School (EL) are regarded as High School (HS).

The first primary ensemble type is High School (HS), which indicates the arrangement will include the full length version of the composition, and have proficiency restrictions on melody and solo parts. The second primary ensemble type is Elementary School (EL) which indicates that a shortened arrangement of the original composition is to be used with no proficiency restrictions. The third primary ensemble type is Small Ensemble (SL) which is an arrangement written to be most effective with ensembles that do not contain enough instruments to play the required parts which are normally found an HS or EL ensemble. SL ensembles have an option (e.g., a sub-type) intended for low proficiency groups, which is referred to as ELSL. The user's initial selection of ensemble type provides a starting point for the custom arrangement process, however, as discussed below, the ensemble type may be changed during the process.

After the number of performers is selected, the user is presented with a series of instruments broken down by instrument family and asked to select how many of each instrument are in the ensemble.

Figure 7:
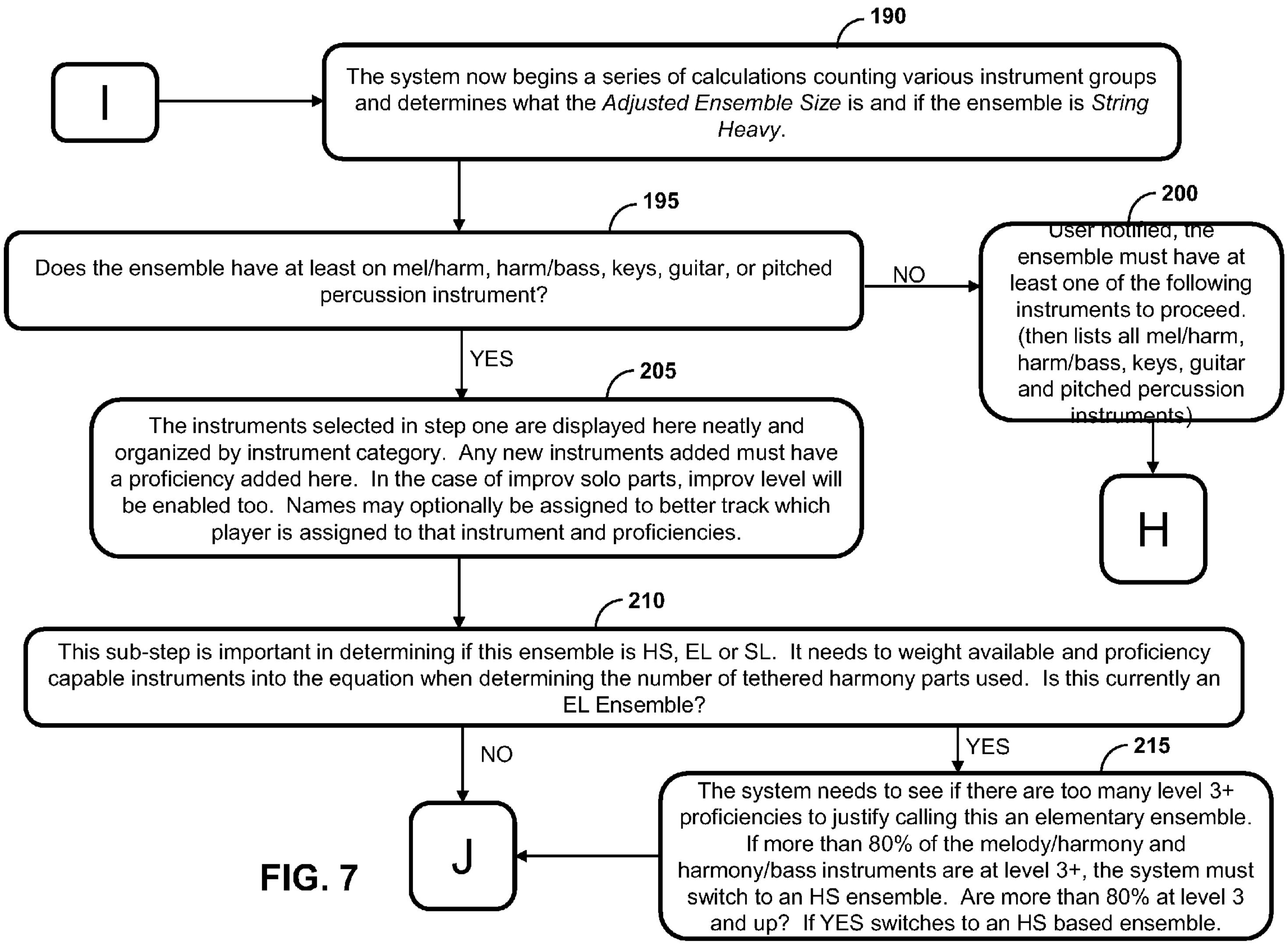

An "adjusted ensemble size" is determined in step 190 (FIG. 7), which subtracts guitar, keyboard, percussion, and any additional bass instruments beyond a first bass instrument. For example, an ensemble of piano, double bass, electric bass, flute, trumpet, and snare drum would yield an adjusted ensemble size of 3. In this example, the piano, the electric bass (because the double bass counted as a first bass instrument) and the snare drum are not counted. It would count the double bass, flute and trumpet.

In addition, the ensemble will be considered "string heavy" (step 190) if it is determined that 40% or more of the melody/harmony, harmony/bass and dedicated bass instruments are string instruments (e.g., violin, viola, cello, and double bass). This field is used later to make sure string instruments can be featured in melody parts when the ensemble is determined to be orchestral.

In step 195 it is determined if at least one melody/harmony, harmony/bass, keys, guitar, or pitched percussion instrument exists in the ensemble, which will enable an instrument that is suited to play a melody part to be used. If not available (step 200), the user must expressly select one of those type of instruments to continue.

Specifying Player Proficiency

With the instruments selected, in step 205 the proficiencies of each player of each instrument are specified. In the present embodiment, all proficiency levels are available for selection, regardless of the type of ensemble selected. In the case of compositions having one or more improvisation-enabled solo parts, an "improvisation" choice is made available which the user may optionally select. In embodiments, if a previous ensemble was loaded, the proficiencies will be pre-populated from the saved ensemble. In embodiments, a selected proficiency on an instrument may be saved with the ensemble for future use.

In embodiments, proficiencies are rated 1-5 with 1 being the lowest and 5 being the highest. Player proficiency levels, and the corresponding complexity of score parts which are tailored for players at each proficiency level, are characterized as follows:

Proficiency 1: Intended for performers who have typically been playing a very short time and have basic rhythmic understanding. In the custom arrangement, notes included are quarter notes, half notes, dotted half notes, and whole notes (when in 4/4 time). Note range is limited, and generally stays midrange for the instrument.

Proficiency 2: Intended for performers who have typically been typically playing for 1-2 years and have basic rhythmic understanding. Notes included are eighth notes, quarter notes, half notes, dotted half notes, and whole notes in 4/4 time. Note range is greater than proficiency 1, but generally limited to less than the full range of the instrument.

Proficiency 3: Performers who have been typically playing 2-5 years and have a good rhythmic understanding. Notes included are eighth notes, dotted rhythms, various types of triplets, quarter notes, half notes, dotted half notes, and whole notes. Short phrases of sixteenth notes may included, but not long runs of sixteenth notes. Note range is greater than proficiency 2, and may approach the full range of the instrument.

Proficiency 4: Performers who have typically been typically playing at least 5 years who are very strong musicians, with an above average rhythmic understanding, would be considered proficiency 4 players. Notes included are sixteenth notes, eighth notes, dotted rhythms, different types of triplets, difficult rhythmic patterns and challenging ties. Note range encompasses the full range of the instrument.

Proficiency 5: Performers who are considered very advanced in a high school setting who would be comfortable in a collegiate environment, having an advanced level of rhythmic understanding (including the ability to comfortably play in uncommon time signatures), and having the ability to comprehend and play any imaginable rhythmic/note combination, would be designated proficiency 5 players. Note range encompasses the full range of the instrument.

An additional selection is available to enable the user to specify the players' improvisational skills (step 205), which is useful where a composition includes improvised solo parts.

After the proficiencies are entered, the selected entries may be confirmed (by, e.g., the user clicking continue) and a series of calculations commences. If the current ensemble is EL (steps 210 and 215), and 80% of the melody/harmony and harmony/bass instruments are at a 3+ proficiency, the ensemble designation is changed to a HS ensemble, as this would result in an arrangement which would be better-suited for such an advanced elementary ensemble.

Determining SL Ensembles and the Number of Tethered Harmony Parts

Figure 8:
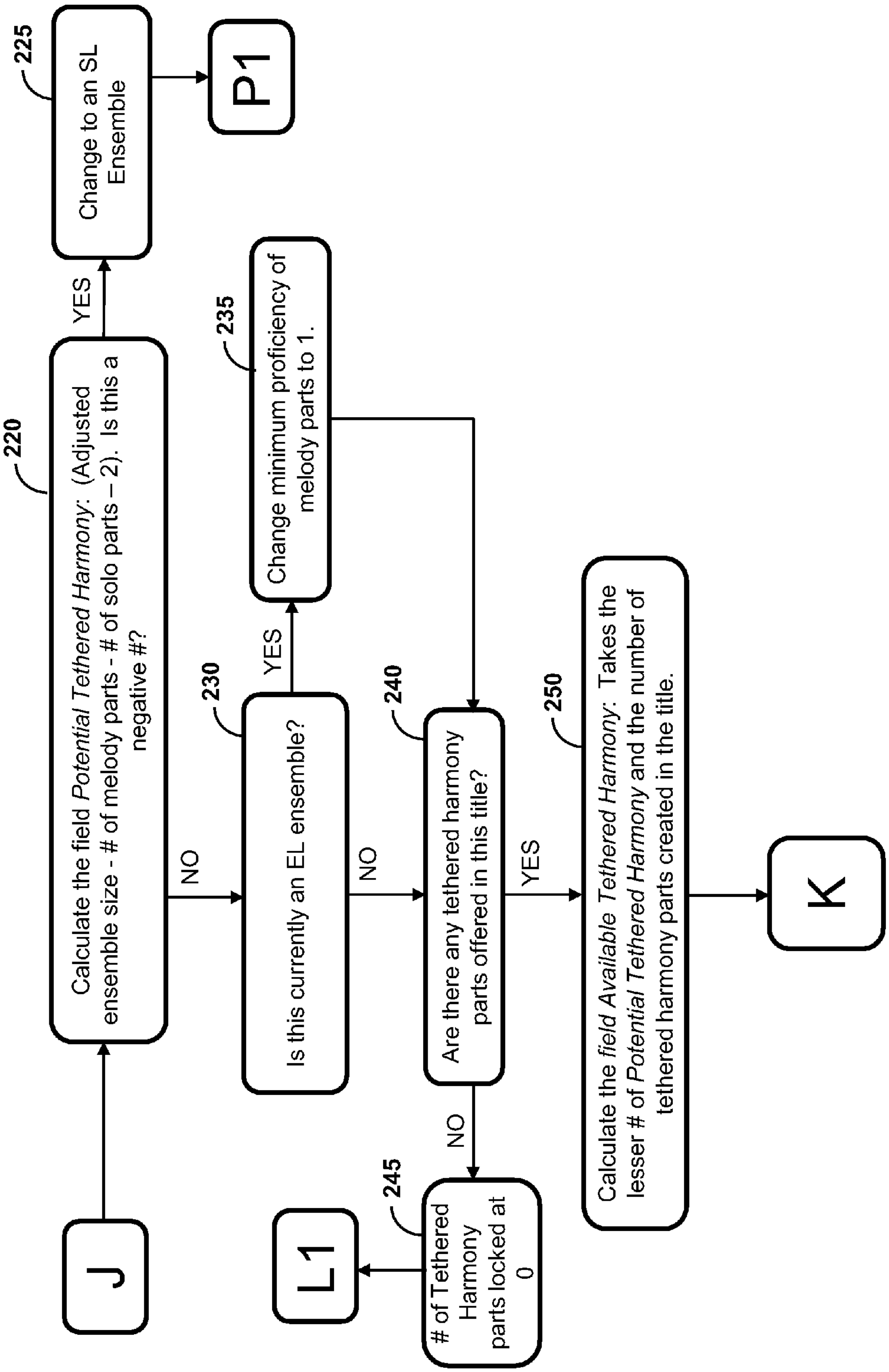
Figure 9:
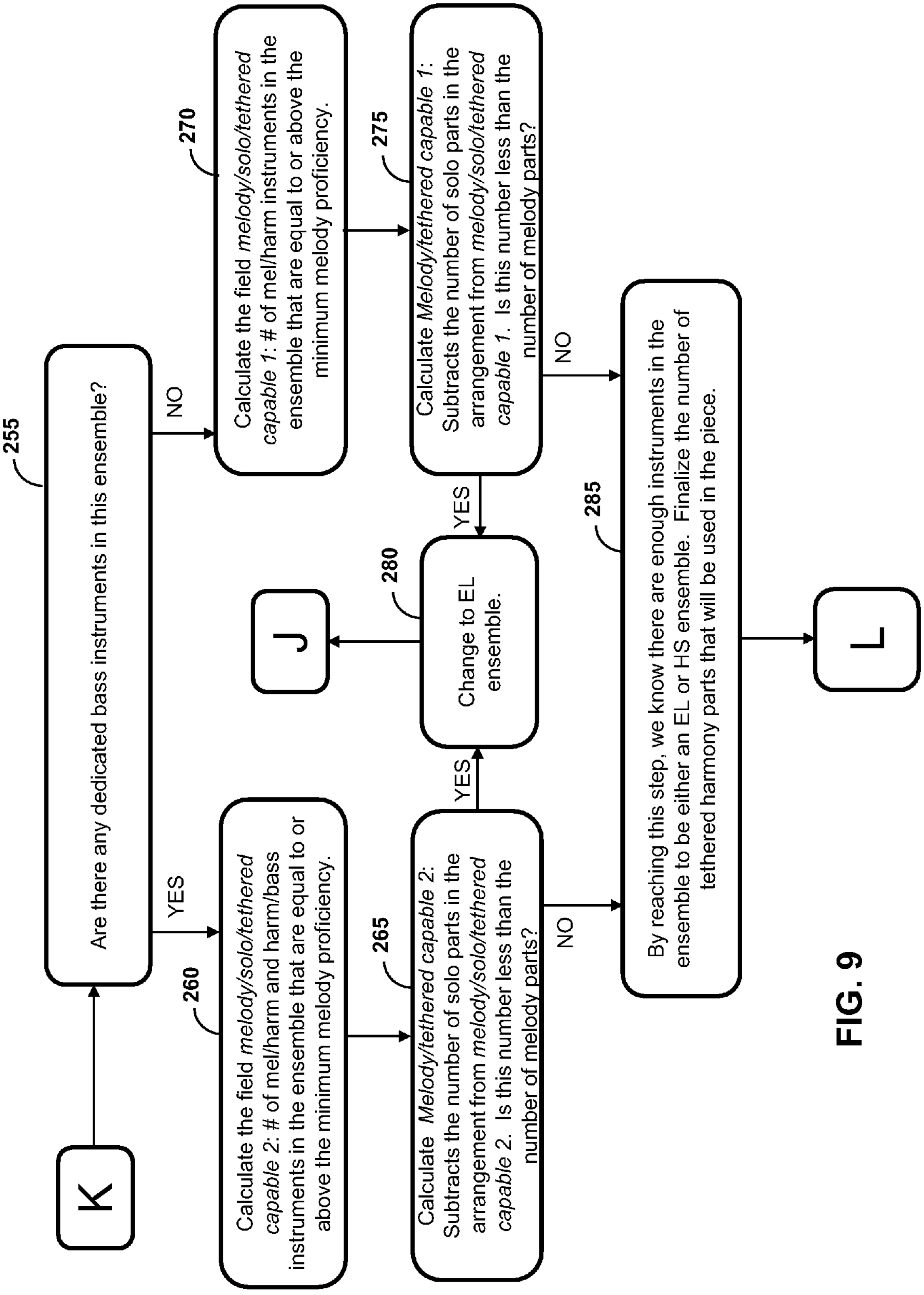
Figure 10:
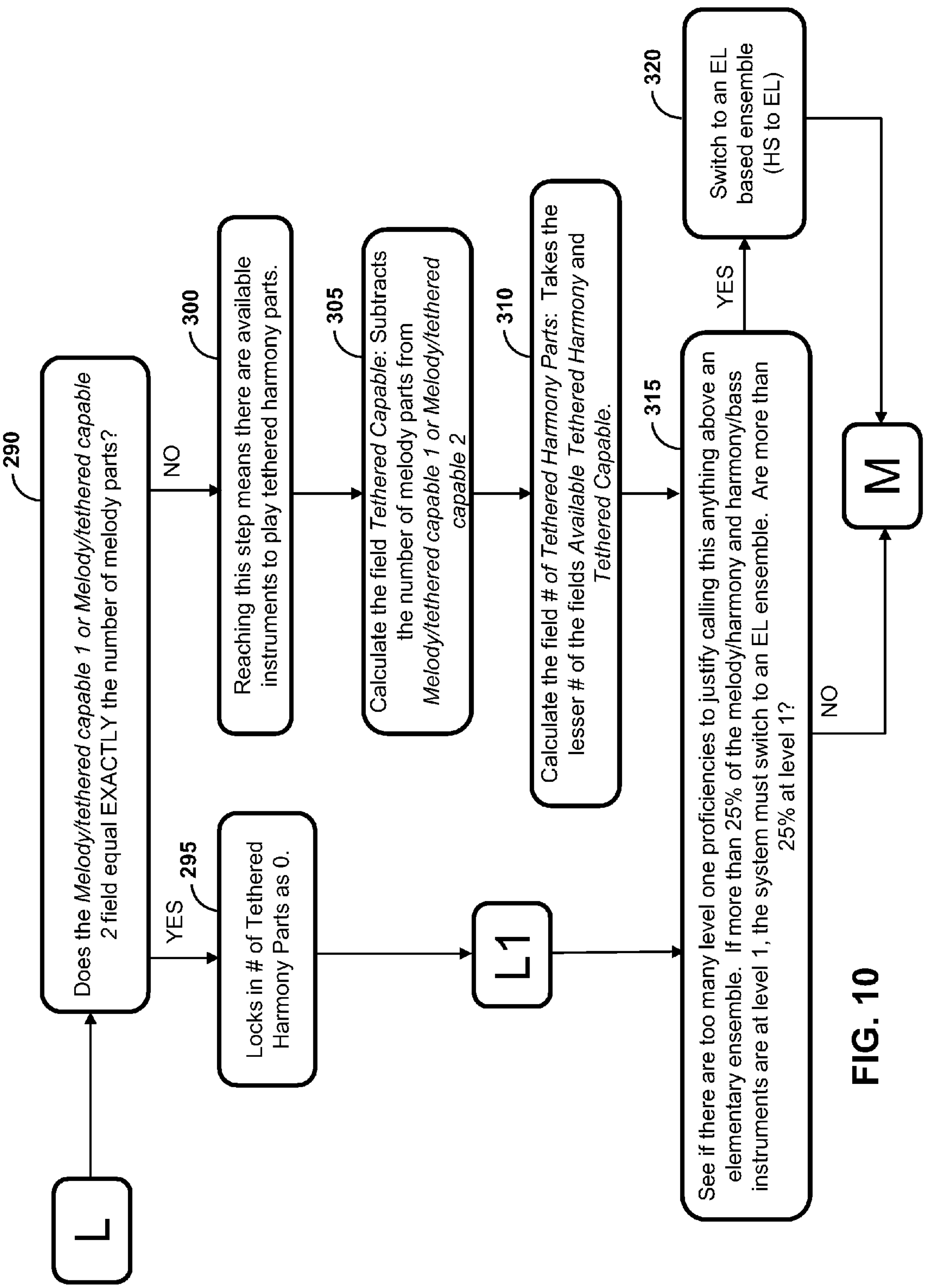

Before finalizing the customized arrangement, the "number of tethered harmony parts" must be determined (FIG. 8-FIG. 10). The number of melody parts is pre-determined in the song settings and an EL or HS ensemble must use all of them in the process. Tethered harmony parts are those parts which typically harmonize the melody parts note by note. As a result, tethered harmony parts require the same minimum proficiencies as the associated melody parts. They are, however, not required. If an ensemble has just enough players to play the melody parts, it may use none or only some of the tethered harmony parts. These steps determine how many tethered harmony parts are used to prepare the custom arrangement.

In step 220, the potential tethered harmony parameter is computed to determine whether there are enough instruments available to use an EL or HS ensemble. With too few instruments, EL and HS arrangements will not be voiced properly (e.g., the arrangement will not sound "right") so the ensemble is switched (step 225) to a small ensemble (SL). Small ensemble arrangements are designed to be able to accommodate any number of situations that can arise when trying to convey the essence of a musical piece using very few instruments. Processing for an ensemble which was changed to SL ensemble continues with step 365 (connector "P1").

If, however, there are enough instruments available for an EL or HS ensemble, the minimum proficiencies for an EL ensemble is established in step 235, and if there are no tethered harmony parts (step 240-245), processing continues with step 315 (connector "L1"). Otherwise, in step 250 the lesser of the actual number of tethered harmony parts (from the arrangement parameters) and the computed potential tethered harmony parameter is taken to compute the available tethered harmony parameter. In steps 255-285, a further determination of whether the ensemble is to be changed to an EL ensemble is performed wherein if any dedicated bass instruments are defined for the arrangement (step 255), the number of melody/harmony and harmony/bass instruments which are at least at the minimum melody proficiency (referred to as the melody/tethered-capable 1 parameter) are compared to the number of solo parts in the arrangement. If the difference is less than the number of melody parts, the ensemble is changed to an EL ensemble (step 280).

If no dedicated bass instruments exist, then the number of melody/harmony instruments which are at least at the minimum melody proficiency (referred to as the melody/tethered-capable 2 parameter) are compared to the number of solo parts in the arrangement. If the difference is less than the number of melody parts, the ensemble is changed to an EL ensemble (step 280). Otherwise, it is established that sufficient instruments exist to support either an EL or HS ensemble.

In step 290, if the melody/tethered-capable 1 parameter or the melody/tethered-capable 2 parameter equals the number of melody parts, the number of tethered harmony parts is set to zero. Otherwise, there exist additional instruments to play tethered harmony parts (step 300) and the number of number of tethered harmony parts are computed in steps 305-310.

If there are too many level 1 proficiencies for an ensemble to be considered a HS ensemble (step 315) the ensemble is switched to an EL ensemble (step 320). If the melody and harmony parts are made up of over 25% level 1 players, they will all be funneled to the same part intended to played by a small few less talented players. However, if this percentage is substantially greater than 25% (for example, greater than about 35%) the ensemble is switched to an EL ensemble, which enables the redistribution of instruments across parts more evenly.

Determine the Ideal Percentage of Instruments Playing Melody Parts

Figure 11:
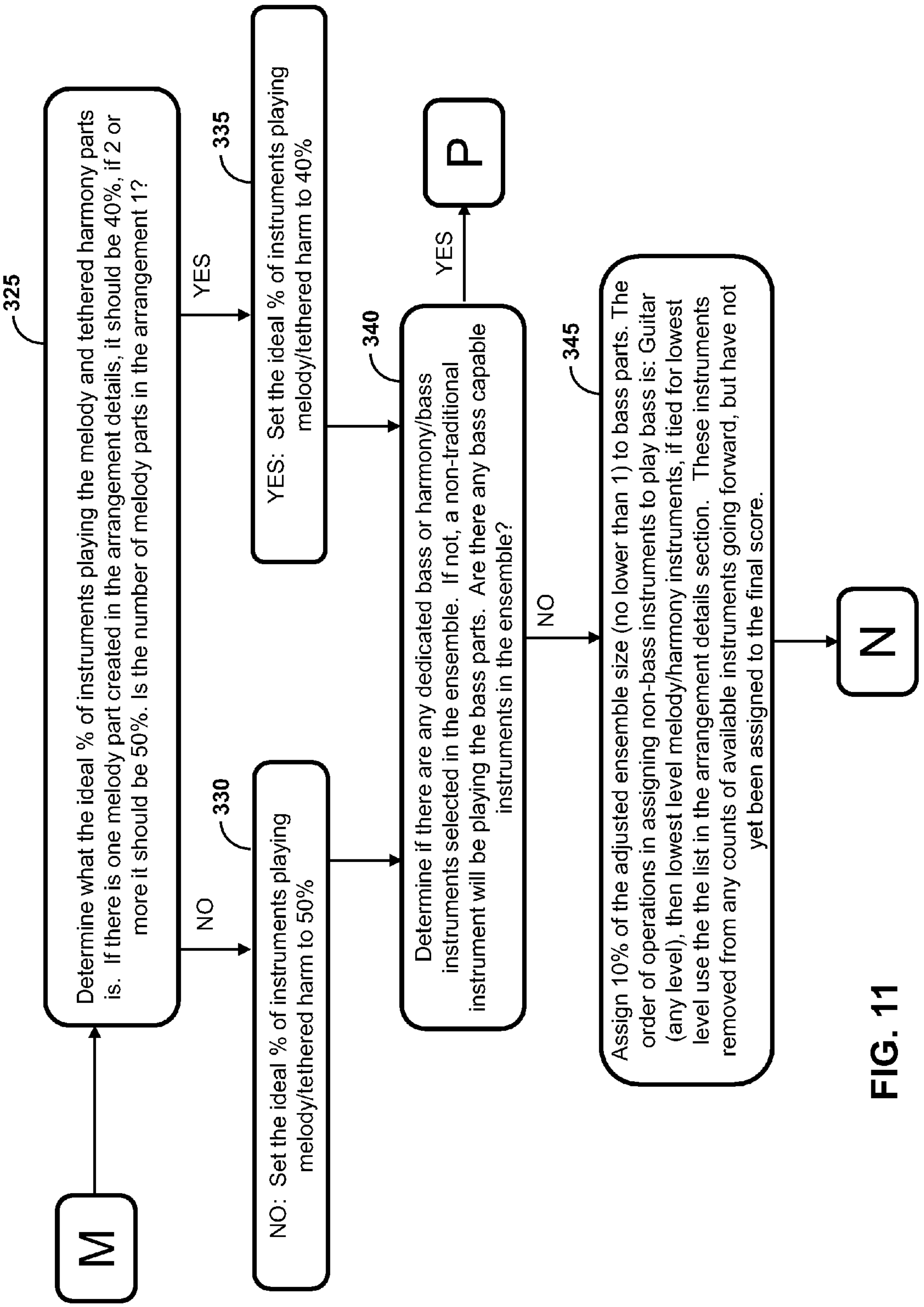

Referring to FIG. 11, a determination is made (steps 325-335) on what percentage of instruments should, ideally, play melody parts. Generally, about 40%-50% of the instruments should play melody, depending on how many melody (and optionally, corresponding tethered harmony) parts are in the arrangement. Later, this percentage is used to calculate the actual number of melody/tethered harmony parts. This percentage is computed from the number of instruments playing the melody (versus harmony or bass), but not including solo parts, guitar, keys, and percussion parts. In particular, in the present embodiment, if there is one melody part, the ideal percentage is set to 40%, if there are two or more, the ideal percentage is set to 50%.

Figure 12:
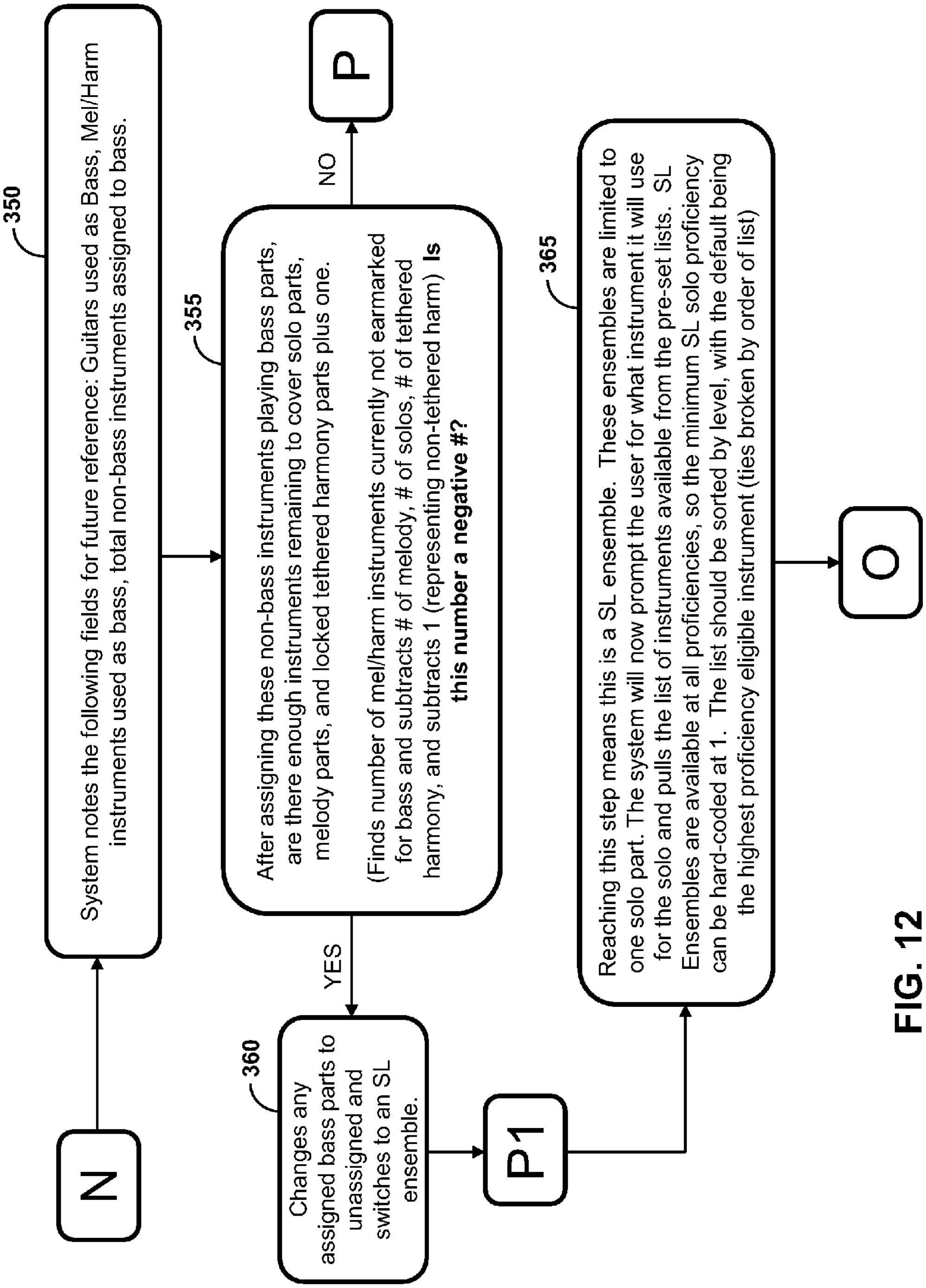
Figure 13:
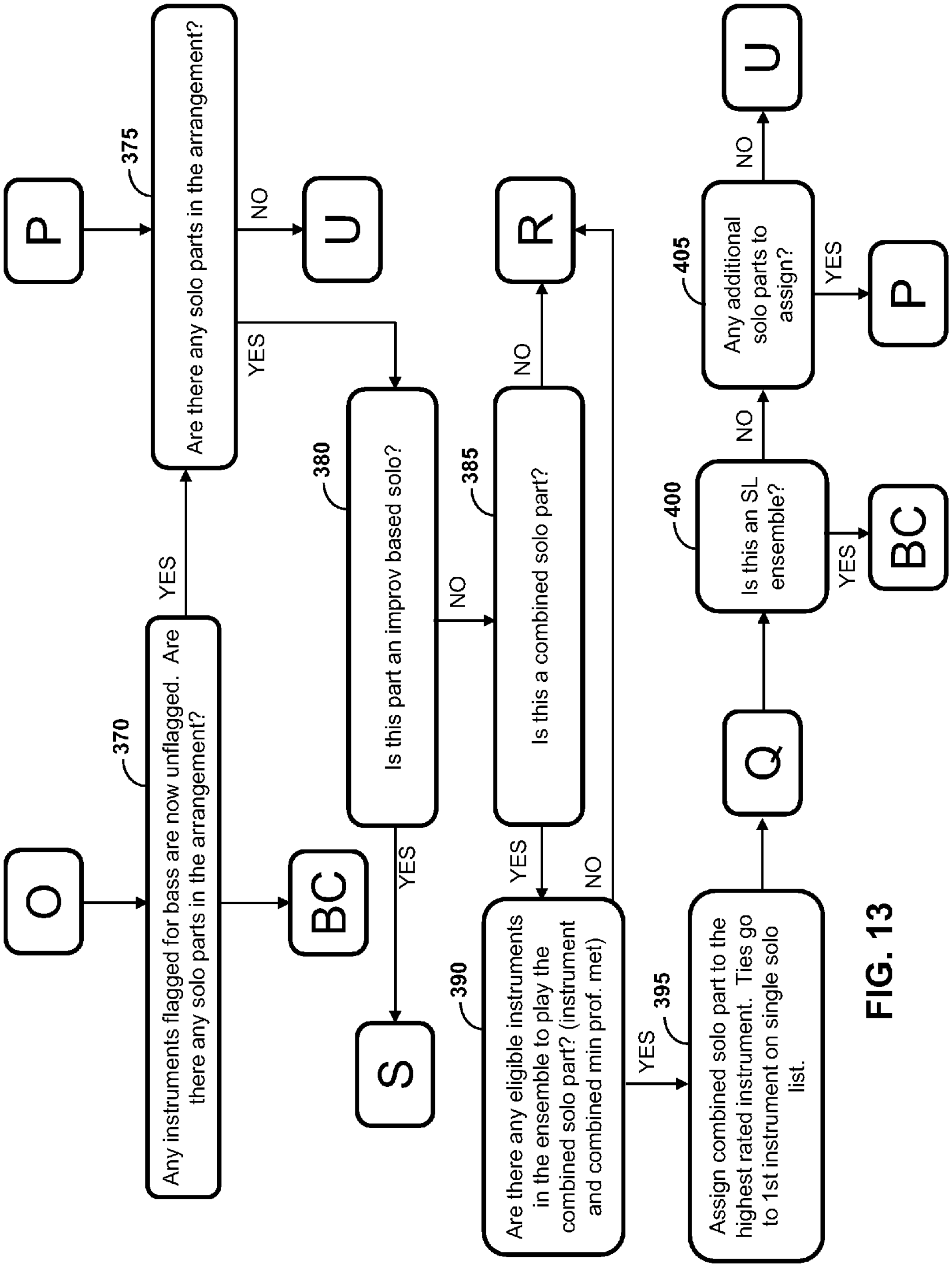
Figure 14:
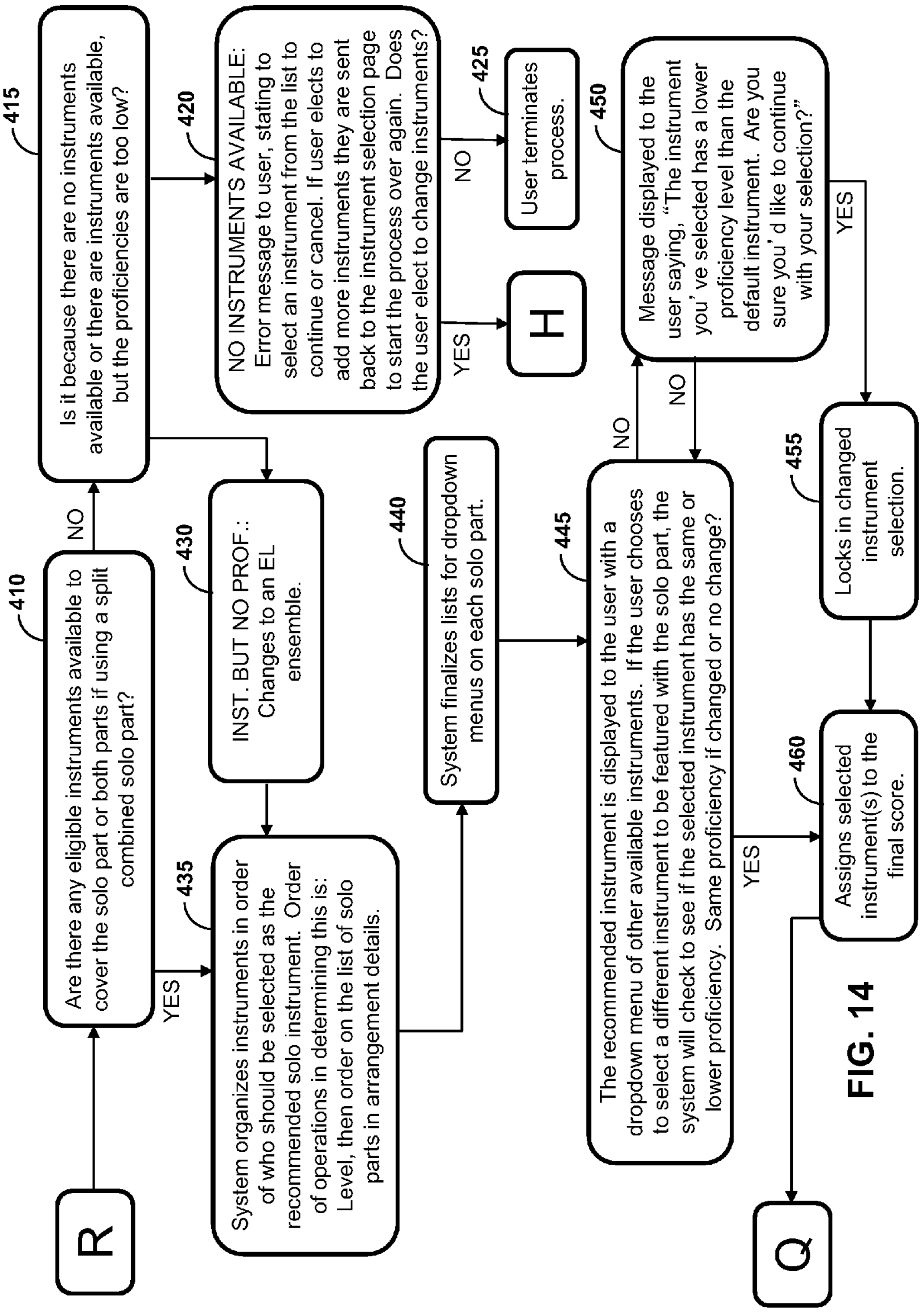
Figure 15:
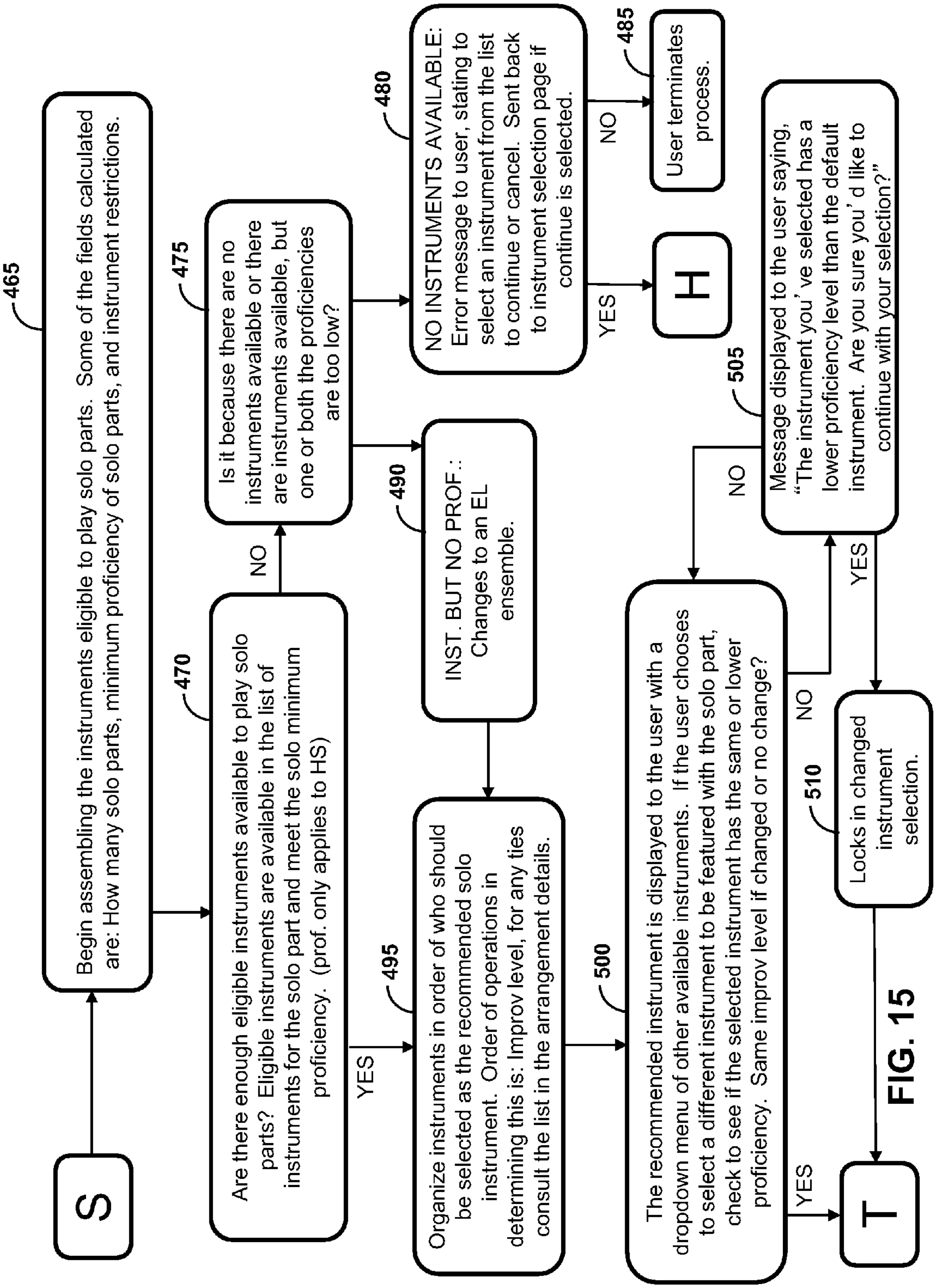

With continued reference to FIG. 11, and to FIG. 12, non-bass instruments playing bass parts are processed in steps 340-360. Although ensembles with no bass instruments will generally not sound as good as those with them, embodiments of the present disclosure provide the option to play an arrangement with non-traditional instruments acting as bass instruments (such as guitar, trumpet, alto sax, or even flute). Instruments are categorized by their pitch (higher pitched instruments being melody/harmony, mid range/low range as harmony/bass and low pitched instruments as bass). Harmony/bass and bass instruments having a range low enough to play low bass melodies are therefore said to be "bass-enabled." If an ensemble has no bass-enabled instruments (step 340), other instruments will be used to cover these parts. A list, in order of priority, of preferred substitute instruments to play bass parts when no bass-enabled instruments are available is found in the arrangement parameters for the composition.

In step 345, ten percent (10%) of the adjusted total ensemble size is designated for bass parts. In accordance with the present embodiment, bass instrument substitution first attempts to assign any guitar available (regardless of proficiency). If none are available, then attempt to assign the lowest proficiency melody/harmony instruments, and finally, use the list provided in the arrangement details. Note that these assignments are provisional in nature, and have not been locked to the final score, although they are removed from all eligible instrument counts going forward.

If after assigning the substitute instruments to cover the bass part(s), there are insufficient instruments to cover the remaining melody, harmony, and solo parts, the bass substitutions are canceled, and the ensemble is re-categorized as an SL ensemble (steps 355-370).

When an ensemble was deemed to be SL, processing proceeds with step 365. One feature of an SL ensemble is that it only has one solo part associated with it. SL solo parts only use the solo 1 (primary solo) part. Also, they are available for any instrument found on the solo 1 list of instruments, and do not have a minimum required proficiency required. EL and SL ensembles use a default level 1 as the minimum solo proficiency, while HS ensembles use a predetermined indication in the arrangement parameters to determine which minimum proficiency is required for solo parts.

Solo Parts

While SL ensembles get a head start on the solo assignment process in step 365, all other ensembles begin the solo assignment process, and SL ensembles continue the solo assignment process, in step 375. With reference to FIG. 13-FIG. 16, there are three types of solos that are handled in this section: combined solos, improvisational (improve) solos, and solos. Solo types are designated in the arrangement parameters for the composition. IN one non-limiting example, a first solo part, "solo 1" may be designated as a combined solo while a second solo part, "solo 2", may be designated as an improve solo part. Solo parts have a corresponding instrument list in the arrangement parameters that is used during assignment as a tie-breaker when two instruments have the same proficiency. The instrument lists for solo parts also define what instruments are preferred to be used to play the part.

Combined Solos

This type of solo is intended to allow a solo part to be played by one instrument or broken into smaller parts if not playable by one player in the ensemble. A part may be broken up temporally into a plurality of consecutively-played sections, or broken up melodically, into a plurality of concurrently-played lines. For example, assume that a combined solo having two independent lines is written for a polyphonic instrument, such as a keyboard. While an advanced keyboard player would be able to play both lines, monophonic instruments which can only play one note at a time, such as a trumpet, could not physically play the same part alone. In this case the combined solo is assigned to be played concurrently by two instruments. In another example, a solo may be too lengthy or complex for a player at the available proficiencies. In this case, the part would be broken up into shorter sections, each assigned to a different player.

Combined solos (step 385) have a system preset associated with them called the "Combined Solo Minimum Proficiency." This will often be set higher than the "Minimum Melody Proficiency" but not lower than the "Solo Parts Minimum Proficiency" setting in HS ensembles. It is also important to note that while there is no minimum melody proficiency in EL ensembles, the "Combined Solo Minimum Proficiency" field is utilized in the solo process to assign instruments.

Combined solo parts have three instrument lists associated with them in the arrangement parameters (steps 390-395). One for the combined polyphonic part (for, e.g., keyboard instruments) and two for monophonic parts which would be used if the combined part is split.

Improv Solos

This type of solo is used when a solo is improvised (step 380). The player's general proficiency (which focuses on the performer's ability to interpret and perform sheet music) does not truly represent the player's ability to improvise, which requires a different skill set. To address this, the present embodiment utilizes a second proficiency, called the improv proficiency, to rate the player's ability to improvise. In HS environments the minimum solo proficiency is still in effect and is still based upon the general proficiency. Improv proficiency is used to sort instruments who meet the minimum required solo proficiency (Note: this proficiency is always 1 in EL and SL ensembles).

Solos

This type of solo is one that has no other special characteristics. It is not improvised, but is playable by any one instrument (at the required proficiency). These solos follow the same process as Split Combined Solo Parts because they are open to many instruments and are only limited by the Minimum Required Solo Proficiency.

The goal of the solo parts section is to provide the user with an option to select who should be a soloist. Additionally or alternatively, the system will offer a recommendation and/or impose restrictions based on the composition. The system will show a default recommended instrument and provide a list of instruments that are eligible to play the solo part according to the ensemble makeup and proficiencies.

SL ensembles only have one solo part allowed (it can be combined however) so in step 400 processing continues to the SL ensembles section (step 1315) after the first solo part is assigned, otherwise, addition solo parts are assigned (step 405).

The order of precedence for determining the default solo instrument is as follows: proficiency level, and then order of the list set forth in the arrangement parameters (steps 410-435).

There are several places that the user may be asked for input in the process of determining who will play solo parts. In steps 420 and 480, the system may prompt the user that no instruments are available that are necessary to play solo parts. This requires the user to add a qualifying instrument to the ensemble or the process is terminated. In steps 450 and 505, the user is prompted if an instrument with a lesser proficiency than the recommended instrument is selected to play the solo part. The user must acknowledge this and either agree to continue or decide not to use the lesser proficiency player in order to continue. Steps 420, 450, 480 and 505 are encountered in certain scenarios.

Depending on what type of solo parts are involved, the user will interact with either step 445 or step 500 if solo parts exist in a particular piece. This is where the recommended instrument is displayed and a menu is provided, such as a dropdown menu, to change the instrument to another capable/available instrument when possible or where desired.

The process starting at step 375 is repeated in HS and EL ensembles until all solo parts are assigned.

Figure 16:
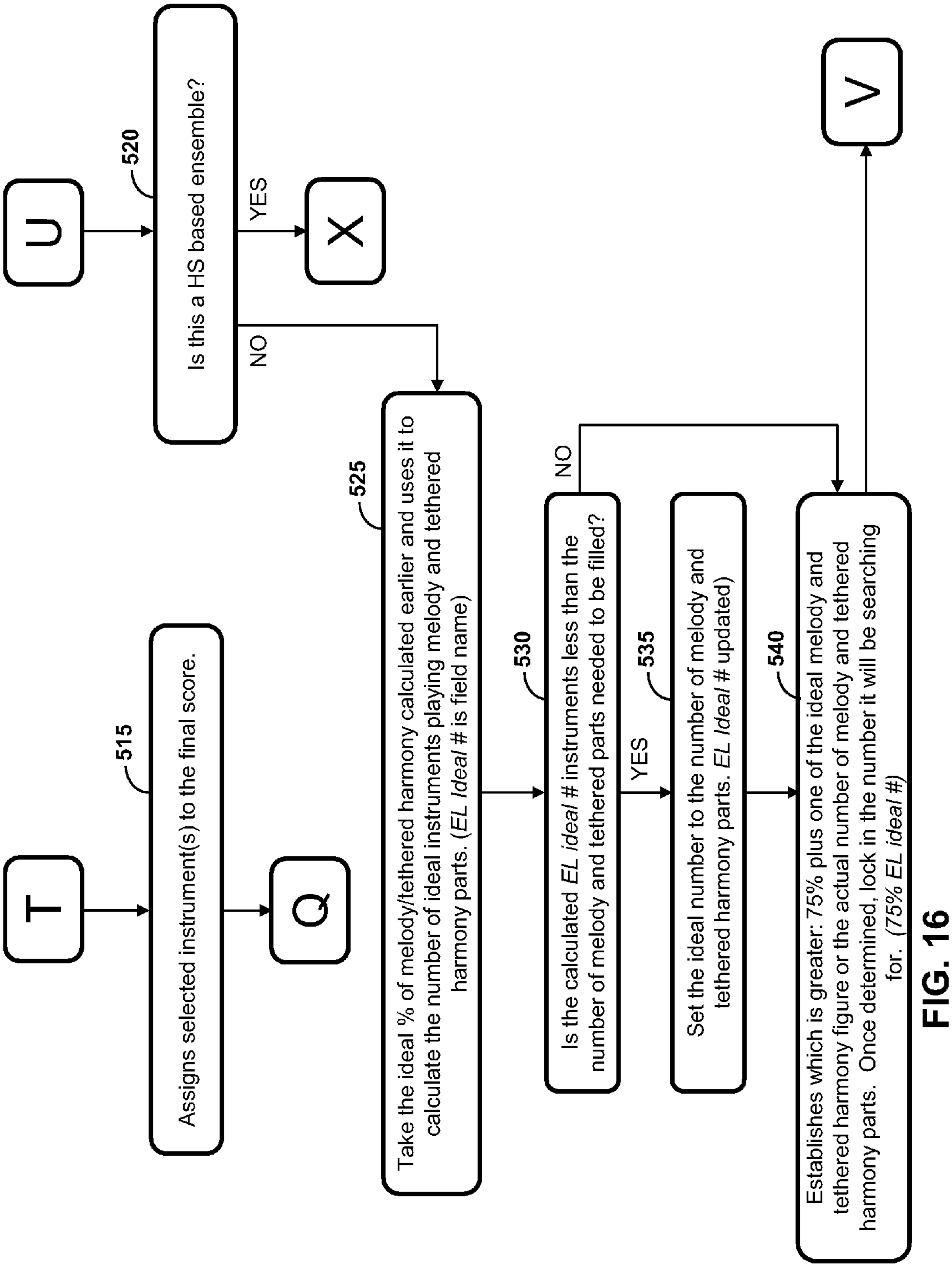
Figure 17:
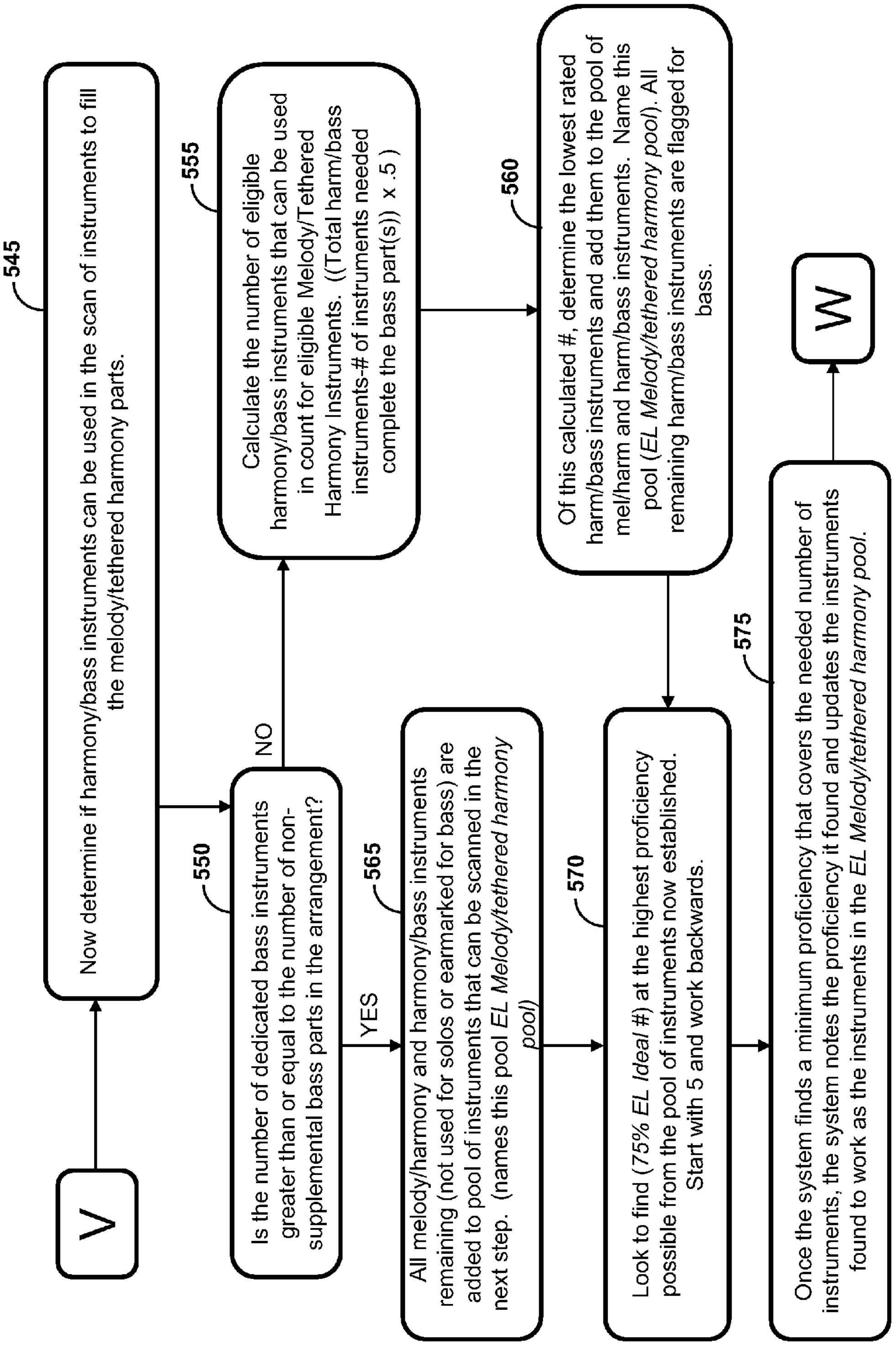
Figure 18:
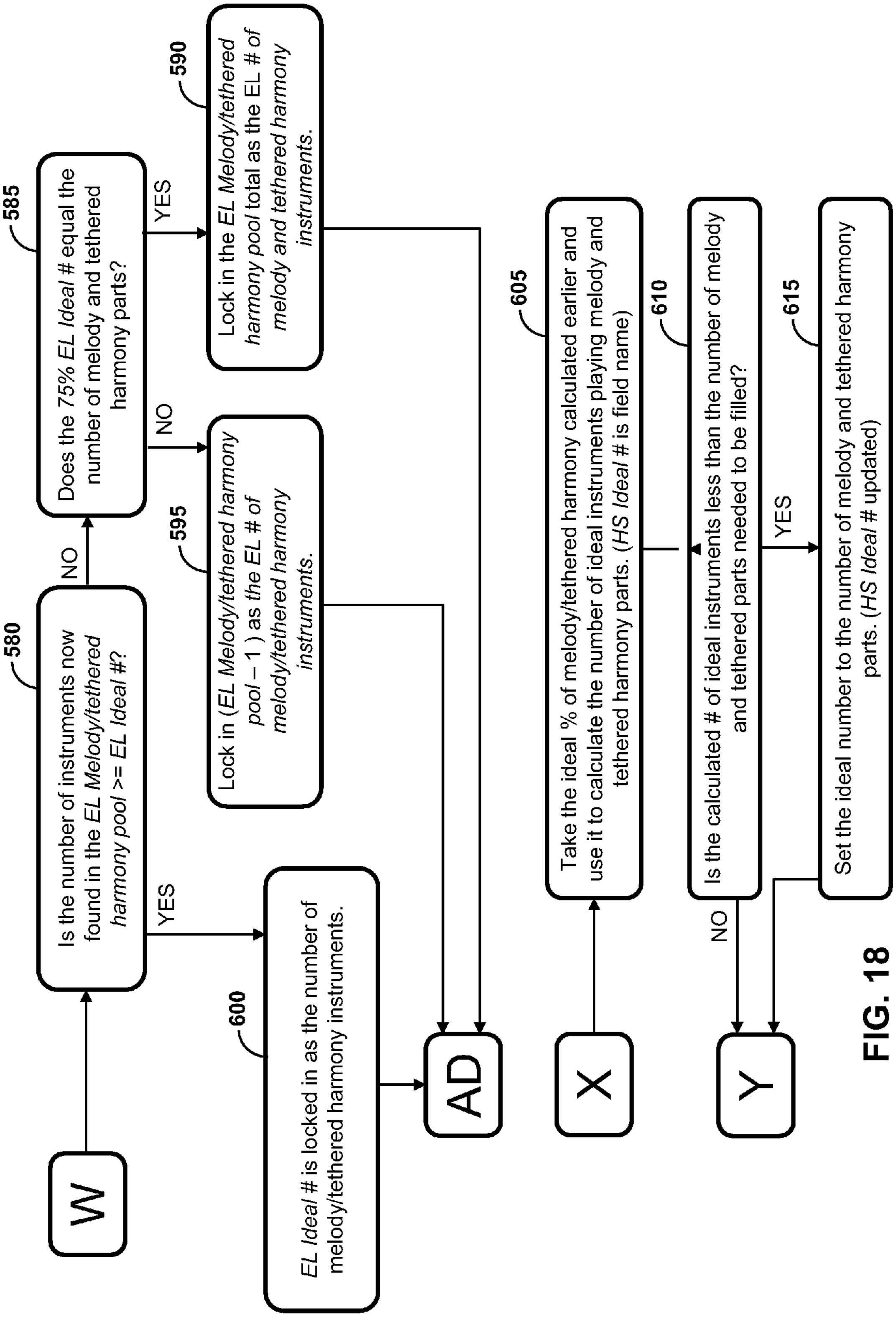
Figure 19:
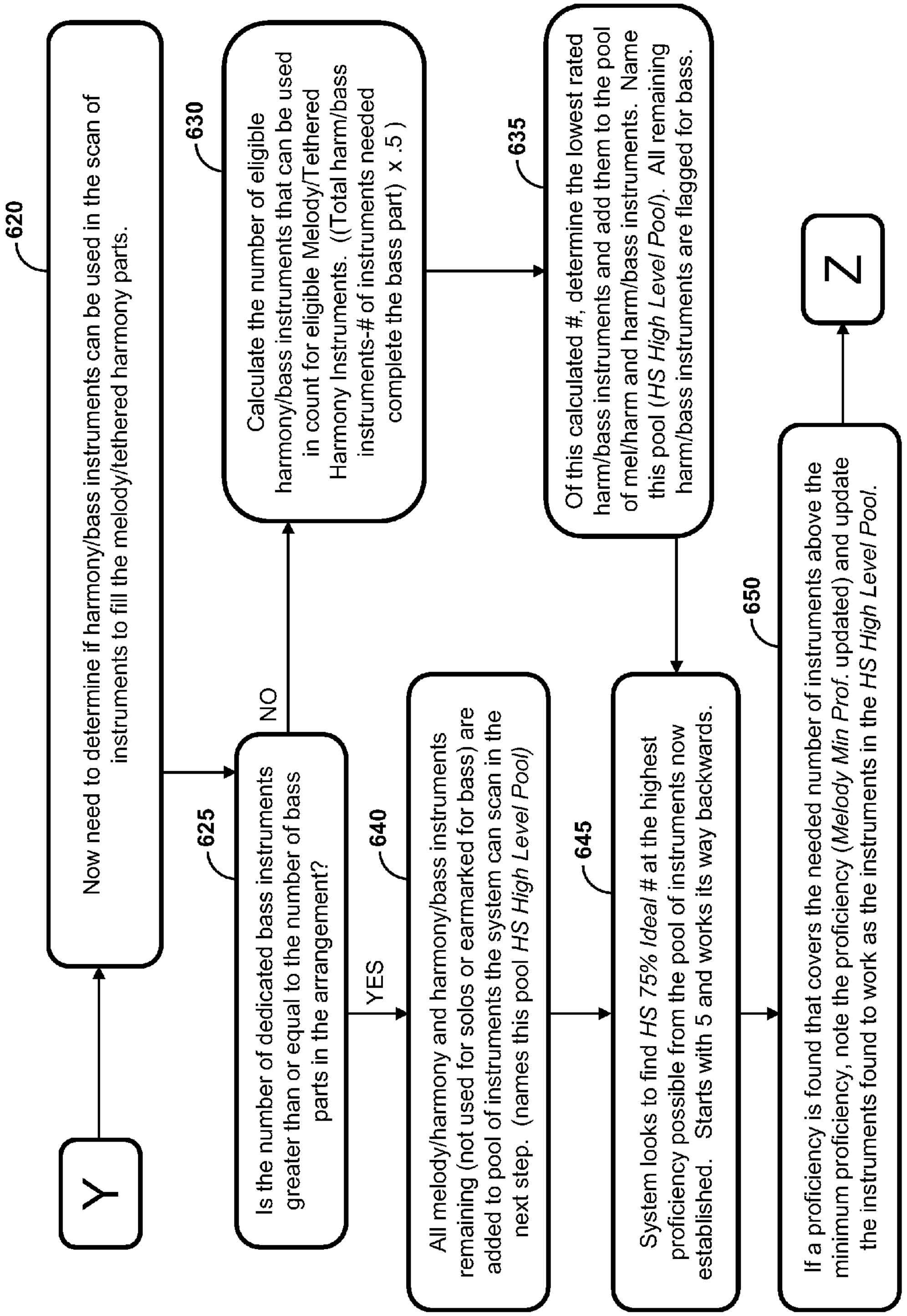
Figure 20:
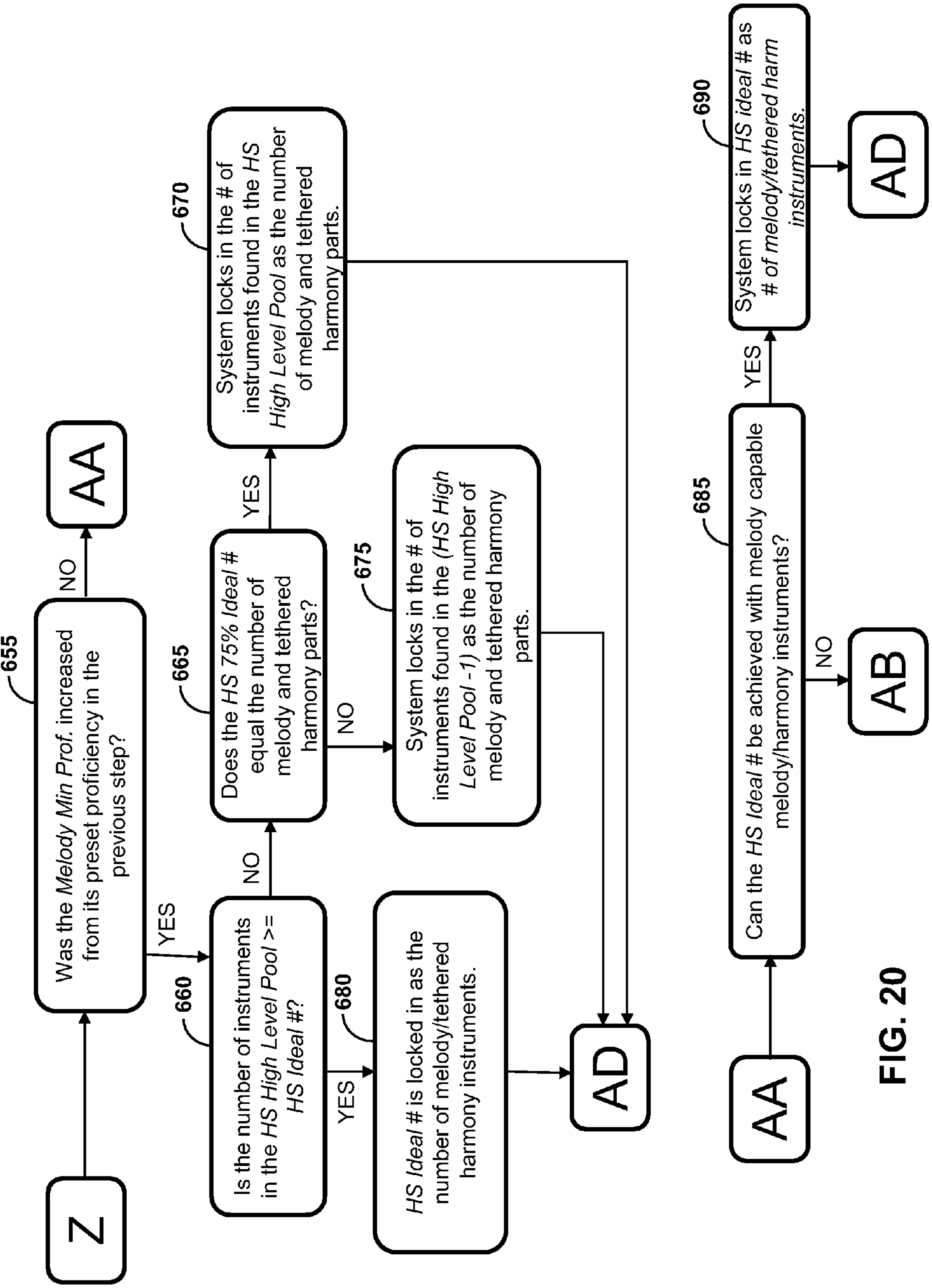
Figure 21:
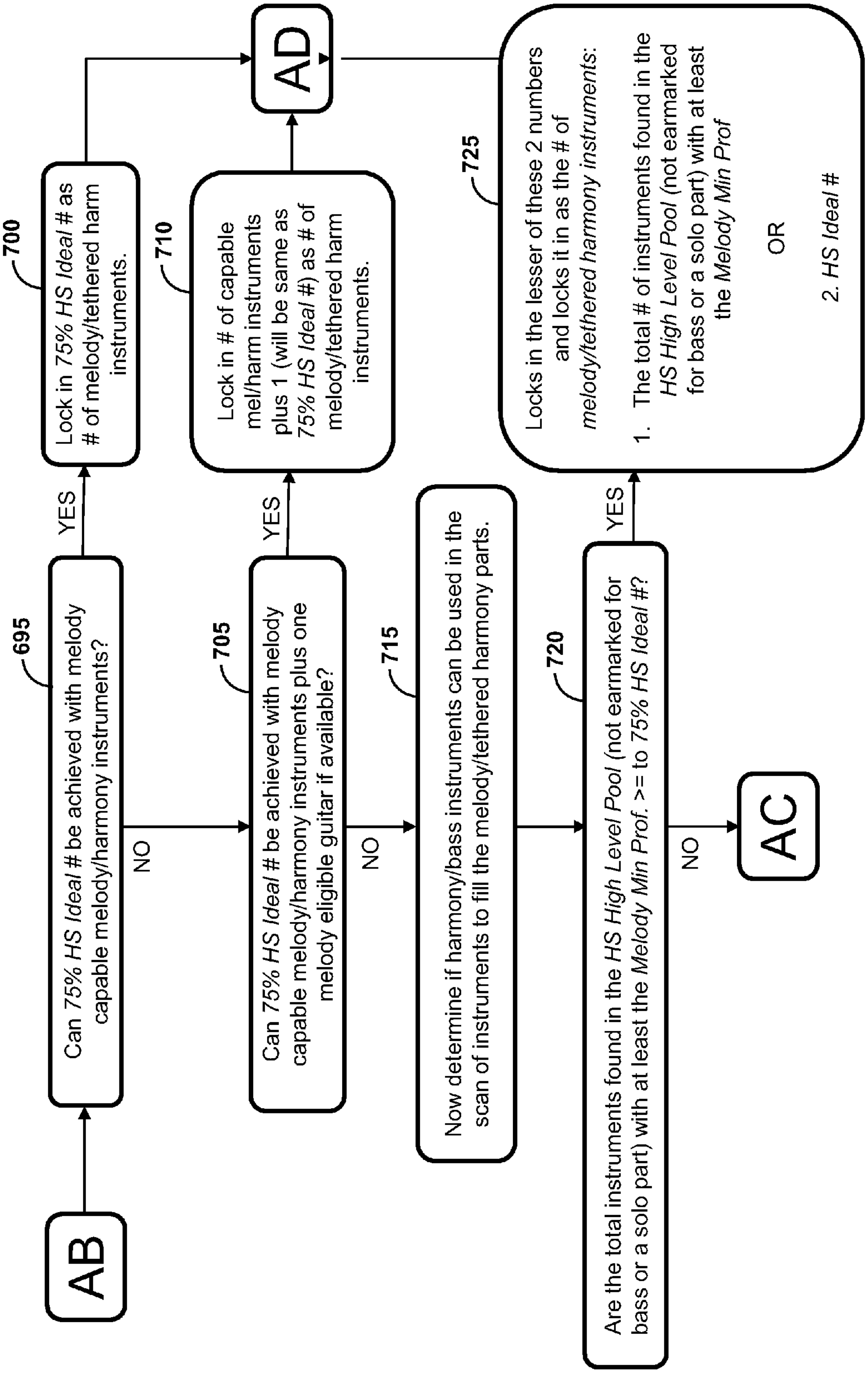

EL Process of Determining the Number of Instruments Playing Melody and Tethered Harmony Parts As shown in FIG. 16-FIG. 18, with the ideal percentage of instruments playing melody parts determined earlier (steps 325 through 335), the processed now focuses on determining how many actual instruments will be playing melody and tethered harmony parts (steps 515-615). Note that EL ensembles are not held to a minimum proficiency for Melody and Tethered Harmony parts, so the process is slightly different than that for HS ensembles, as will be seen.

Although the process strives to completely fill the melody and tethered harmony parts with an ideal number of instruments (step 525), a 75% fill rate is acceptable as the minimum, so long as it covers the actual number of melody and tethered harmony parts required to be assigned (step 540).

In step 550, the process determines if the number dedicated bass instruments equals the number of non-supplemental bass parts. Later, when bass parts are assigned, there are two types to choose from: Bass and Supplemental Bass. Supplemental bass parts are used to provide easier parts for lesser players (proficiencies 1 and 2) when higher level players (proficiencies 3+) are available. The goal is to not cause lesser player detract from what the better players are capable of playing by "dumbing down" all bass part players with low-rated parts. This optimizes the overall sound of those instruments playing bass parts, and enables each player to play to the best of their ability. Generally, no more than two non-supplemental bass parts will be assigned.

If the answer to step 550 is no, we look to harmony/bass instruments to cover these required bass parts (step 555). Any harmony/bass instruments that are deemed to be the best instruments to play bass parts are not included in the eligible pools of instruments that will be used to determine the number of instruments that should play melody and tethered harmony parts (step 560).

By the time steps 590, 595, or 600 are reached, the number of instruments that will be playing the melody and tethered harmony parts is determined. In step 595, it subtracts one to allow for a potential featured harmony part, which is addressed below.

HS Process of Determining the # of Instruments Playing Melody and Tethered Harmony Parts Turning now to FIG. 18-FIG. 22, the HS process starts out by determining the ideal number of instruments (steps 580-620) and the 75% figure (steps 625-650). In contrast to the EL version of this process, HS ensembles have a minimum proficiency for melody and tethered harmony parts (typically proficiency 3). It strives to find a scenario that works with a higher proficiency at the 75% figure before resigning to use the minimum proficiency.

The same process is used in steps 630 and 635 to determine which harmony/bass instruments can be considered in the process if there are not enough dedicated bass instruments available to cover the minimum number of non-supplemental bass parts.

In steps 655-725, the process attempts to identify scenarios that can work to achieve at least 75% of the ideal number of instruments playing melody and tethered harmony parts. These are the final attempts to achieve the 75% ideal number of instruments before requesting the user to intervene in order to continue.

Figure 22:
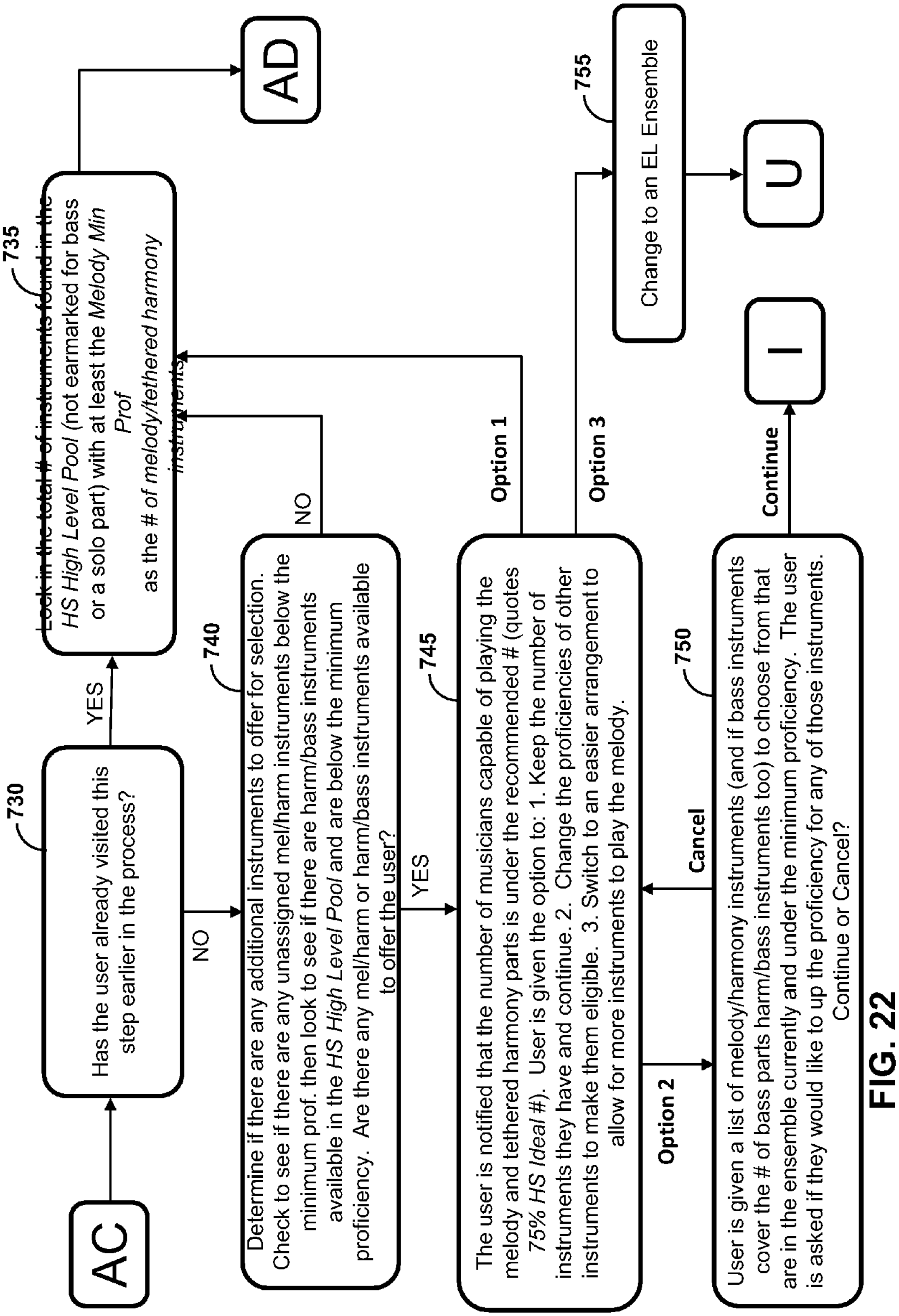

FIG. 22 concerns the scenario where the ensemble is unbalanced whereby a much fewer number than ideal instruments playing melody and tethered harmony parts. In this instance, the user is notified that there is a problem which must be addressed in order to continue. The options presented to the user are: 1) keep the number of instruments they have and continue; 2) change the proficiencies of other instruments to make them eligible; or 3) switch to an easier arrangement to allow for more instruments to play the melody (steps 730-750).

Note that if the user elects to change to an EL ensemble or instrument proficiencies, the process may return to this point with the same issues. Step 730 is in place to ensure that, if the process returns to this section of the logic for a second time, the user is not prompted for any actions and instead the process continues with the selections already made.

Totaling the Number of Non-Tethered Harmony and Bass Instruments

Figure 23:
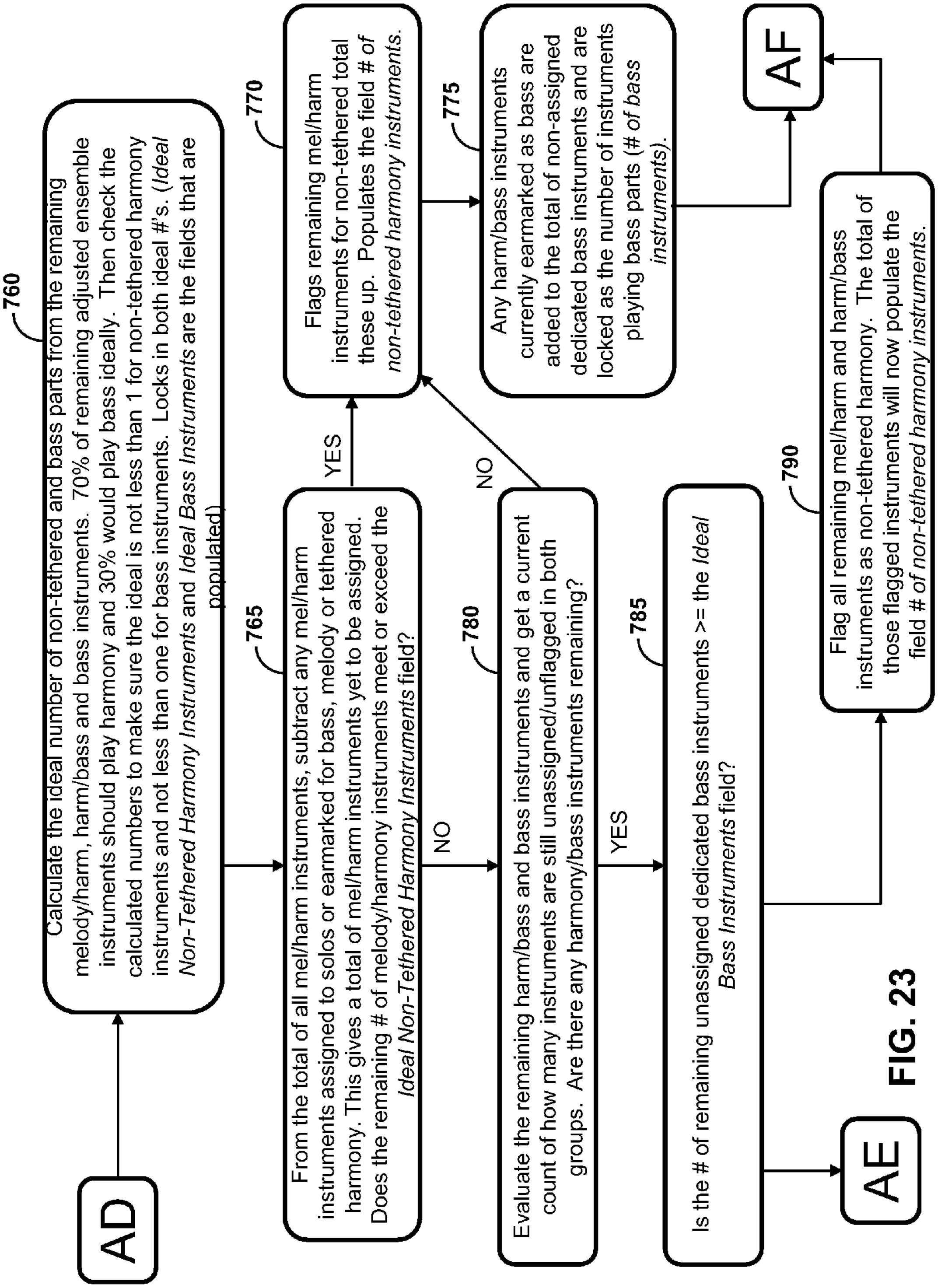
Figure 24:
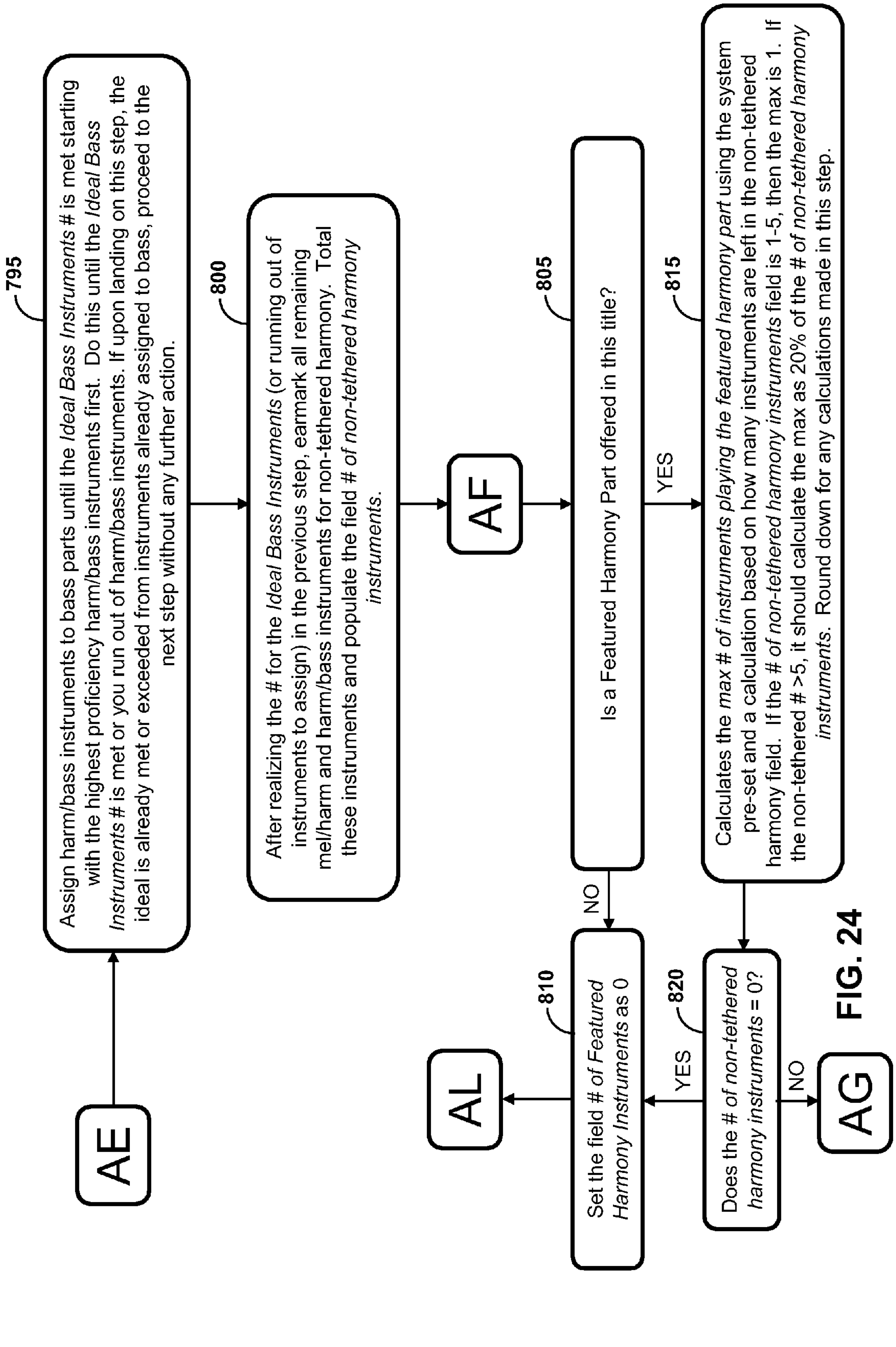
Figure 25:
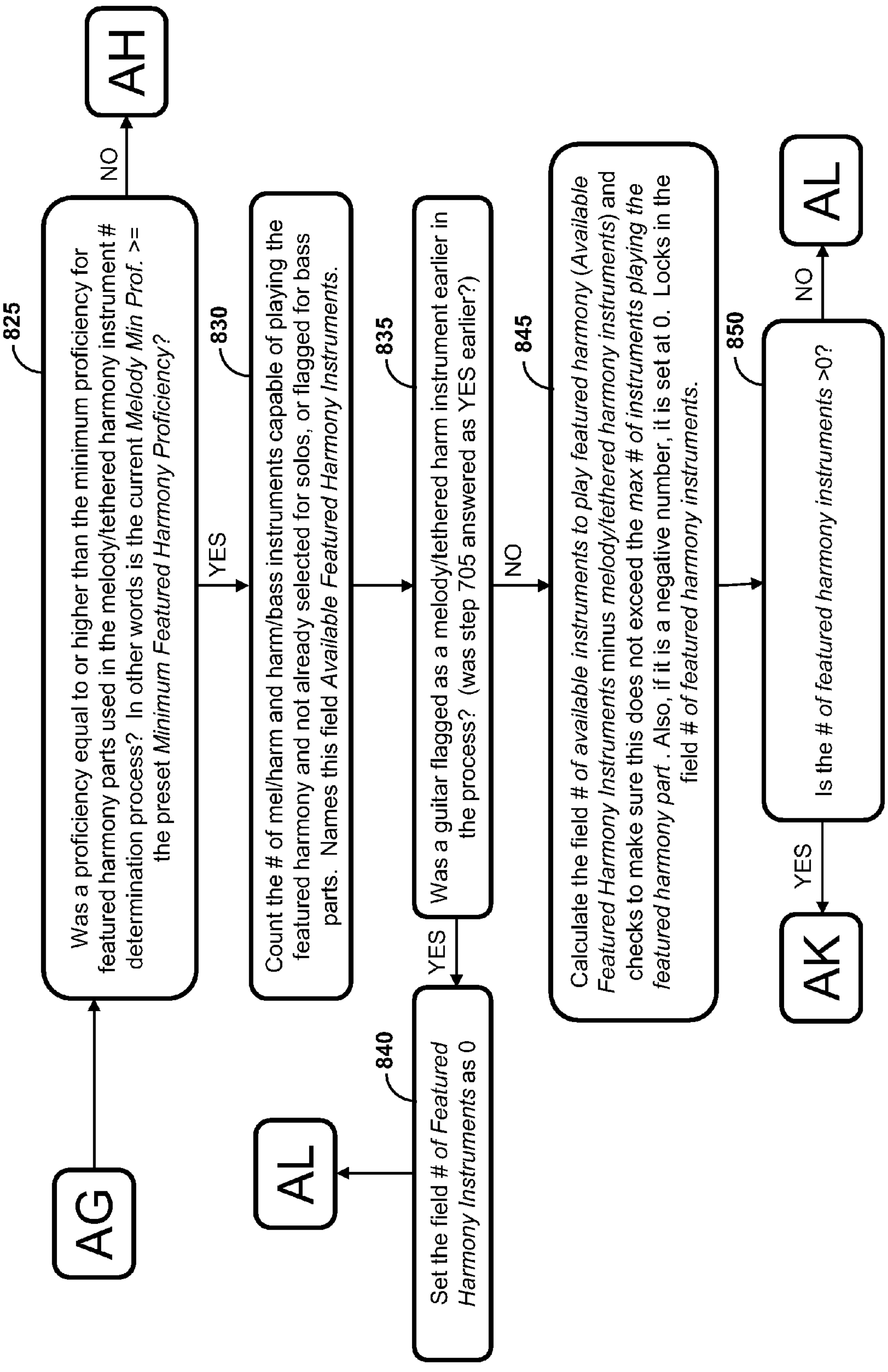
Figure 26:
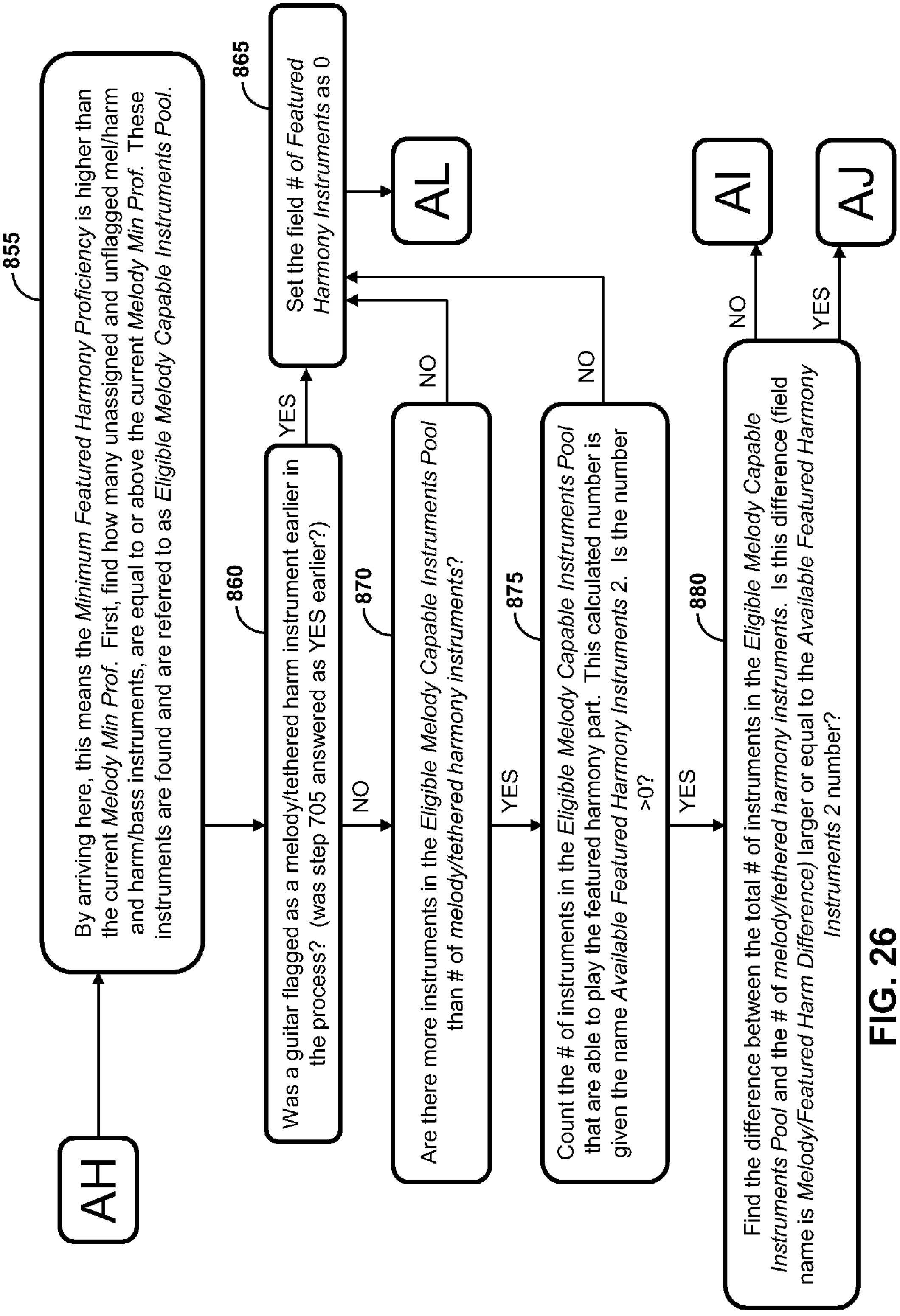
Figure 27:
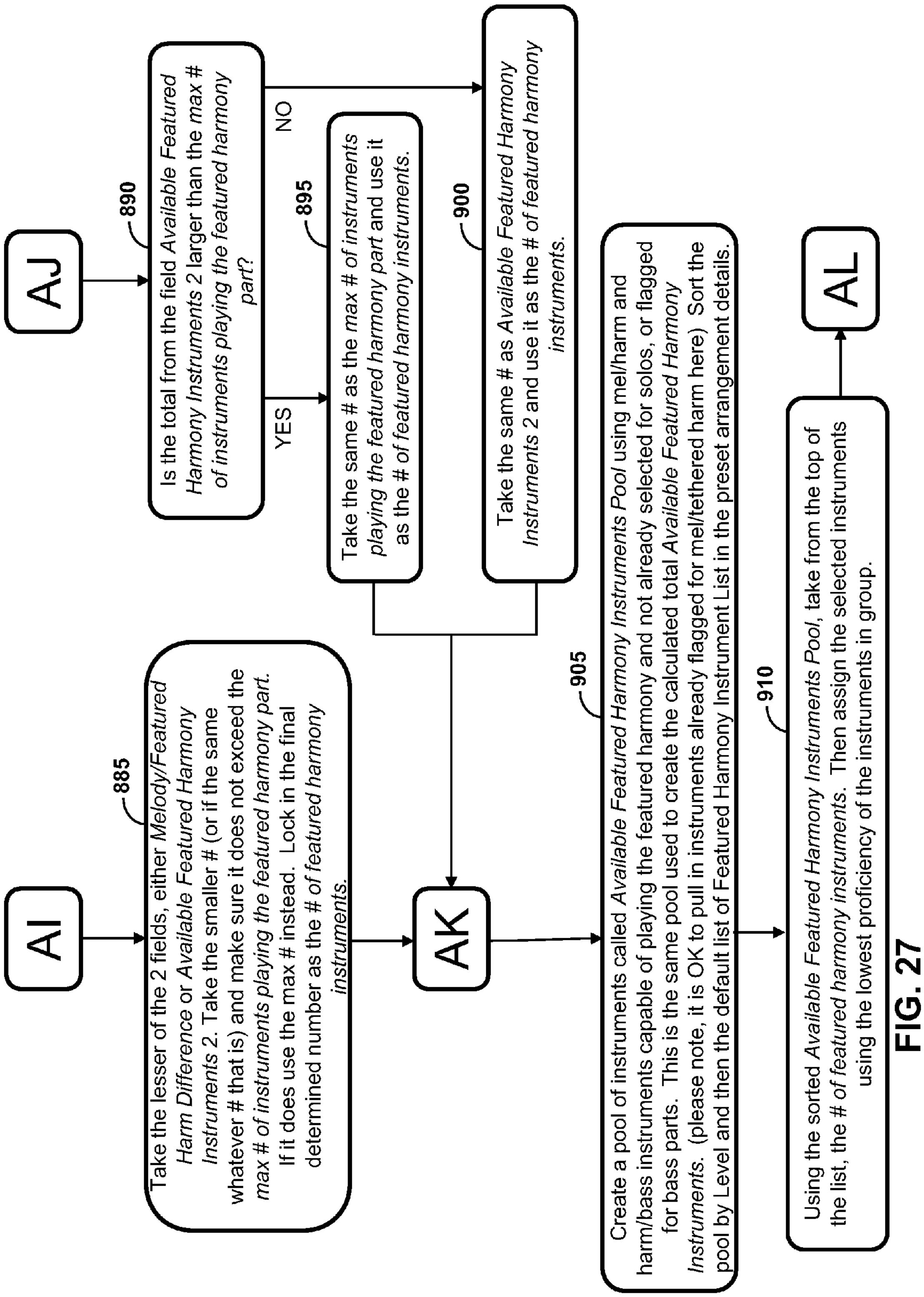

With reference now to FIGS. 23-24, in steps 760-820, the number of non-tethered harmony instruments and bass instruments is established. "Non-tethered harmony" is a term to describe any type of harmony part that is not tethered to the melody. At this point in the process, it is known how many instruments which typically do not play bass parts are now assigned to play bass parts, how many instruments are assigned to solo parts, and how many instruments are assigned to play melody and tethered harmony parts. Non-tethered harmony parts may be featured in harmony parts, level one harmony parts, and regular harmony parts.

In step 760, ideally, 70% of the remaining adjusted ensemble instruments will play harmony and 30% will play bass. Ensure at least one non-tethered harmony instrument and at least one bass instrument is assigned. In steps 765-790, the running count of available instruments to be assigned is determined, e.g., harmony, melody, and bass instruments that are not assigned to a tethered harmony part. In step 795, harmony/bass instruments are assigned to pass parts, fulfilling the highest-proficiency parts first.

Featured harmony parts are reserved for high proficiency performers that will play a featured line that is not the main melody, nor is considered a solo.

Level 1 harmony parts are used only in HS ensembles and are reserved for very low-rated players. This enables low rated player to contribute to the ensemble, without bringing down higher level players who would typically be very bored with such a part. Regular Harmony parts vary in number and can be played by any proficiency in EL settings and by instruments with a 2+ proficiency in HS settings.

By the end of step 800 it is clear how many instruments will be playing non-tethered harmony parts, and as a result, how many instruments will be playing bass parts because that is the last category before keyboard, guitar, pitched percussion, standard percussion, and other categories are considered.

In steps 805 through 910 (FIGS. 24-27), it is determined how many instruments will be assigned to any featured harmony part in current composition. Because featured harmony parts require a higher minimum proficiency than melody parts, an instrument available for a featured harmony part is, by default, at a high enough proficiency to play melody and tethered harmony parts. Consequently, any instruments assigned to a featured harmony part should not impede being able to assign the number of instruments determined for melody and tethered harmony parts later in the process. By the end of step 910, any instruments that will be assigned to the featured harmony part will be assigned.

Assigning Extras

Figure 28:
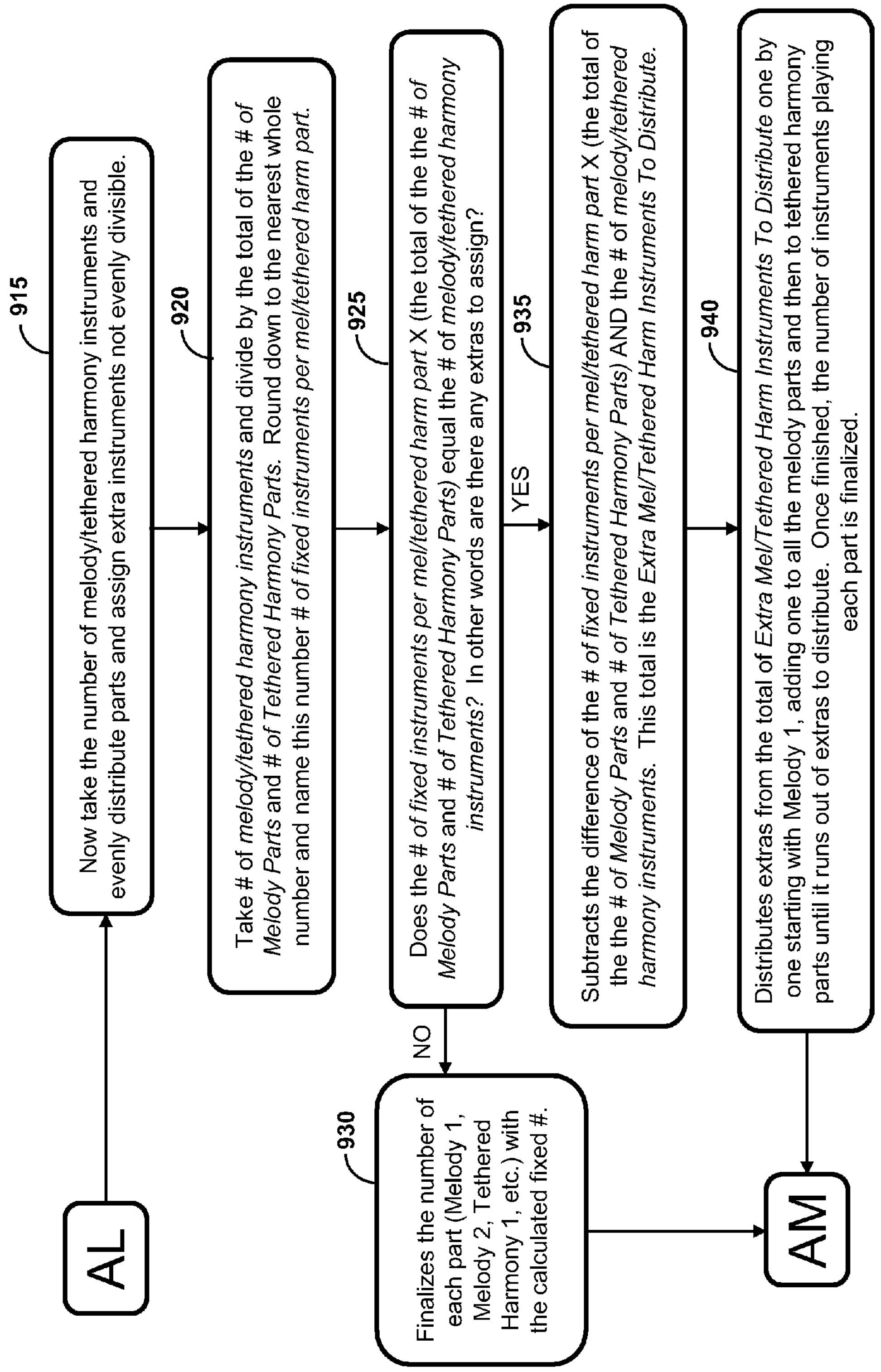
Figure 29:
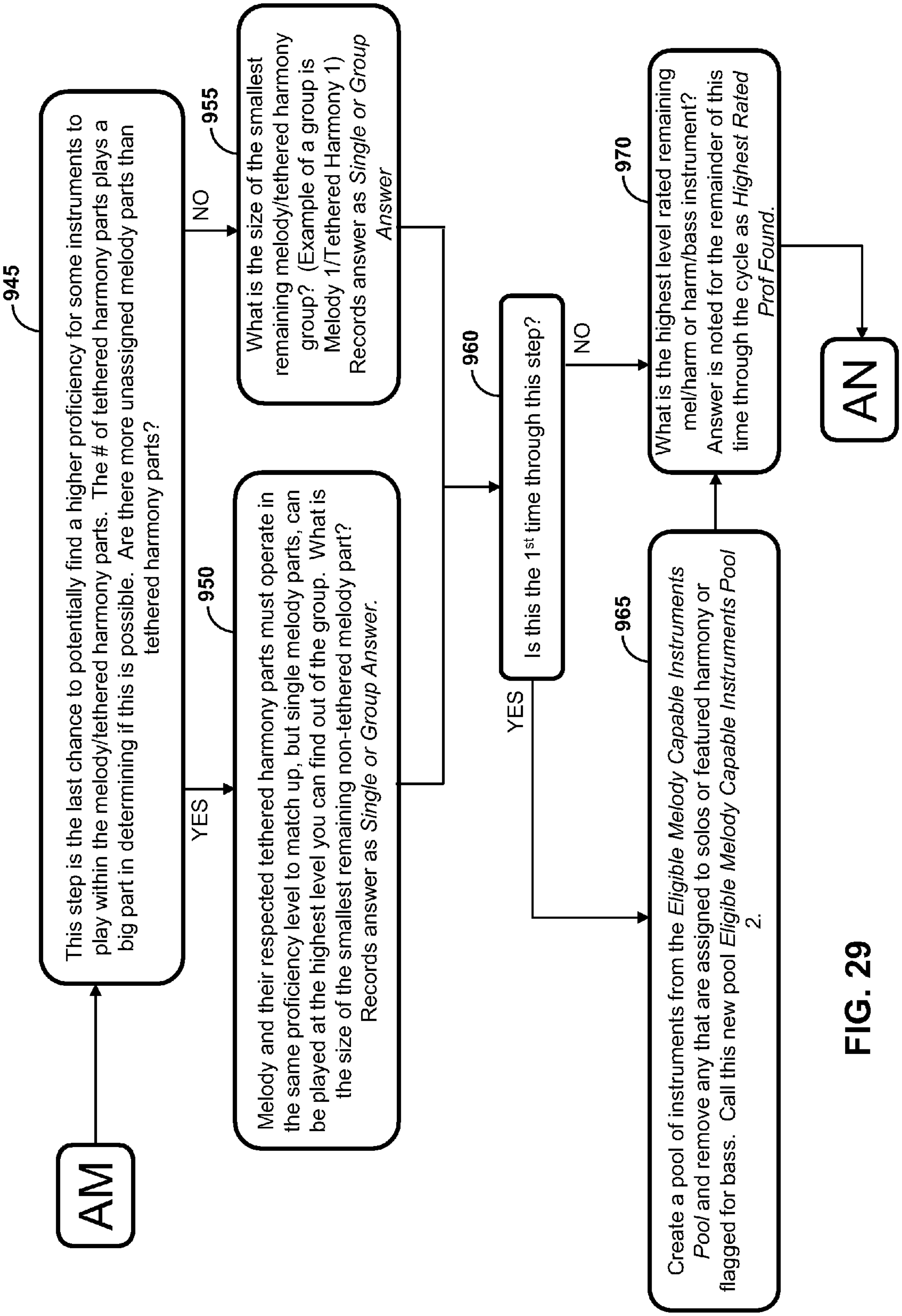
Figure 30:
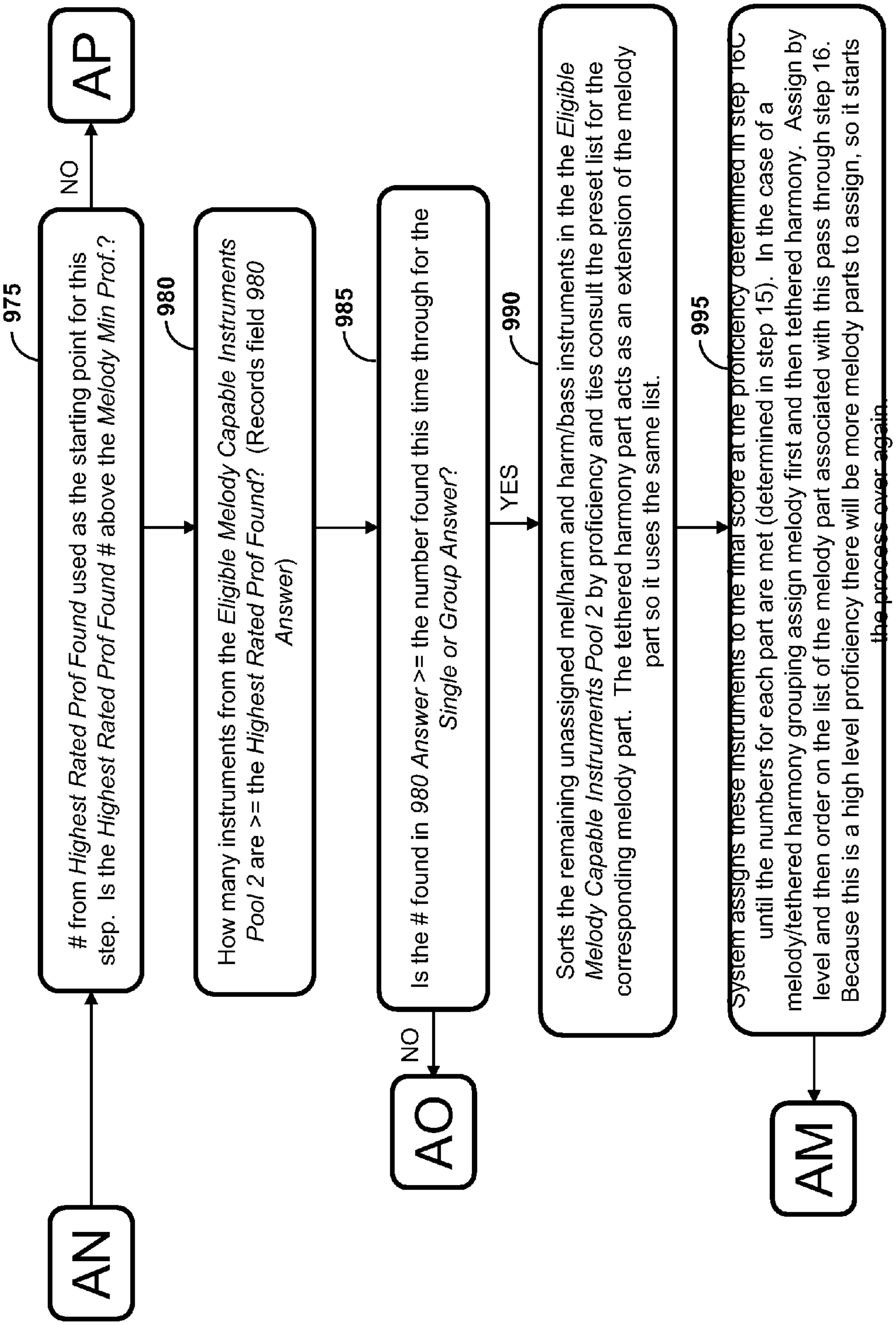
Figure 31:
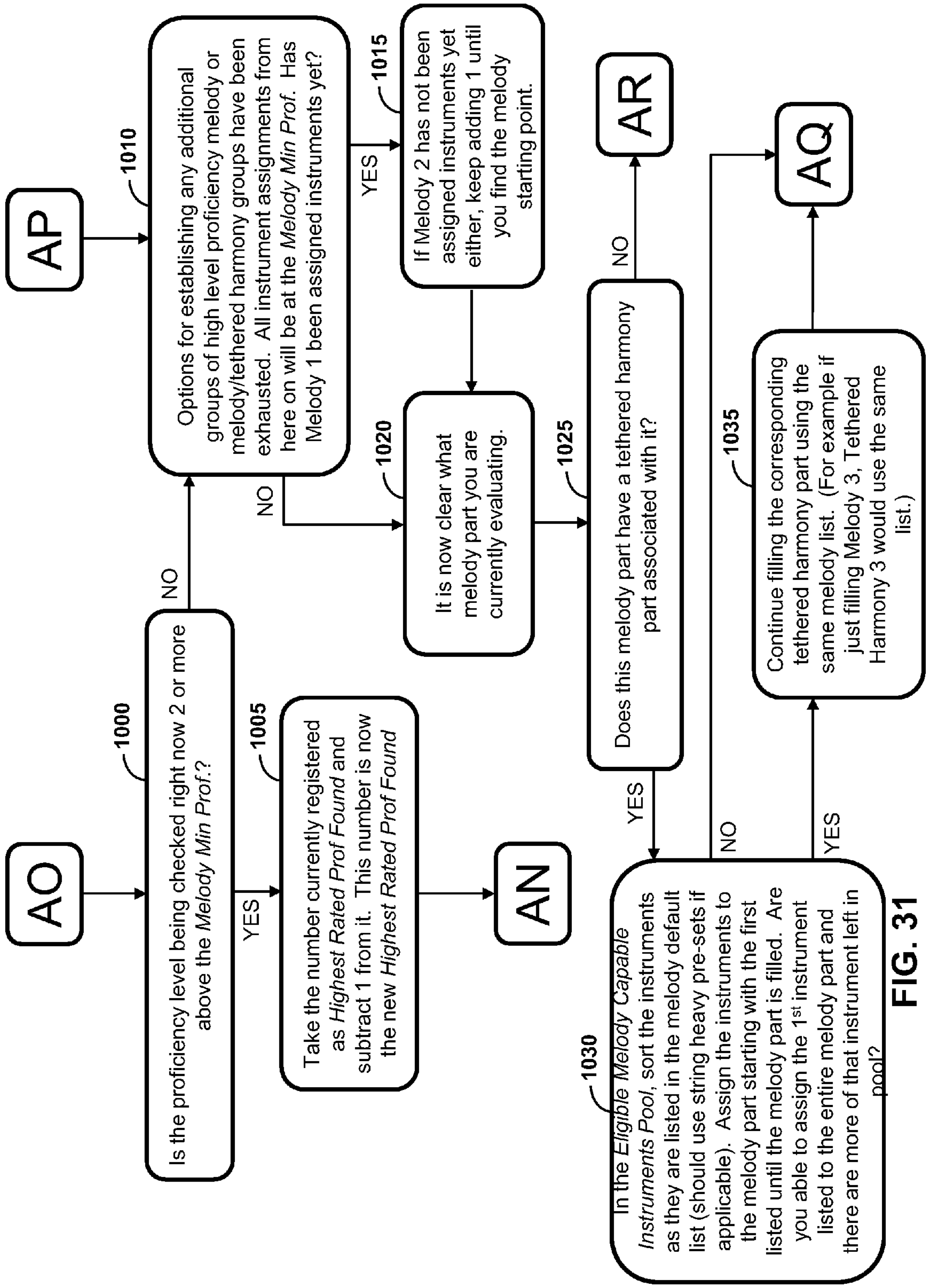
Figure 32:
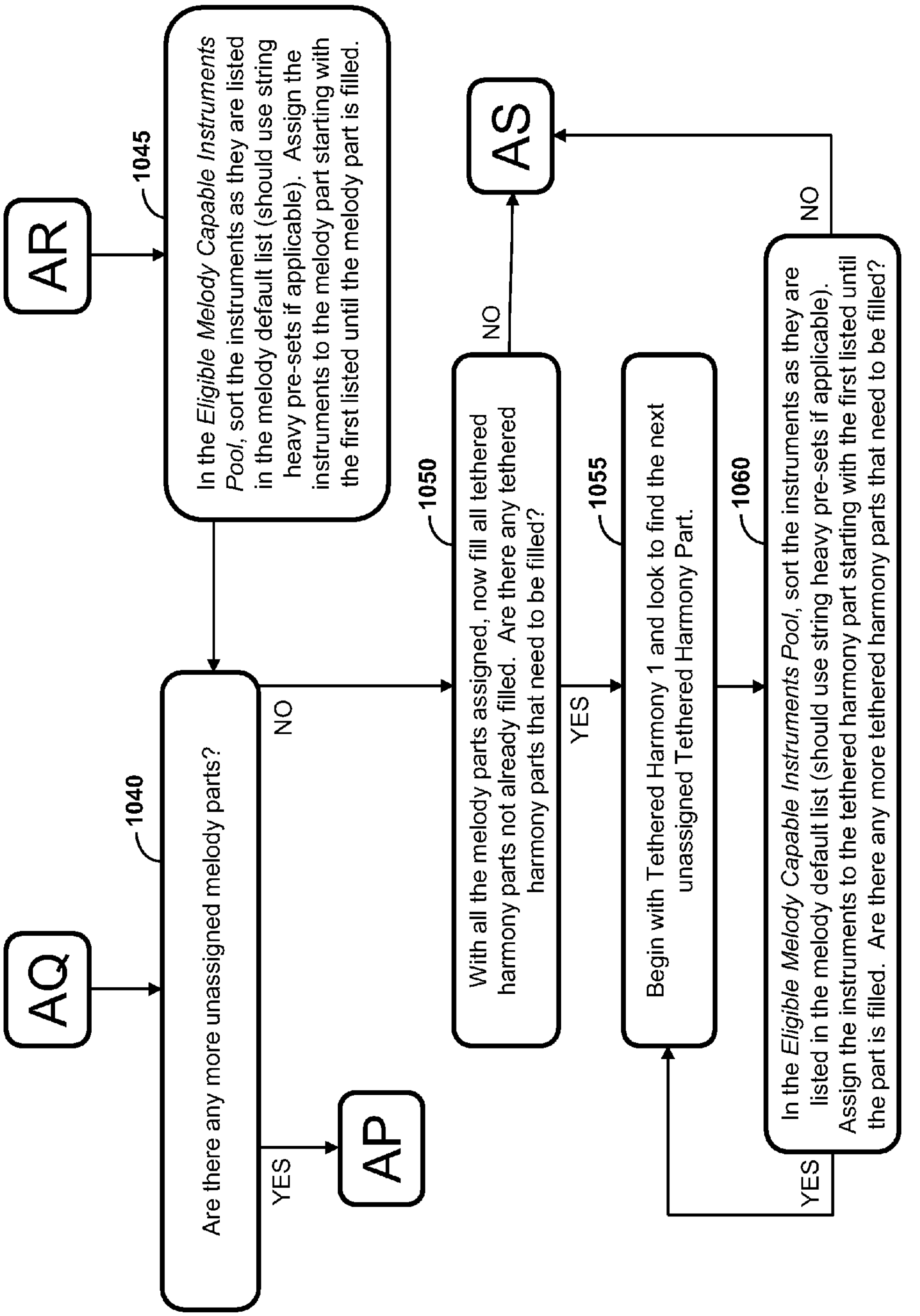

The steps 915-940 detailed in FIG. 28 seek to determine the number of melody instrument versus tethered harmony instruments from the number of melody and tethered harmony instruments. By the end of step 940, we know the total number of instruments in each individual melody and tethered harmony part. For example, and without limitation, Melody 1 has 3 instruments, Melody 2 has 3 instruments, Tethered Harmony 1 has 3 instruments, and Tethered Harmony 2 has 2 instruments. In this example, the fixed number of instruments per part would be 2 and the number of extras would be 3.

Assigning Instruments to Melody and Tethered Harmony Parts

Referring to FIGS. 29-32, before assigning instruments to each melody or tethered part, the process first checks to determine if there can be a group that uses high rated players who are above the minimum required (steps 945-970). If high-rated players can be sorted together, this trumps the need to sort pre-set instruments together, because a higher proficiency than the minimum required can be achieved. This will give the ensemble a more professional sound, since the melody will be played at the very highest proficiency possible with the ensemble (steps 975-995). As discussed above, when tethered harmony parts are used, they must match the proficiency of the corresponding melody part. For example, if the Melody 1 part is being performed at proficiency 4, Tethered Harmony 1 must also be performed at proficiency 4 so the parts match up. The process surveys the number of instruments in each melody, and if applicable, the corresponding tethered harmony part, and identifies the grouping with the lowest total number of instruments. For example if Melody 1 has 3 instruments, Tethered Harmony 1 has 3 instruments, and Melody 2 has 3 instruments but no tethered harmony part. The smallest grouping is Melody 2 with 3. Melody 1 would be considered to have 6 instruments.

With the smallest group determined, the process attempts to determine if the possibility exists to achieve a small group of instruments with a proficiency above the earlier determined minimum melody proficiency (steps 1000-1035). If not, the system focuses on assigning instruments to melody and tethered harmony parts based on a combination of proficiency and the instrument order lists associated with each melody part. Tethered Harmony parts follow the same instrument lists as their corresponding melody part (steps 1040-1060). By the end of FIG. 32, instruments have been assigned to all melody and tethered harmony parts.

Assignment of Instruments to Non-Tethered Harmony Parts

Figure 33:
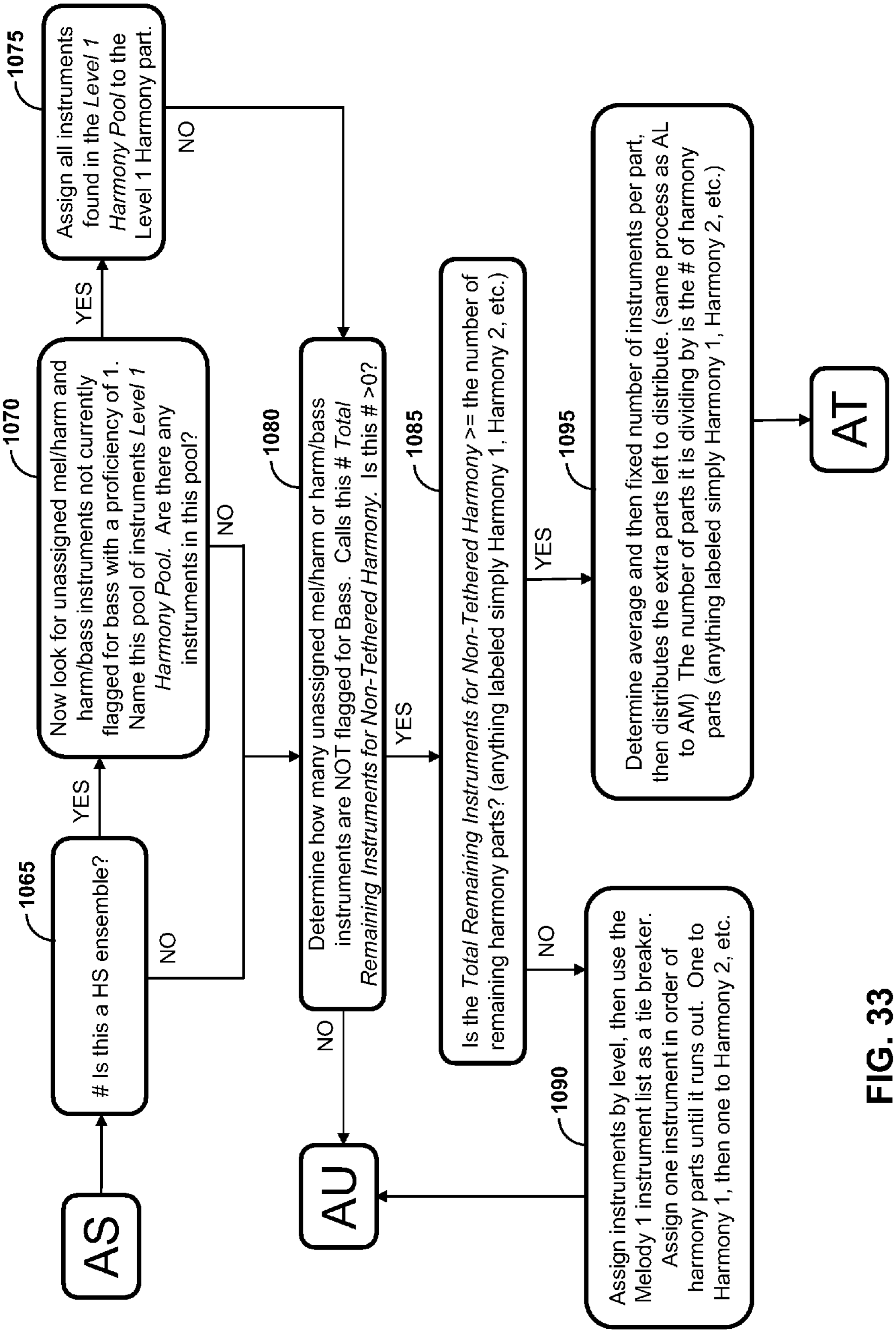
Figure 34:
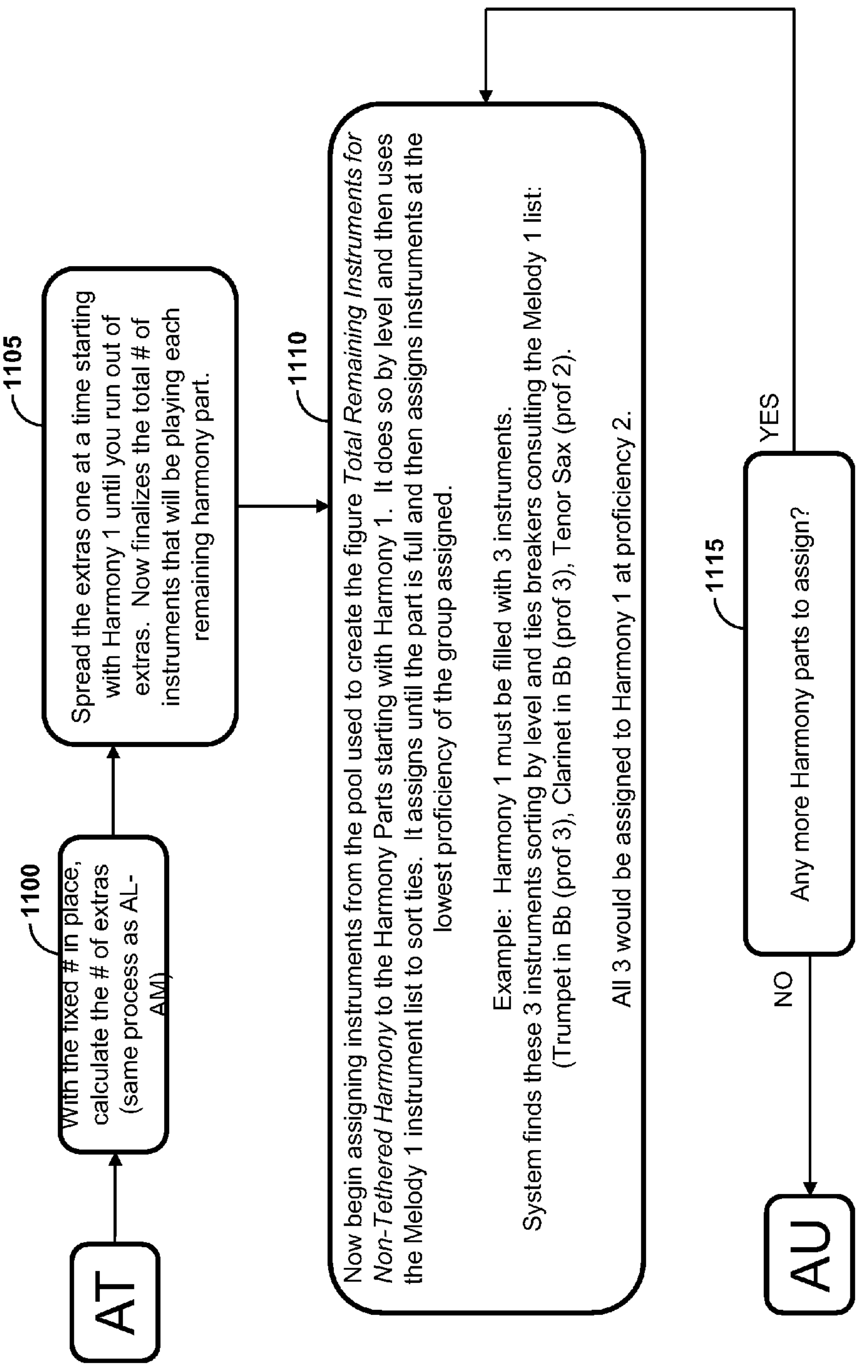
Figure 35:
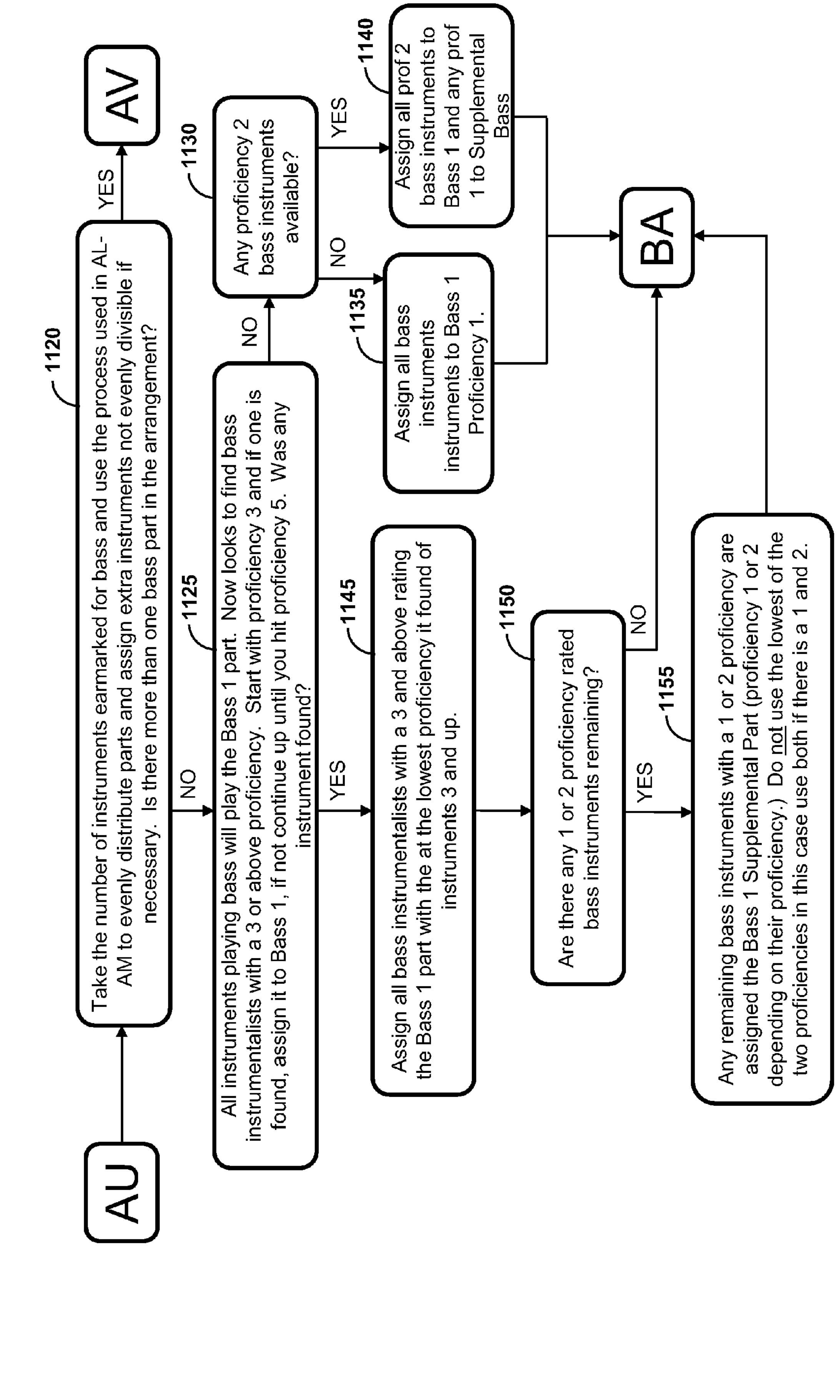
Figure 36:
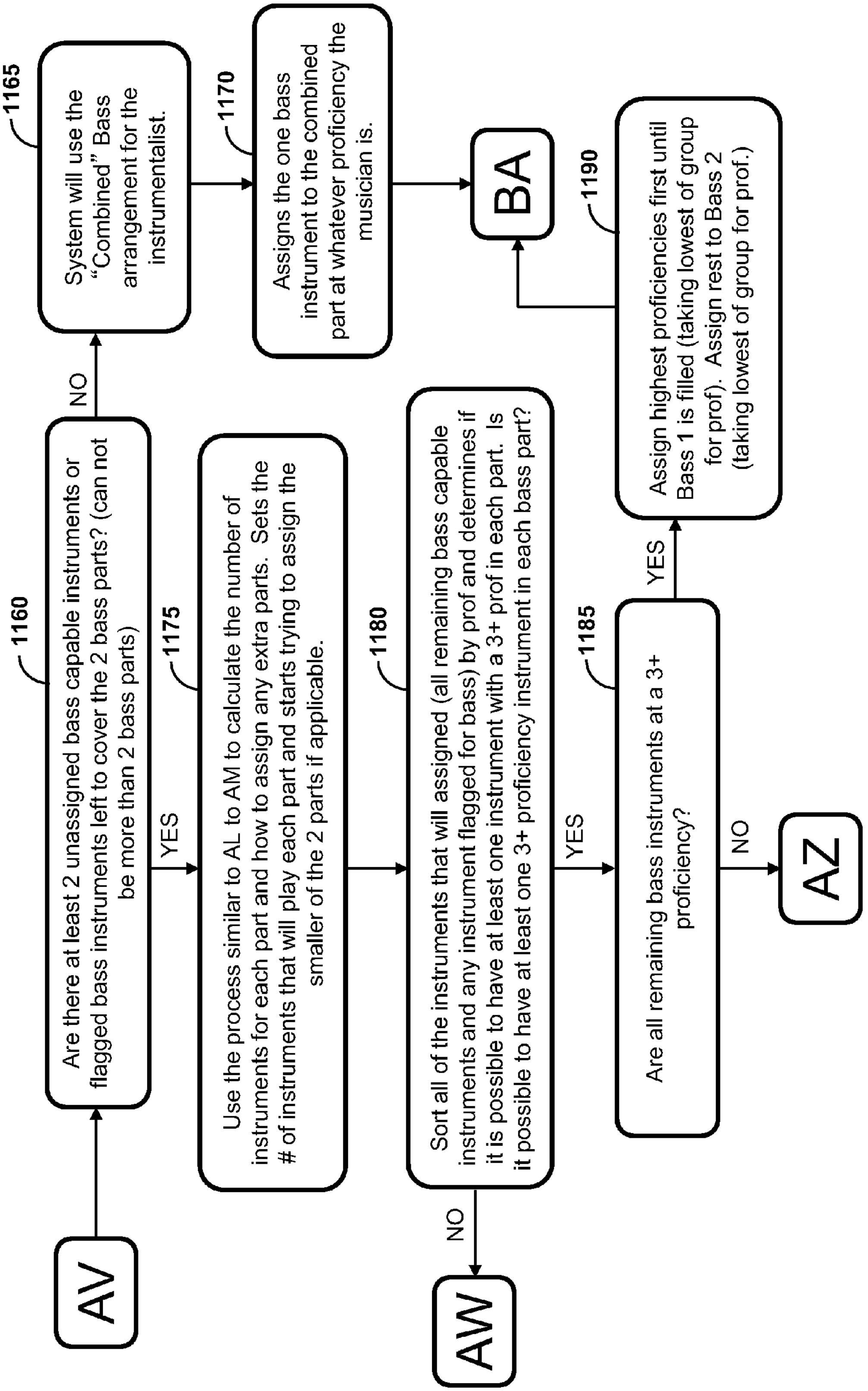
Figure 37:
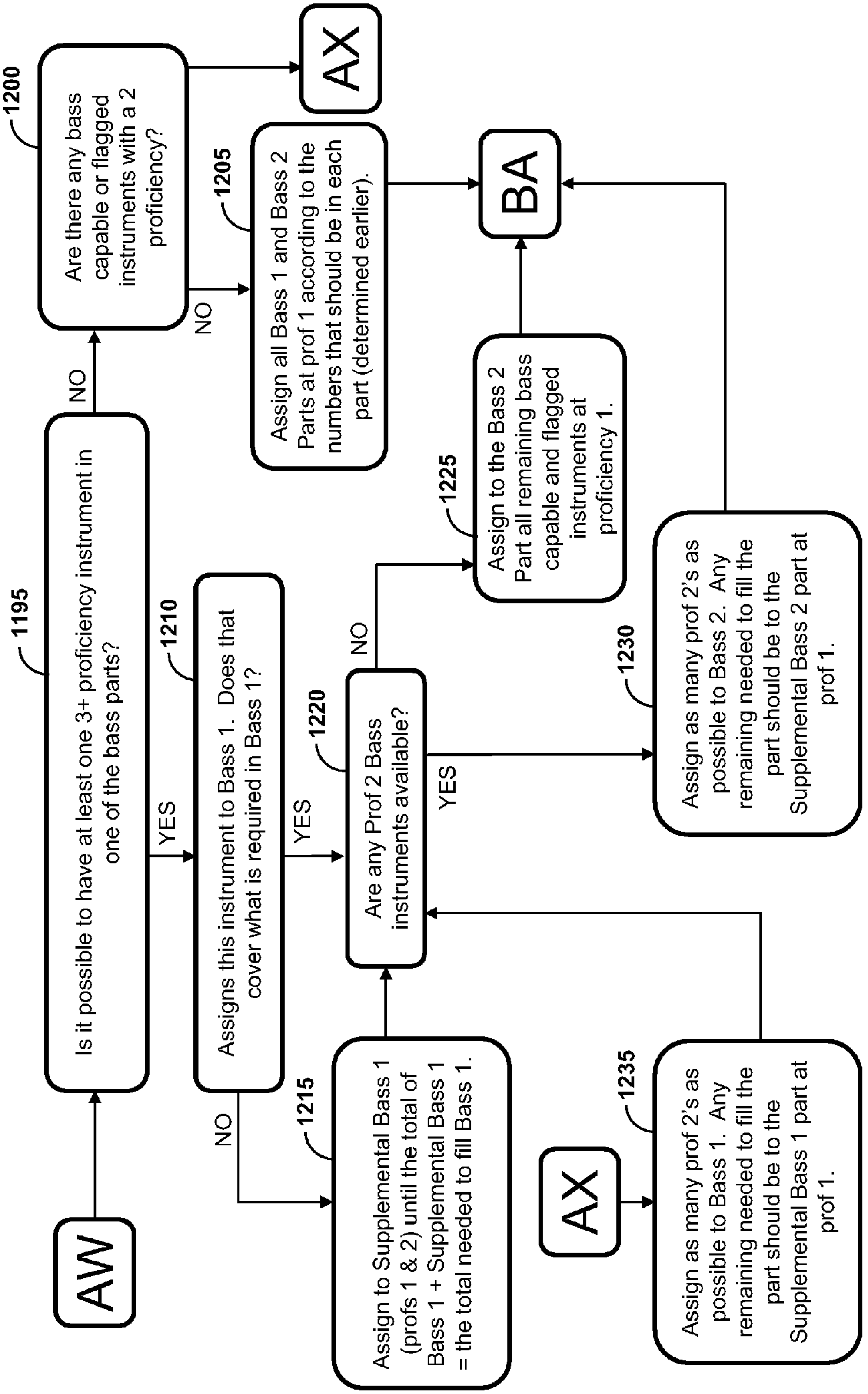
Figure 38:
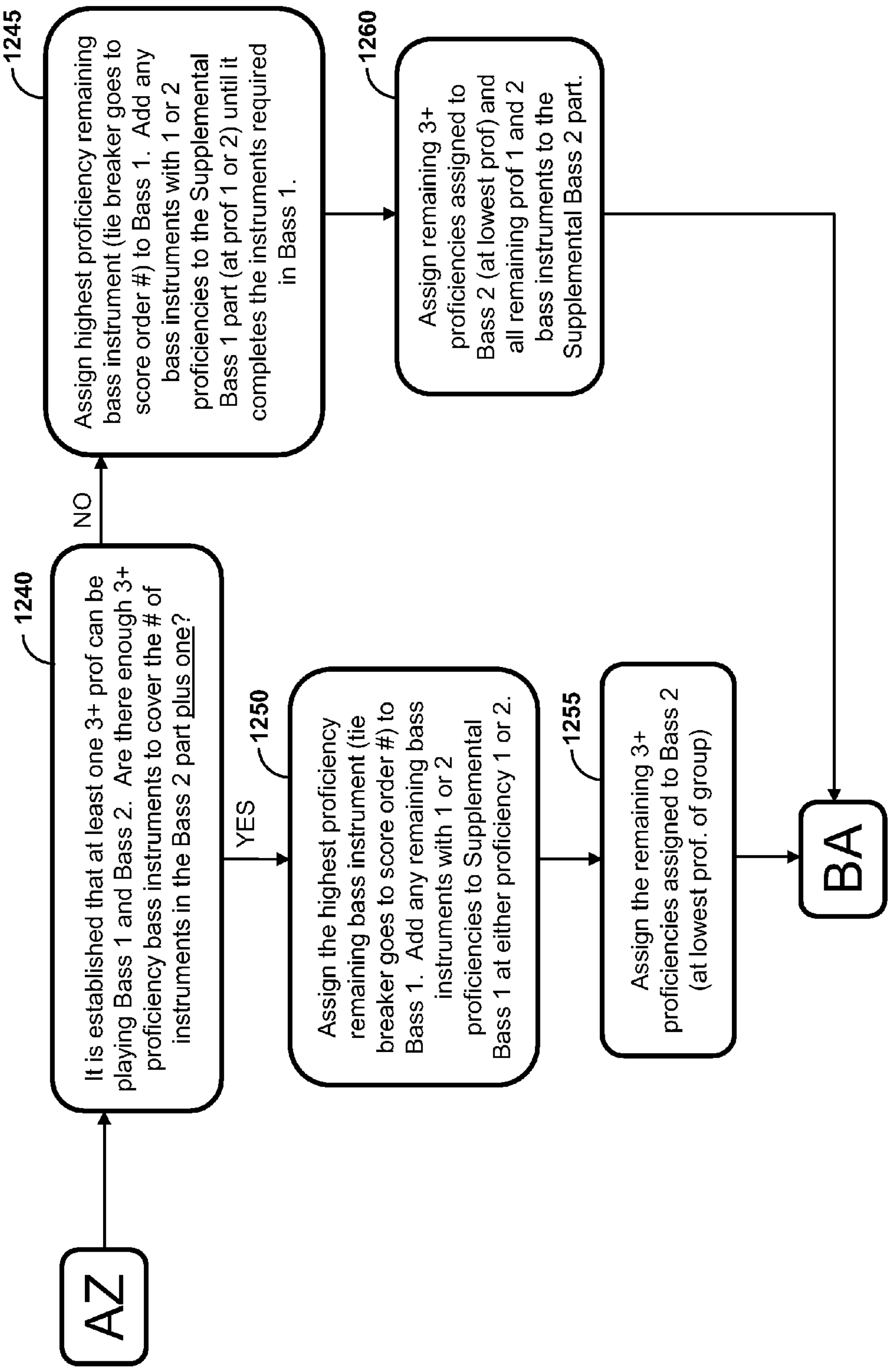

With reference to FIGS. 33-34, wherein instruments are assigned to non-tethered harmony parts, steps 1065-1075 address HS ensembles. Typically, only HS ensembles have a specific non-tethered harmony part dedicated to instruments with a proficiency of 1. The Level 1 Harmony part is assigned to any remaining melody/harmony or harmony/bass instruments which were not already assigned or flagged for bass earlier.

The remaining portion of FIGS. 33-34 (steps 1080-1115) deals with the determination of the number of instruments in each remaining regular harmony part, and then assigning instruments to each of those parts. It uses a similar process for calculating a fixed number and assigning extras (e.g., as seen in FIG. 28) but here the number of parts is the number of regular melody parts and the number of instruments is the remaining unassigned/unflagged melody/harmony and harmony/bass instruments.

If the number of parts exceeds the number of available instruments (step 1085), each harmony parts, starting with Harmony 1, is assigned one instrument until no more instruments remain. By the end of step 1115, the process is complete and there should be no remaining unassigned or unflagged melody/harmony or harmony/bass instruments remaining.

Assignment of Bass Parts

With reference now to FIGS. 35-38, the last major group of instruments to be assigned is bass instruments. First, it is determined whether one or two non-supplemental bass parts need to be assigned (step 1120). If there are two, it is determined how many instruments will be assigned to each part. The objective of this section is to assign players with at least a 3 proficiency to play the non-supplemental bass parts, and instruments with a 1 or 2 proficiency to play the supplemental bass parts (steps 1125-1190).

Supplemental Bass parts are used where there exists one or more instruments with a 3+ proficiency assigned to the corresponding non-supplemental bass part. If no instruments with a 3+ proficiency are available, instruments with a 1 or 2 proficiency will instead be assigned to the non-supplemental part. For example, if there is only 1 bass part and there are 3 instruments (a proficiency 1, a proficiency 2, and a proficiency), the proficiency 3 instrument will play the non-supplemental part, and the other two will play supplemental parts (steps 1195-1260). It should be noted that, while non-supplemental parts are played at the lowest proficiency instrument of the group if more than one are assigned, supplemental parts can be assigned at proficiency 1 or 2 and can be intermixed.

Assignment of Percussion Parts

Figure 39:
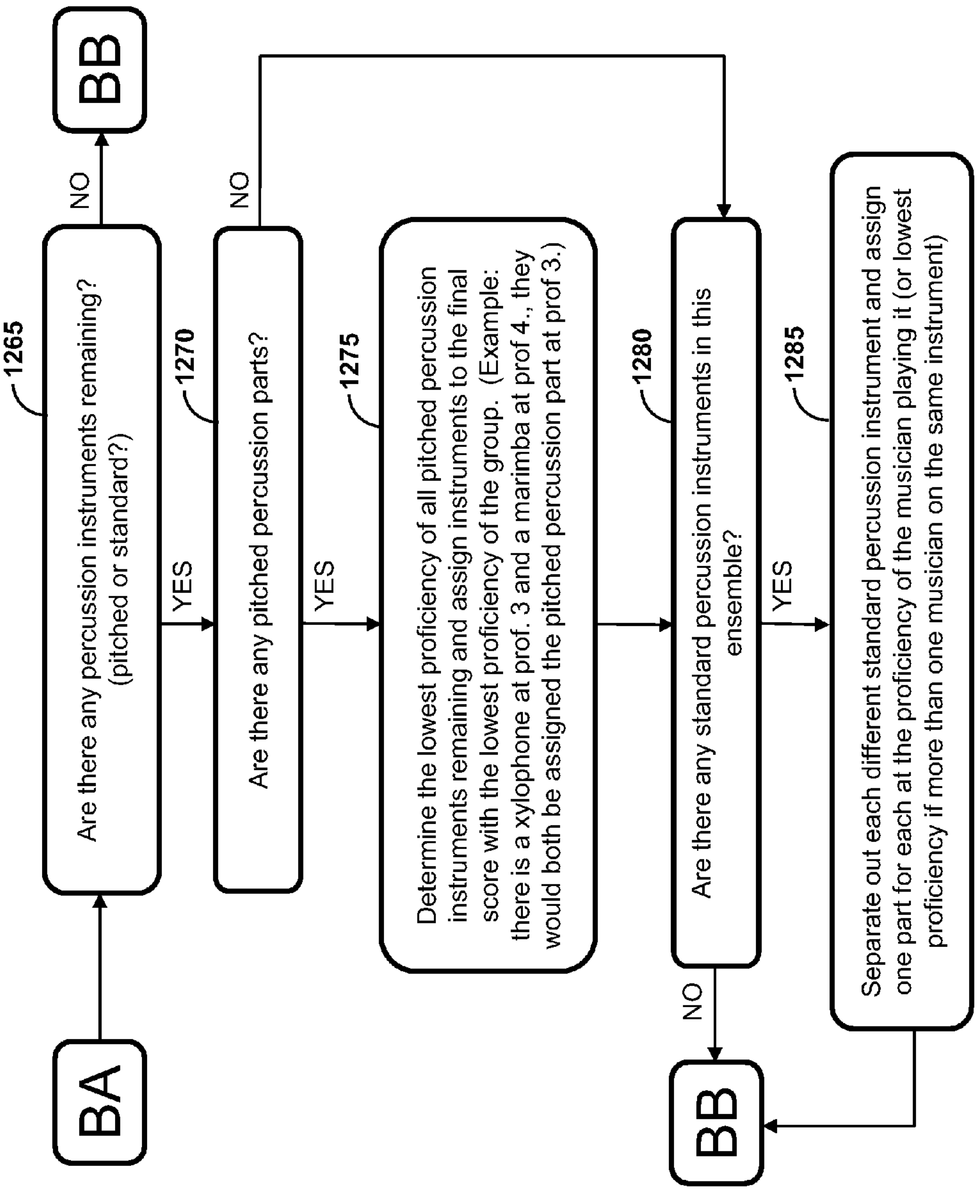

Percussion parts are now assigned (FIG. 39). Percussion instruments that are assigned can be at any level, but only one part is generated per instrument, and should be assigned beginning at the lowest proficiency if the instrumentalists are at different levels (steps 1265-1275).

For example: If there are 2 drum set musicians, and one is at level 3 and another is at level 4, one drum set part will be generated at level 3.

If there is a drum set at level 4, a bass drum at level 2, and a snare drum at level 5, each would get their own part at the level selected. Pitched percussion instruments play the same part at the lowest proficiency level. Parts are generated for the different instruments however (steps 1280-1285). For example: If there is a vibraphone at level 3 and a marimba at level 4, they will each get a part labeled with their instrument at level 3. It is important to note that Glockenspiel has been removed from the pitched percussion category because it often arranged very differently than other pitched percussion instruments.

Assignment of Guitar, Keyboard and Other Instrument Categories

Figure 40:
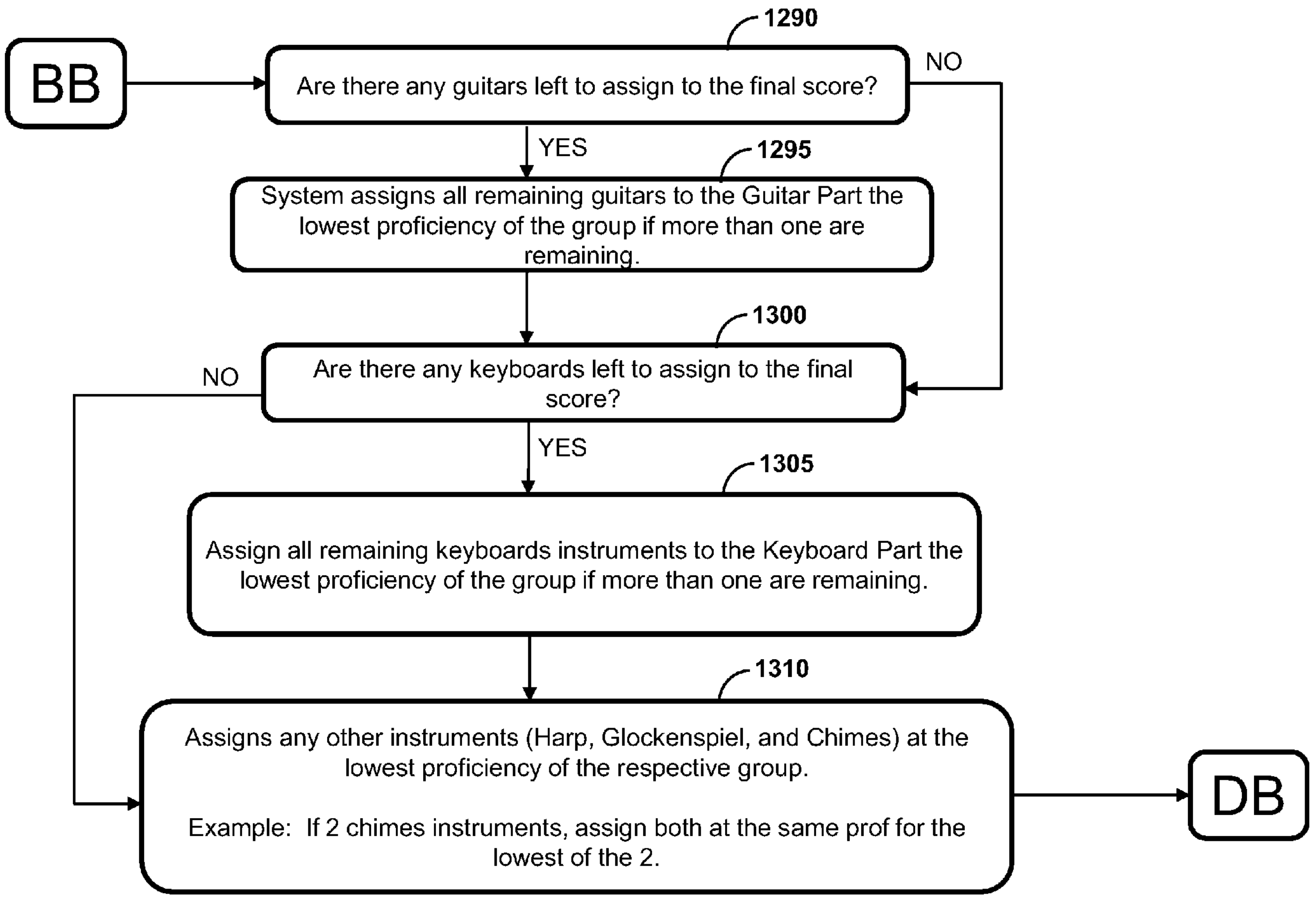

In FIG. 40, any unassigned guitars remaining are assigned. If more than one guitar remains, the lowest proficiency instrument of the group is assigned (steps 1290-1295). For example, if there are two guitars remaining (an electric guitar at proficiency 4 and an acoustic guitar at proficiency 3), the results would be assigning guitar parts as follows: Electric Guitar: proficiency 3; Acoustic Guitar: proficiency 3.

Note that tablature (TAB) instructions for guitar or other fretted instruments are available as part of the arrangement parameters, so if TAB has been selected for the Electric Guitar, the TAB version of the guitar part would be used in place of standard music notation, and which in the present example would be assigned to the Electric Guitar at proficiency 3.

Keyboards are next to be assigned (steps 1300-1305). As in previous steps, the lowest proficiency sets the proficiency for the group if there is more than one.

Figure 79:
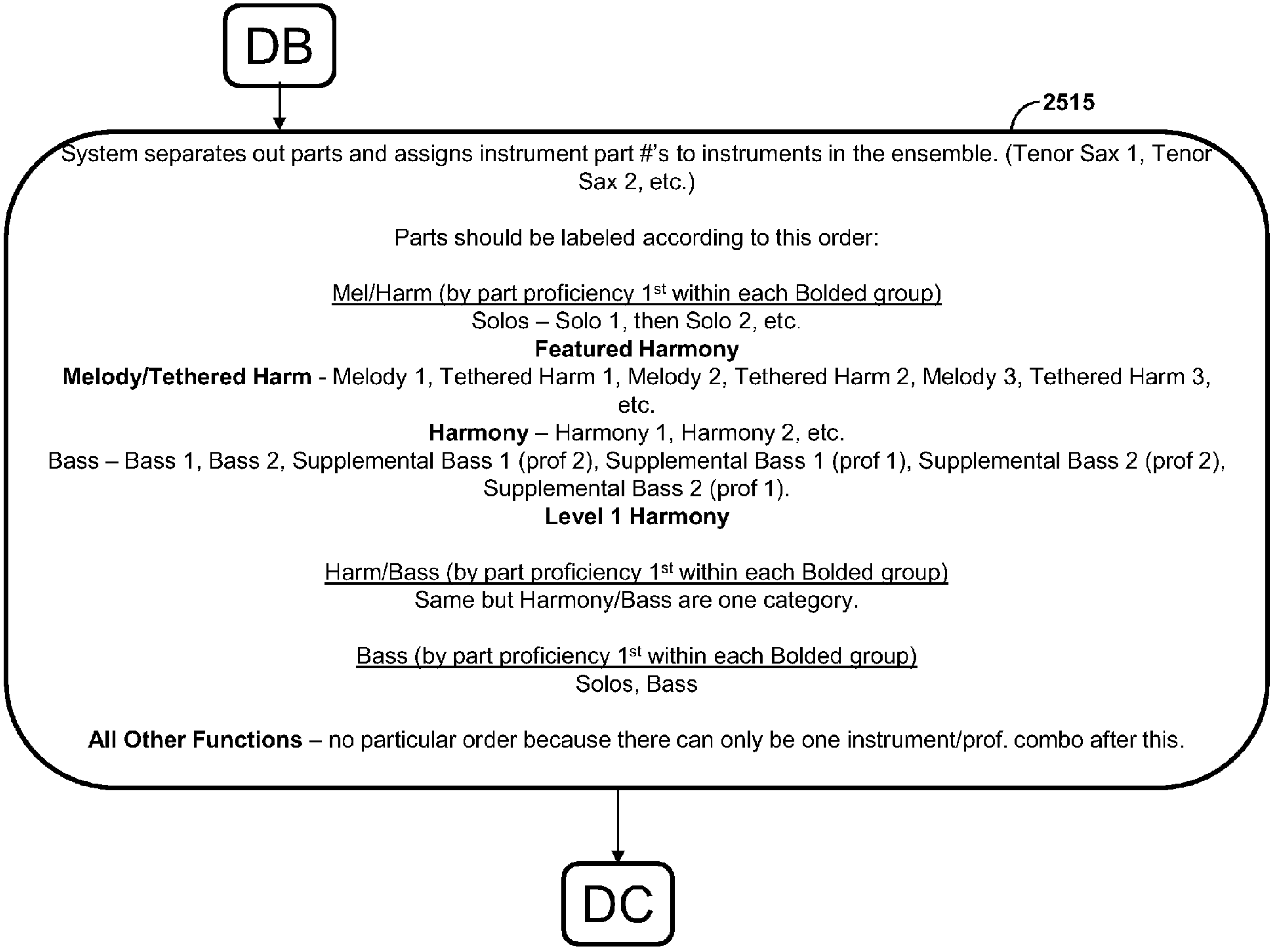

Lastly, any remaining instrument groups such as Glockenspiel, Chimes, and Harp are assigned (step 1310). With all instruments now assigned, the process continues with step 2515 (FIG. 79).

Overview of SL Ensembles

Figure 41:
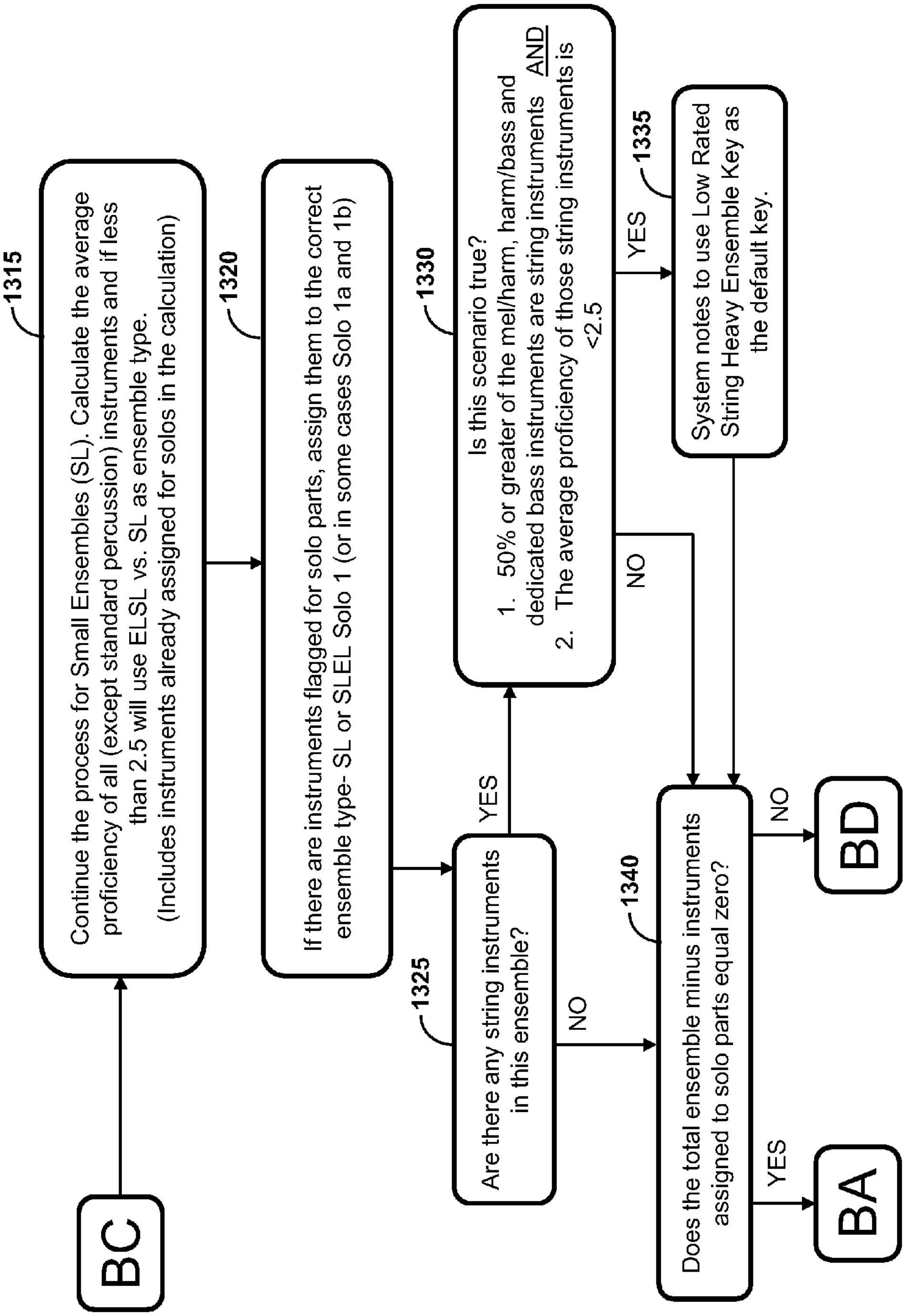
Figure 42:
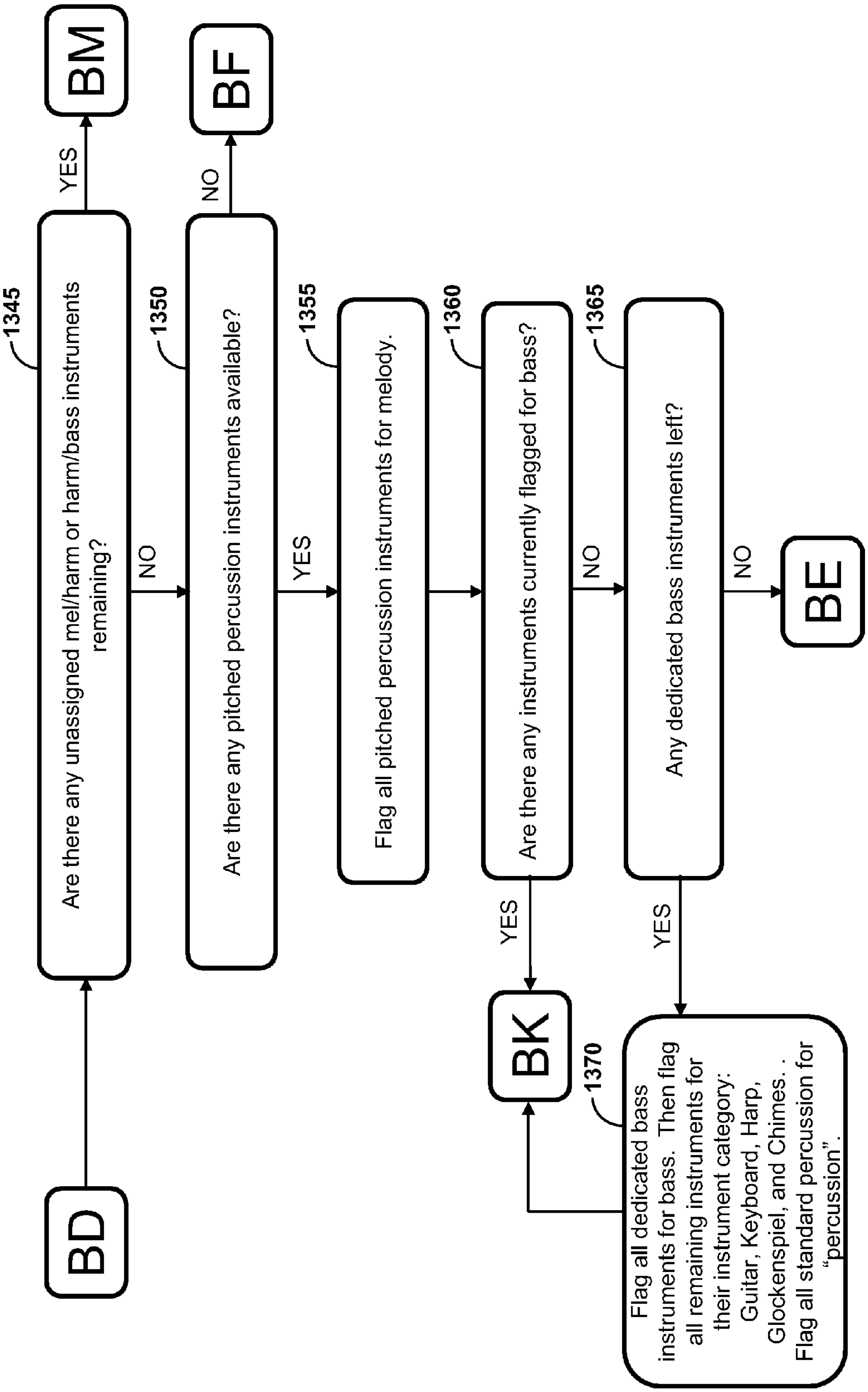
Figure 43:
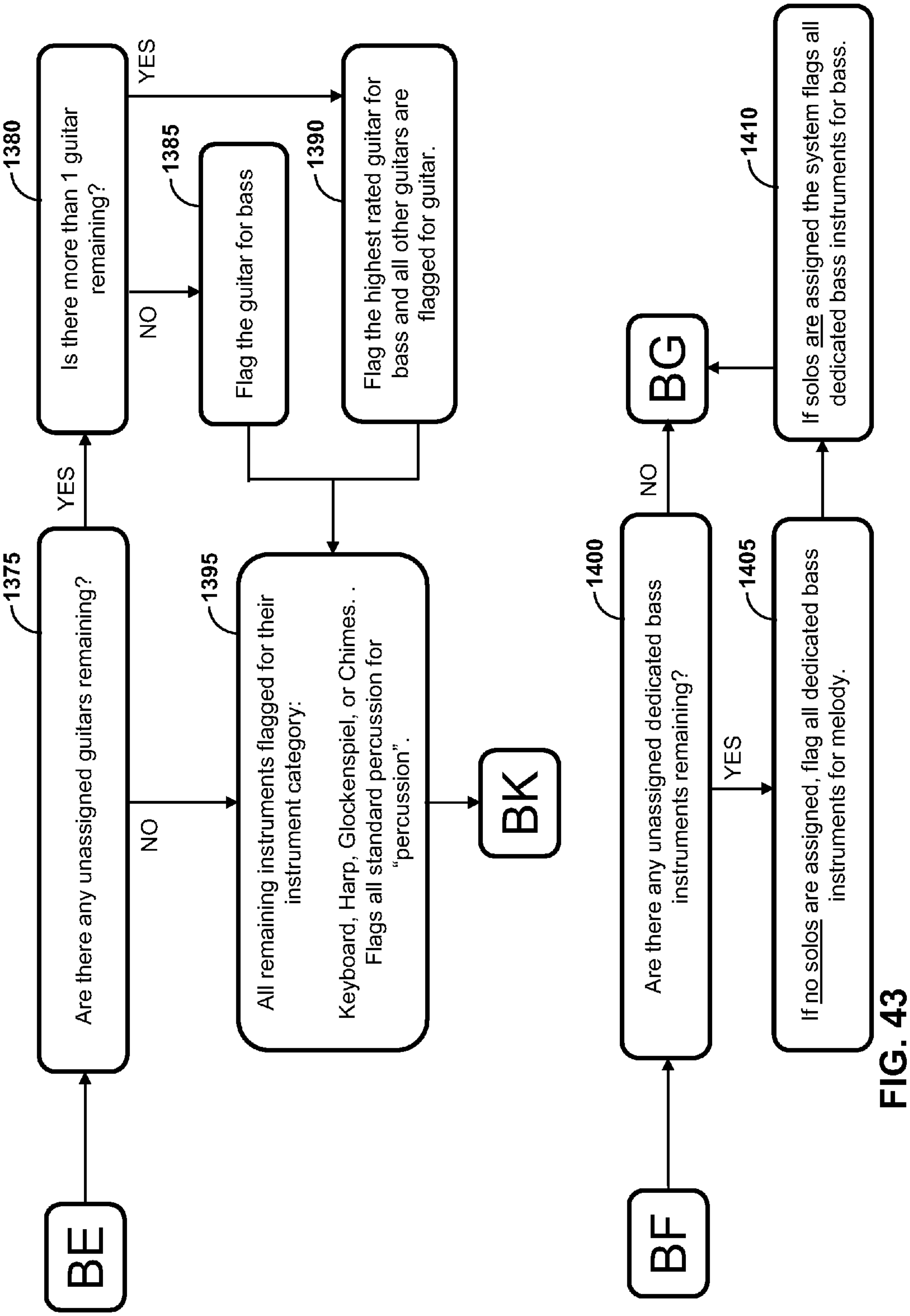
Figure 44:
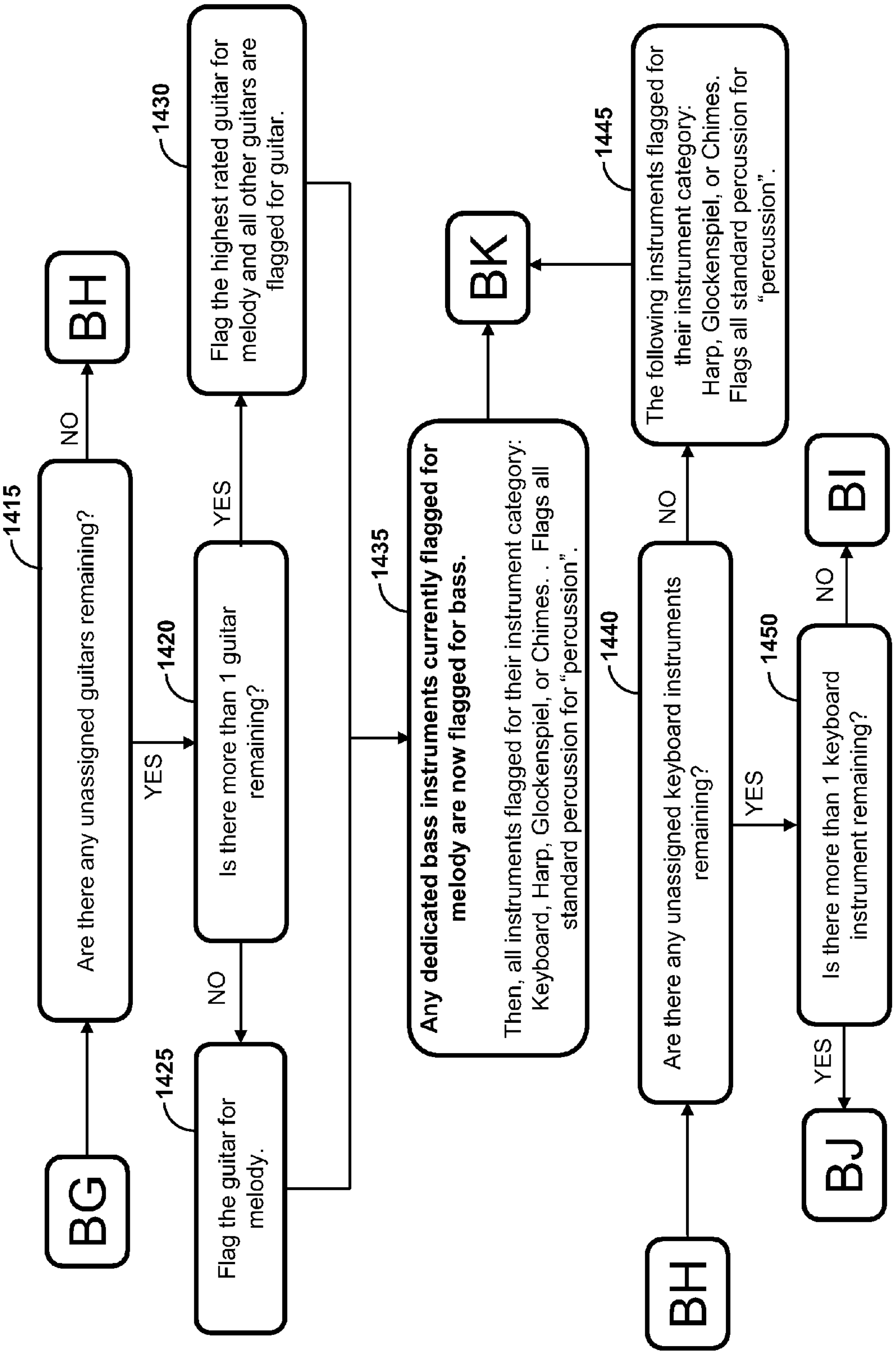
Figure 45:
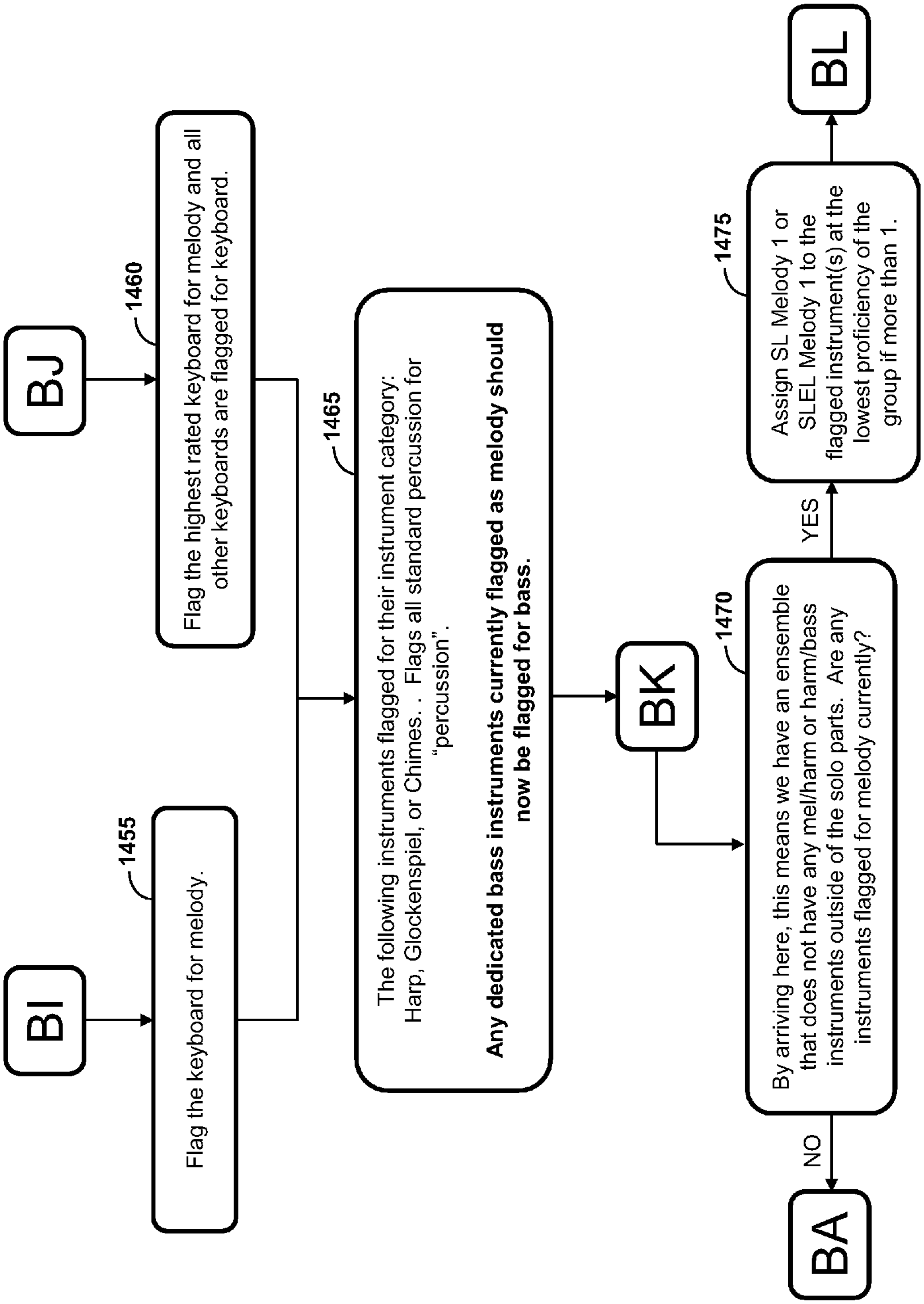
Figure 46:
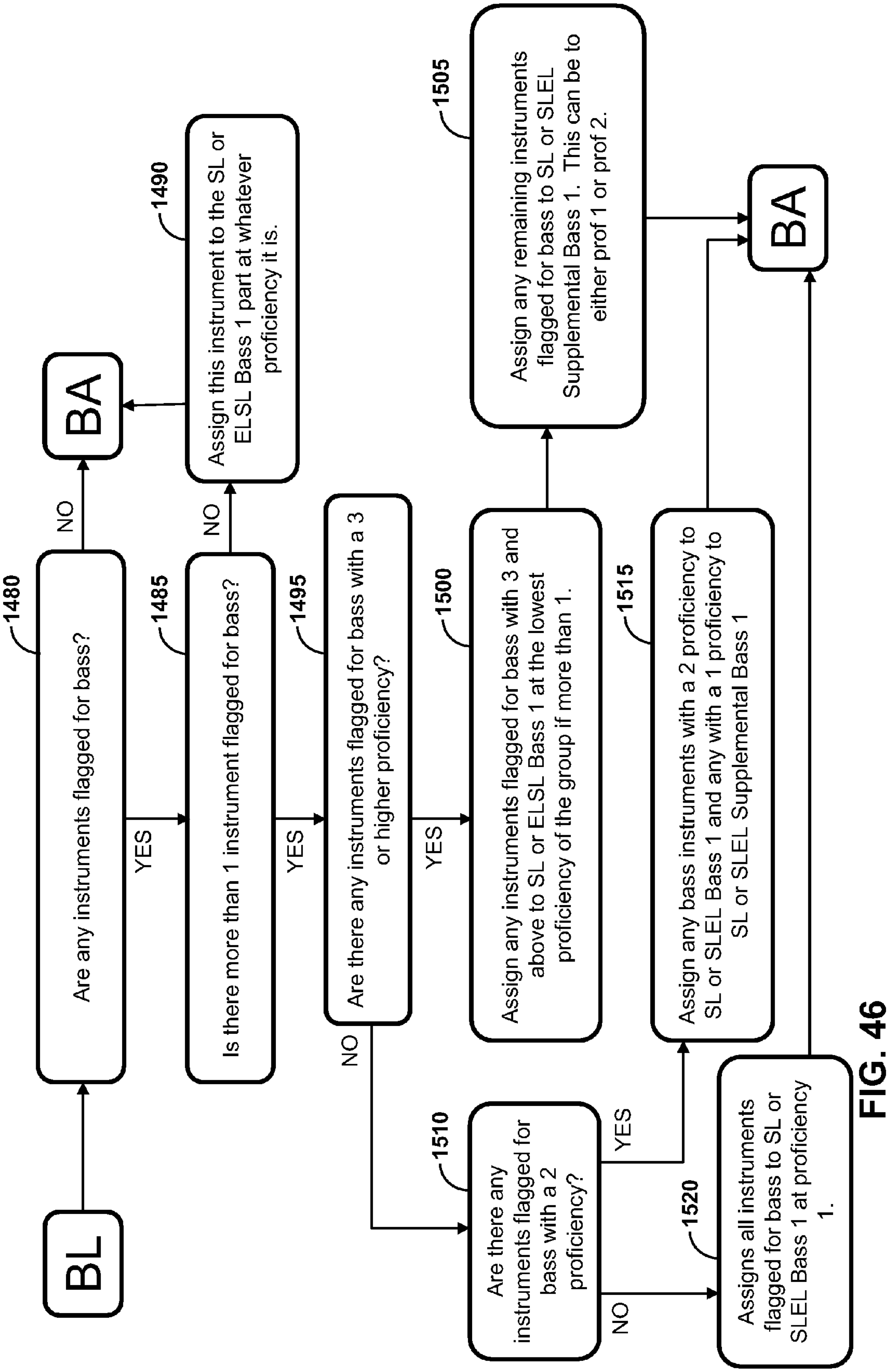
Figure 47:
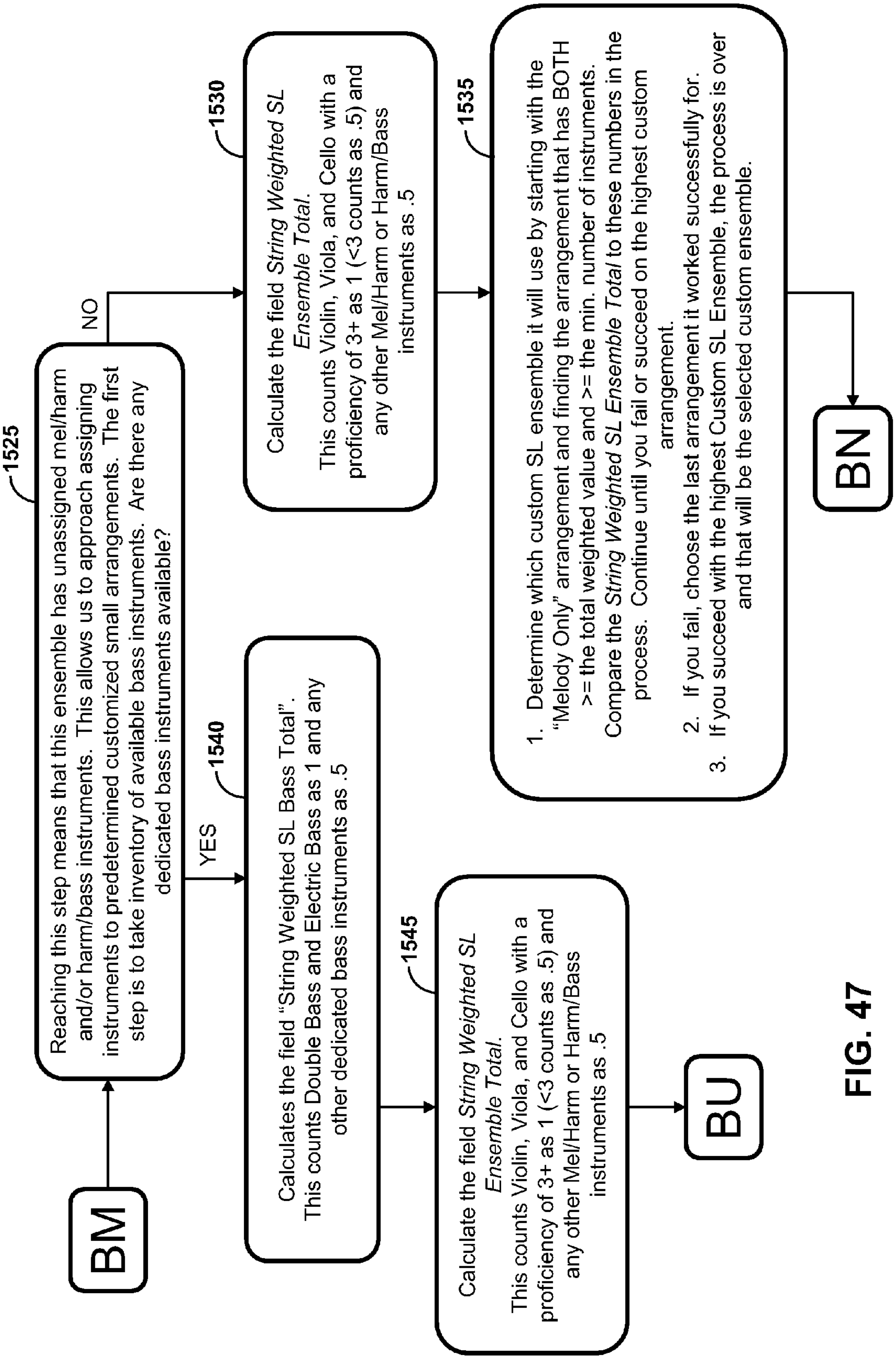
Figure 48:
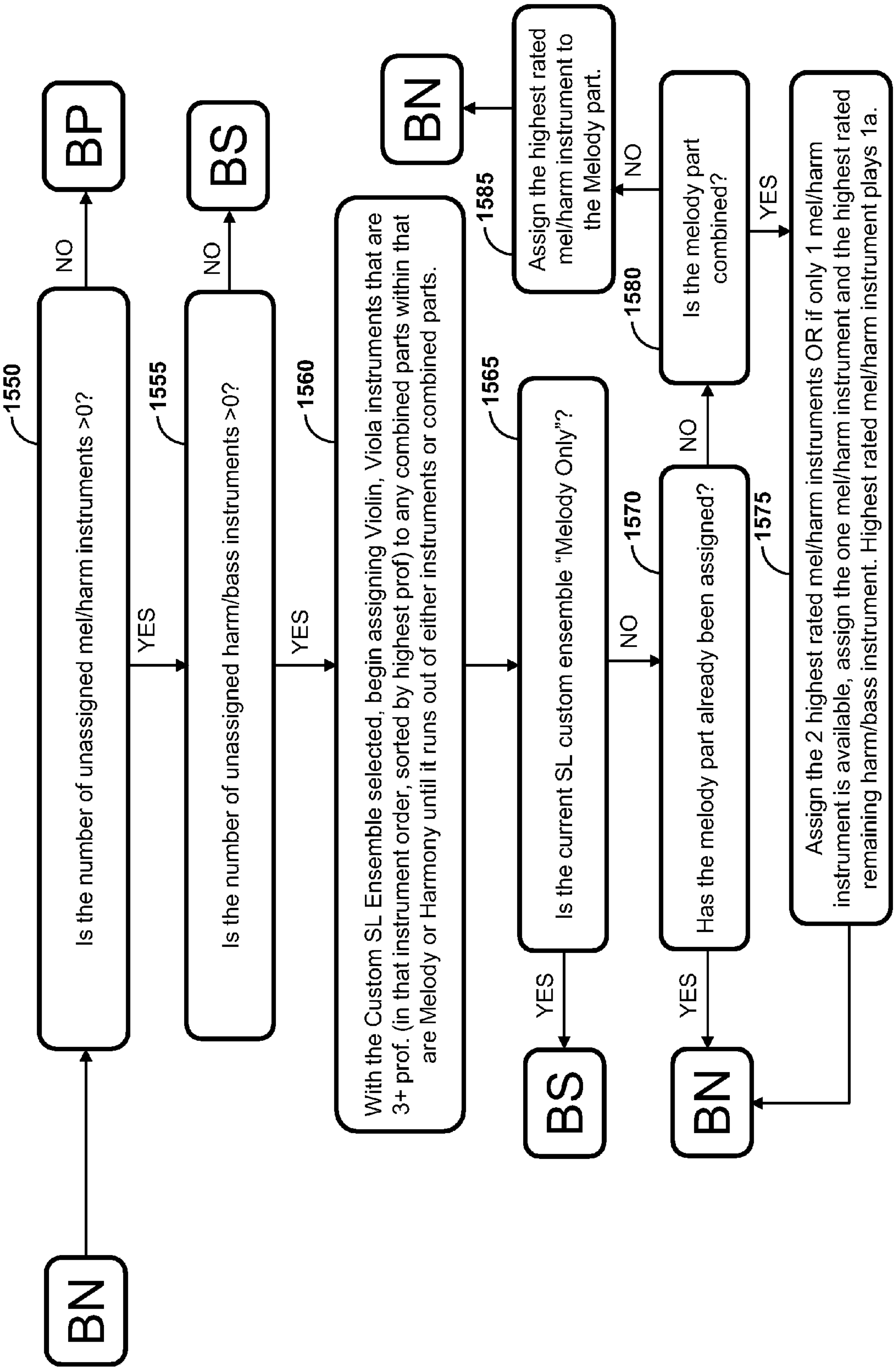
Figure 49:
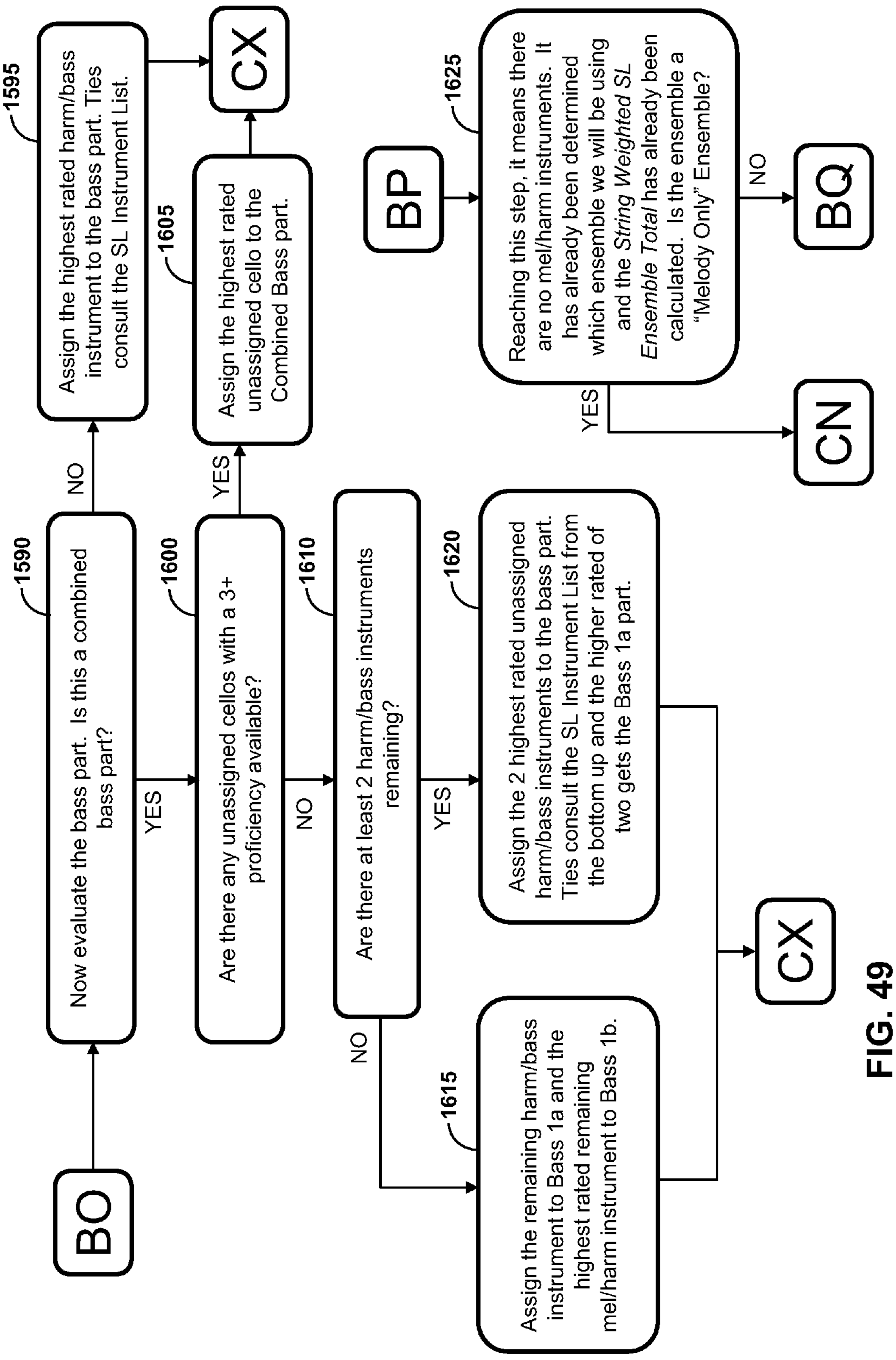
Figure 50:
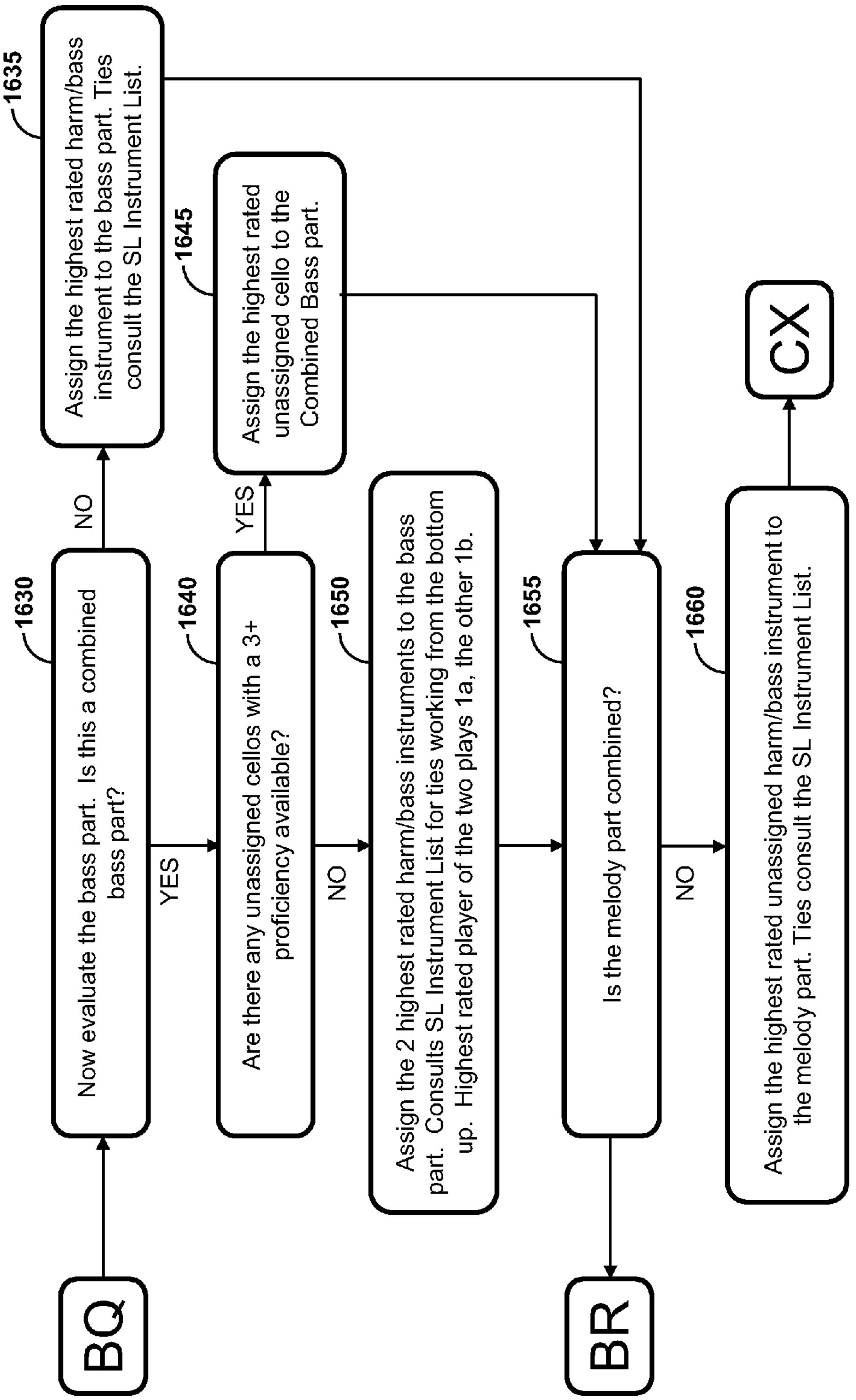
Figure 51:
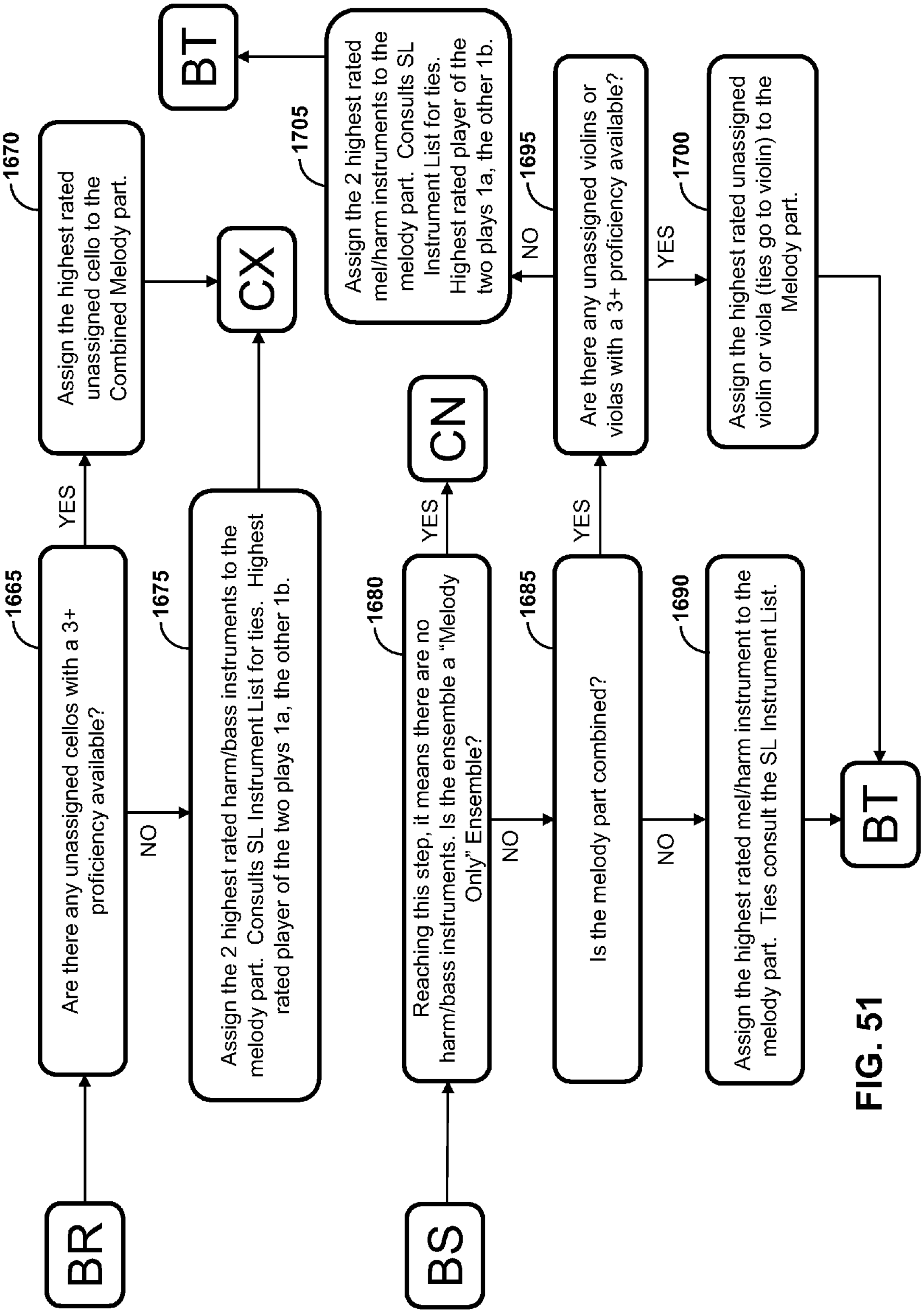
Figure 52:
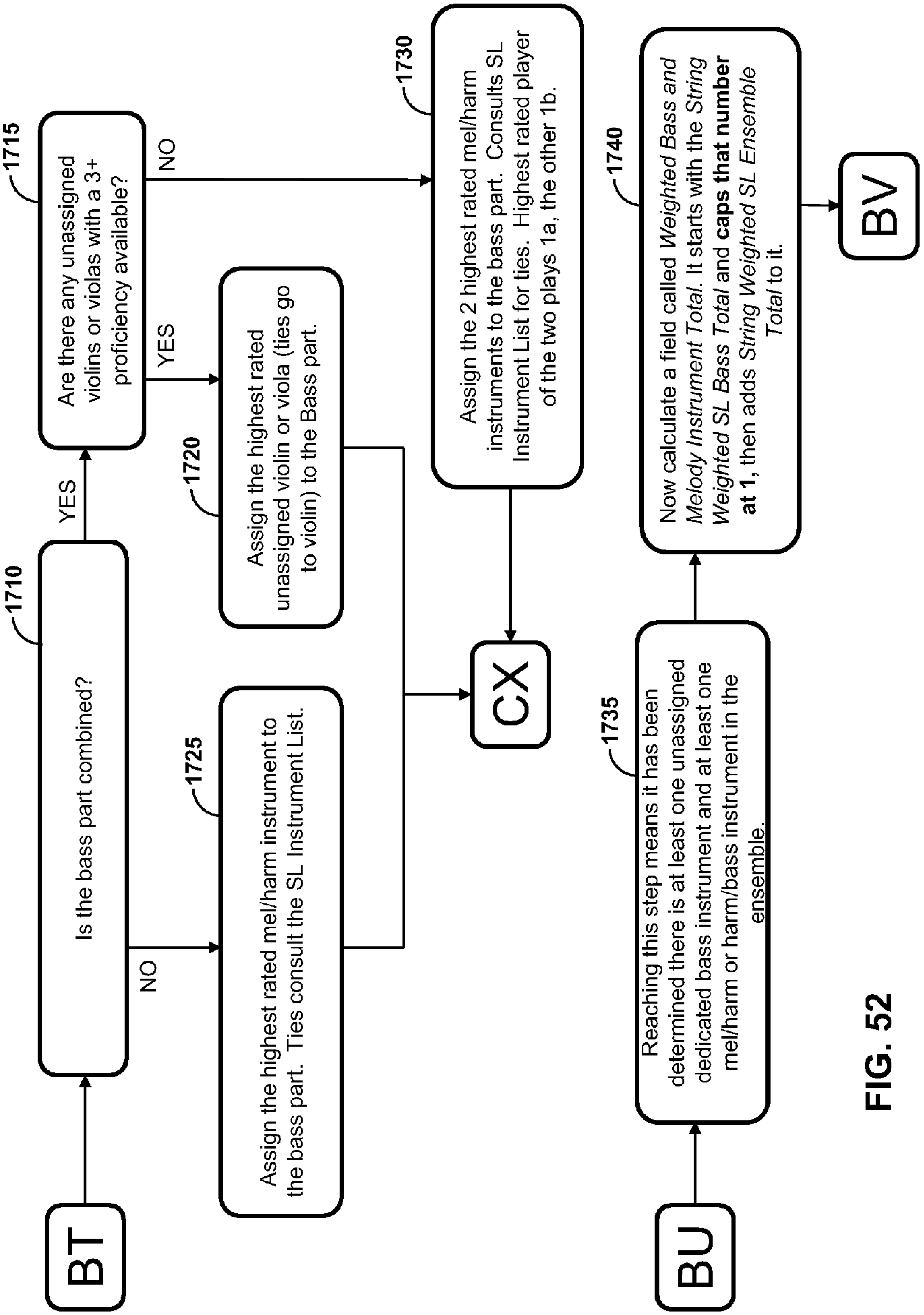
Figure 53:
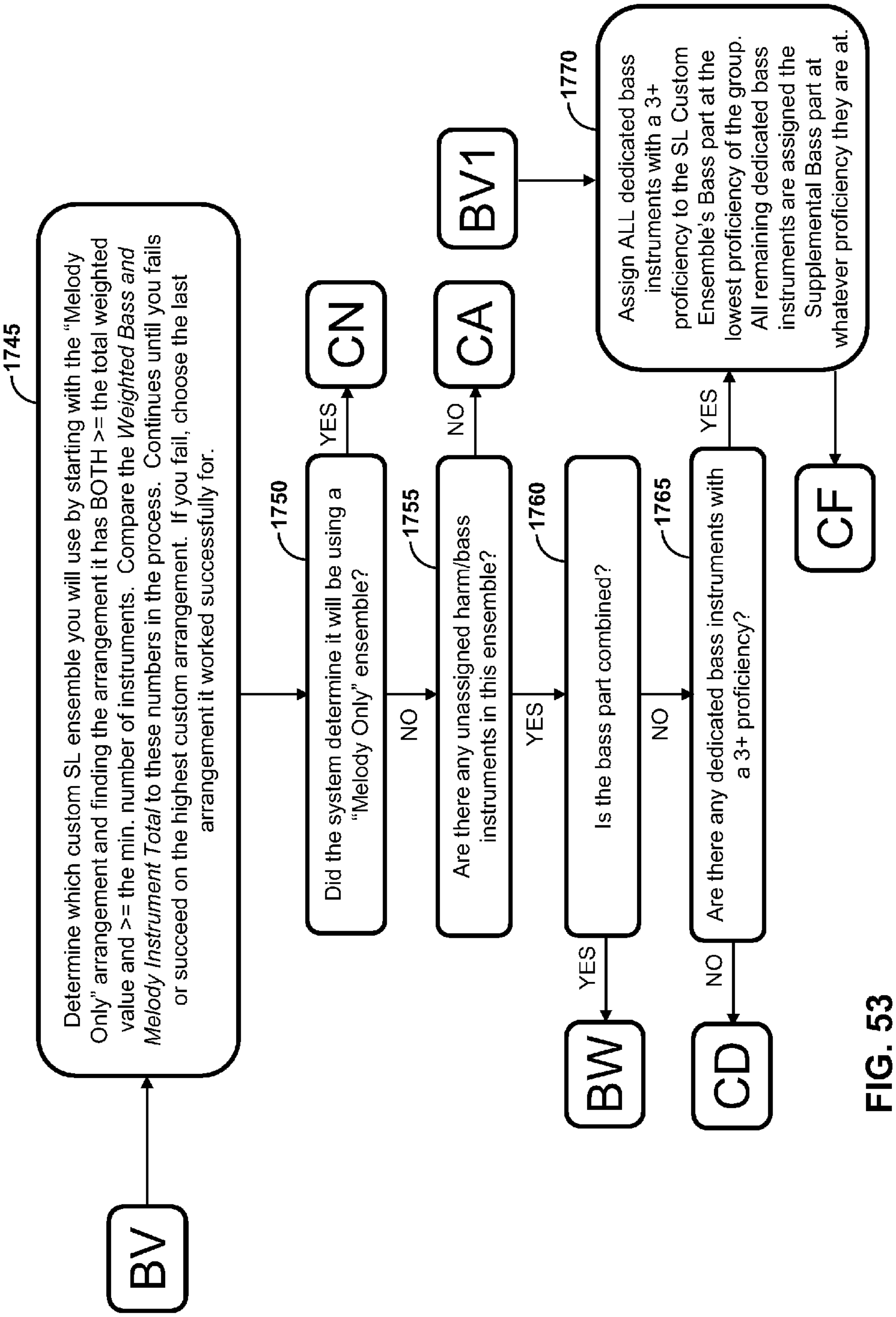
Figure 54:
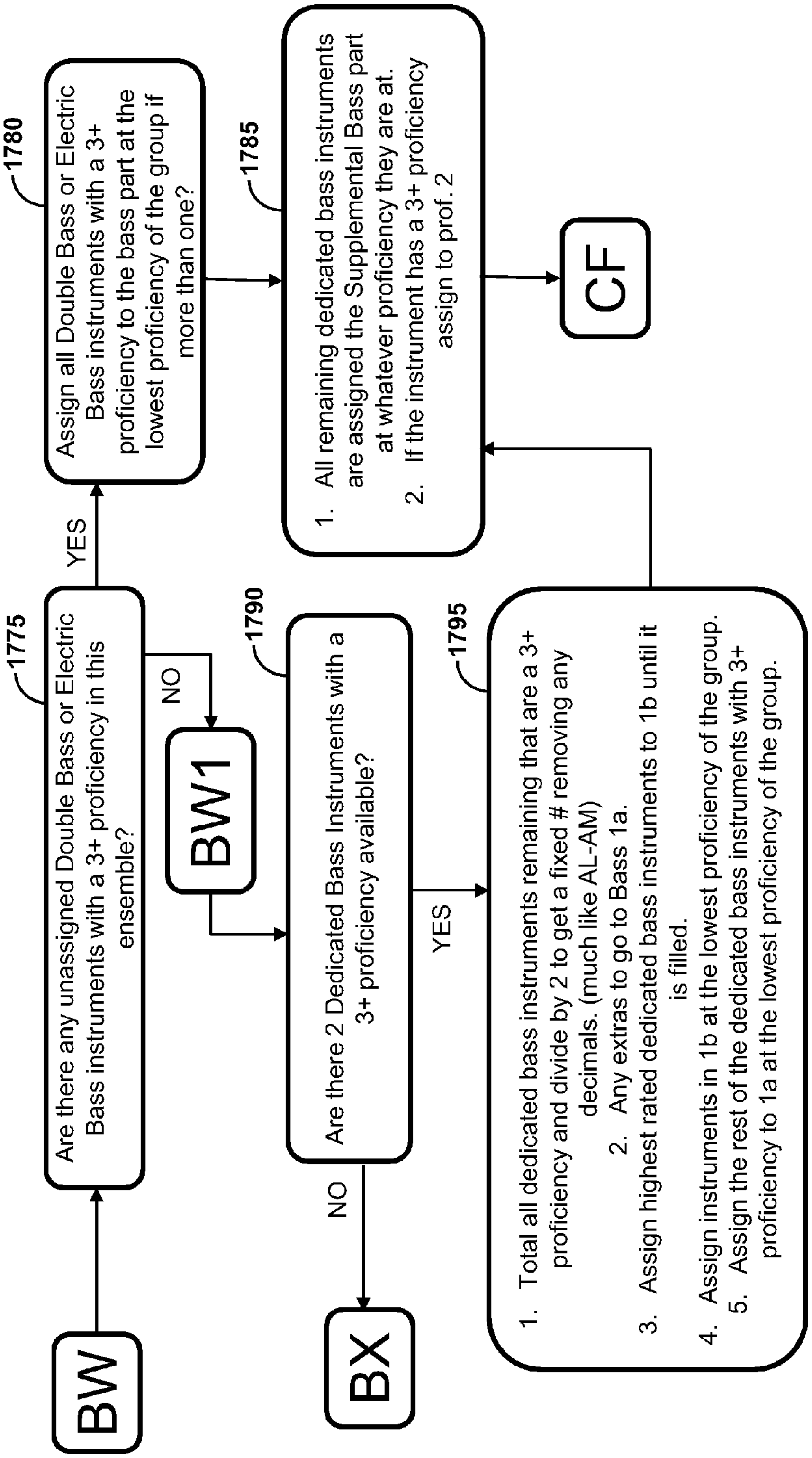
Figure 55:
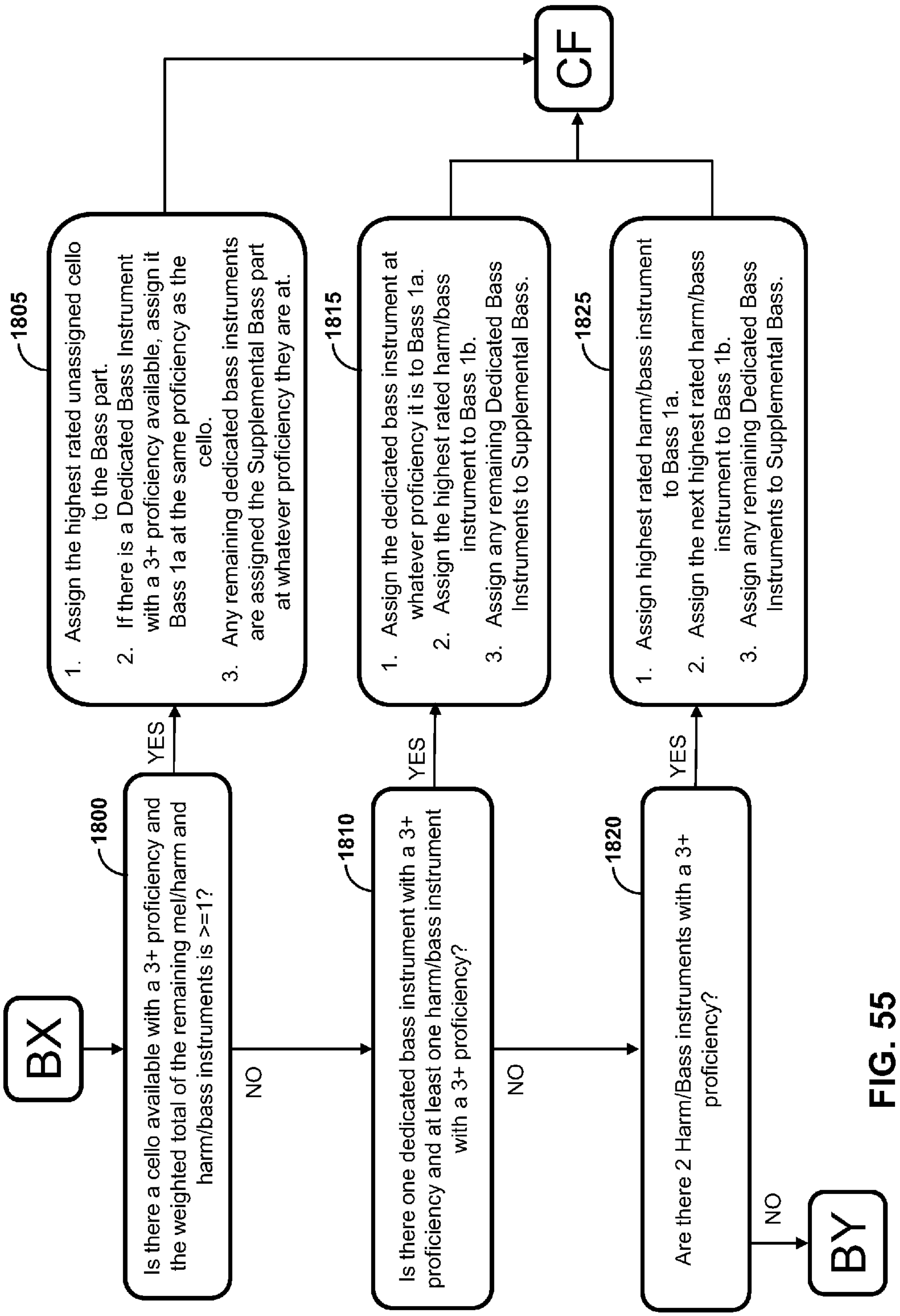
Figure 56:
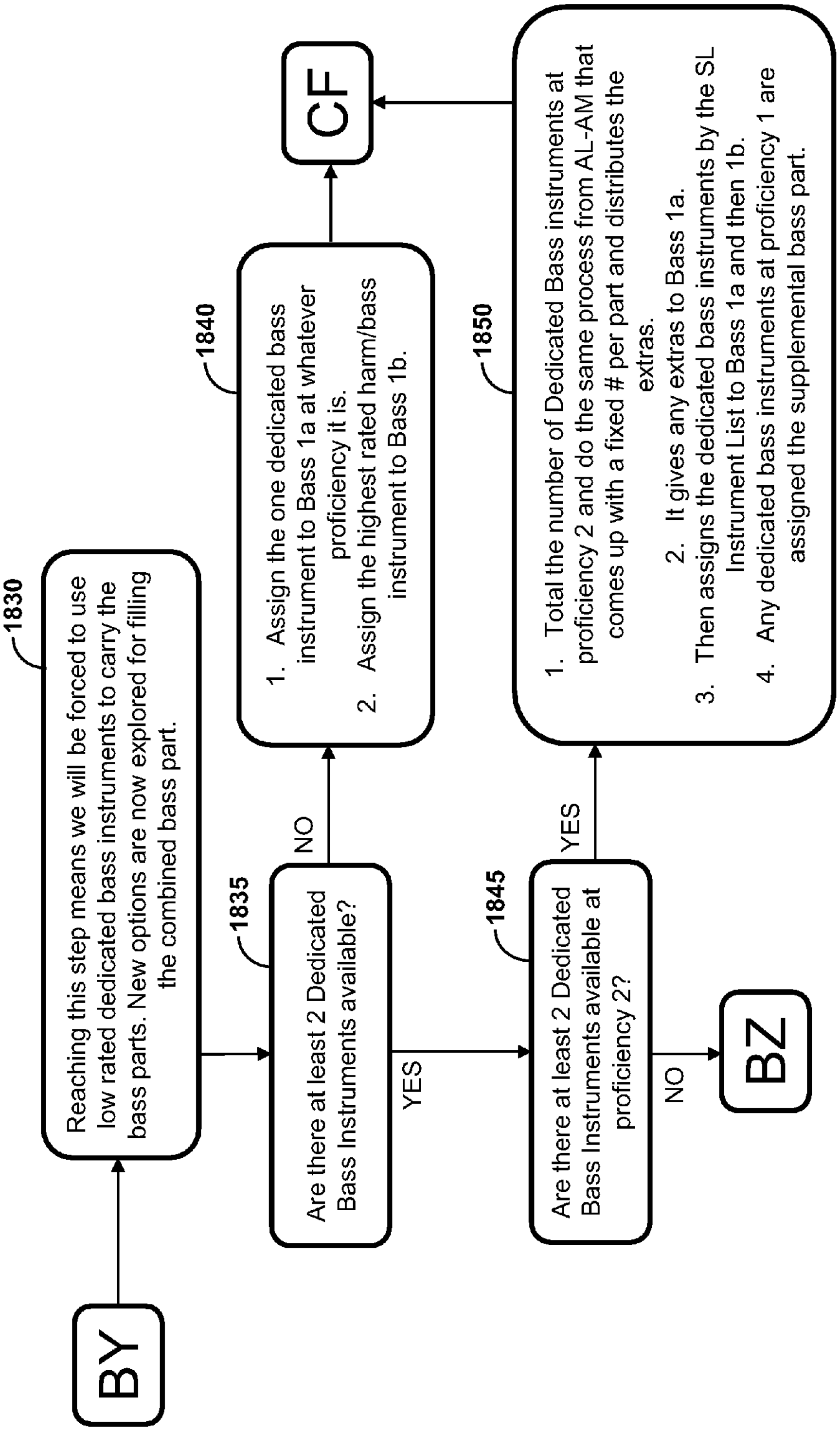
Figure 57:
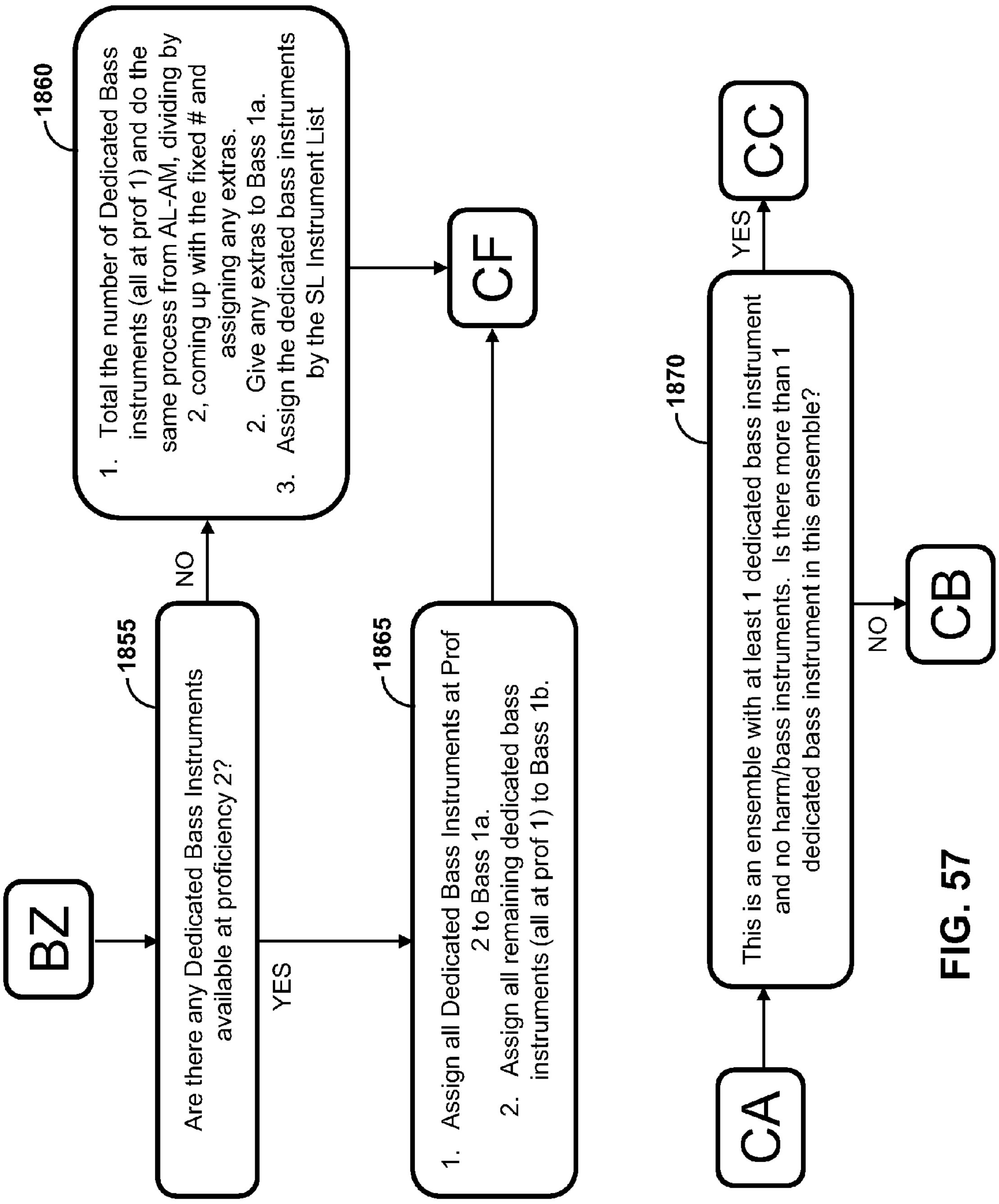
Figure 58:
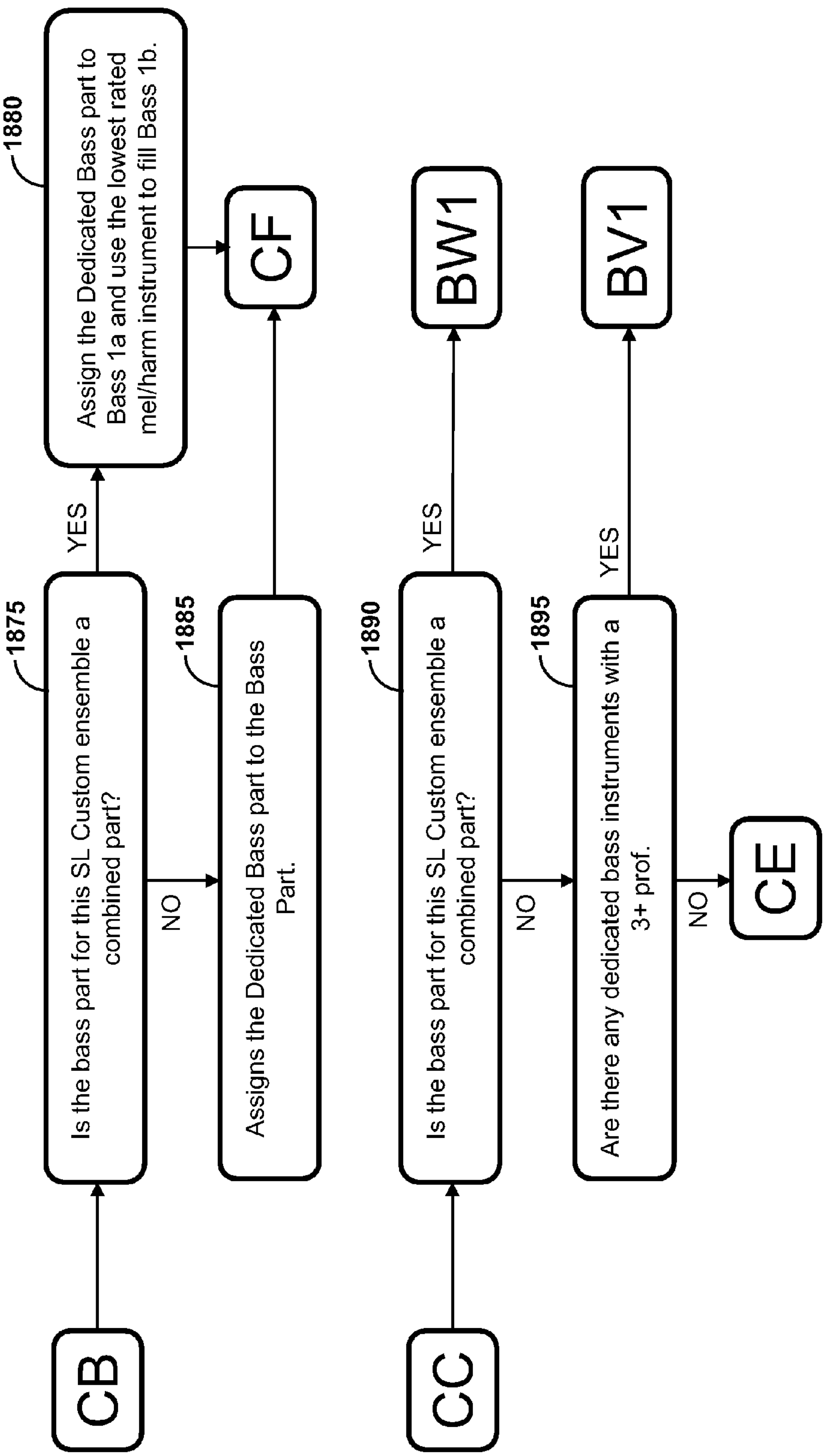
Figure 59:
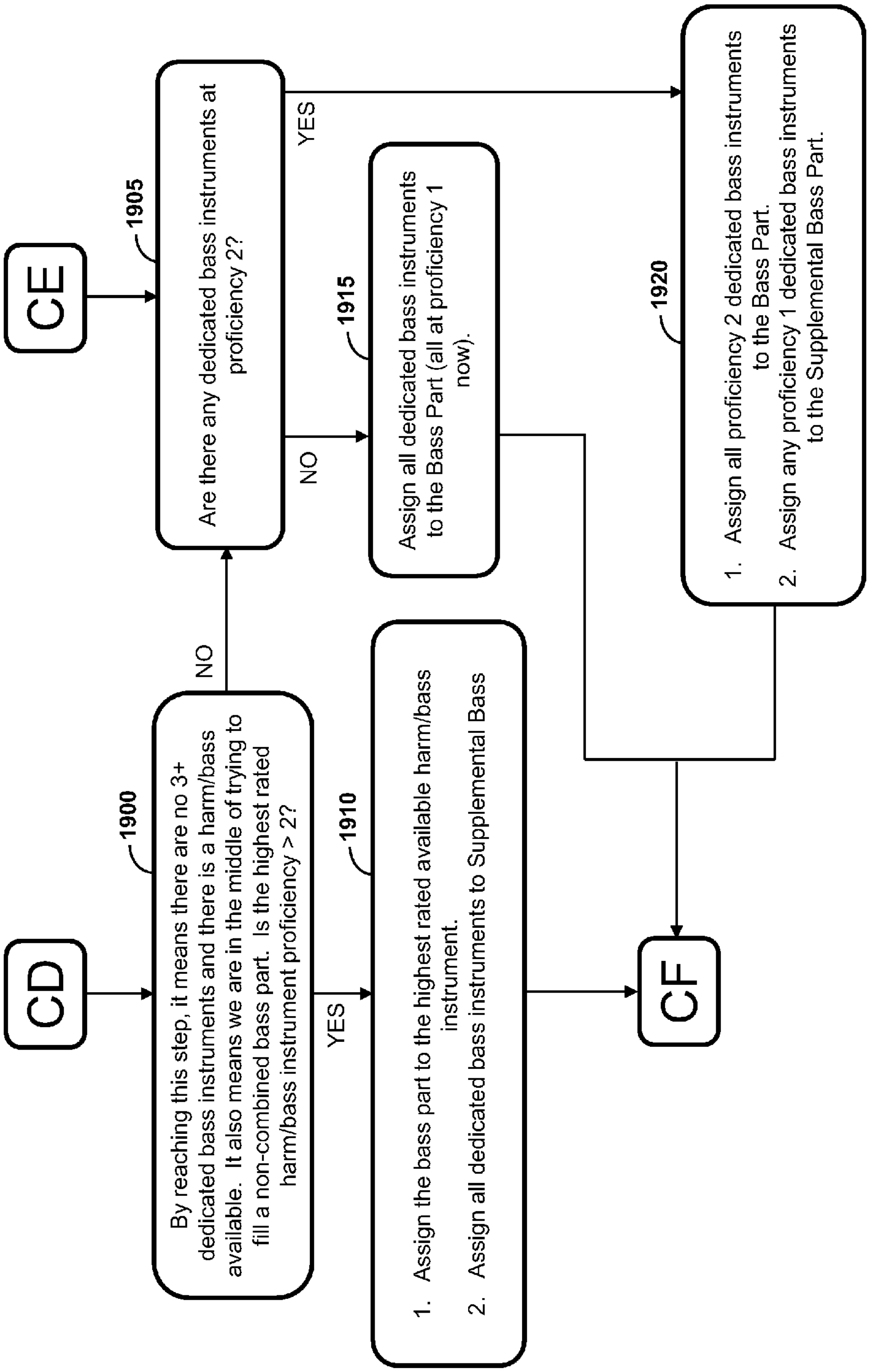
Figure 60:
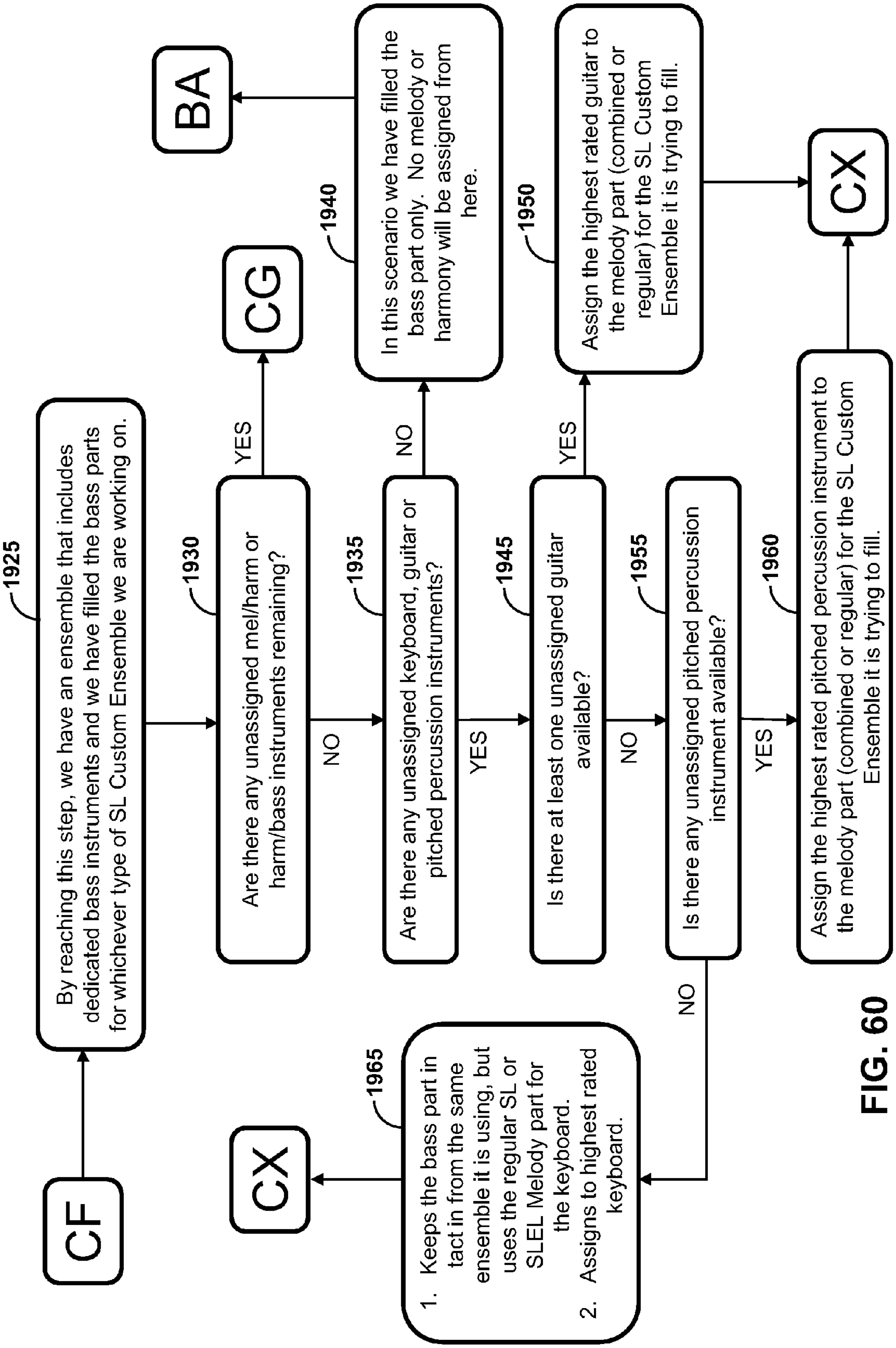
Figure 61:
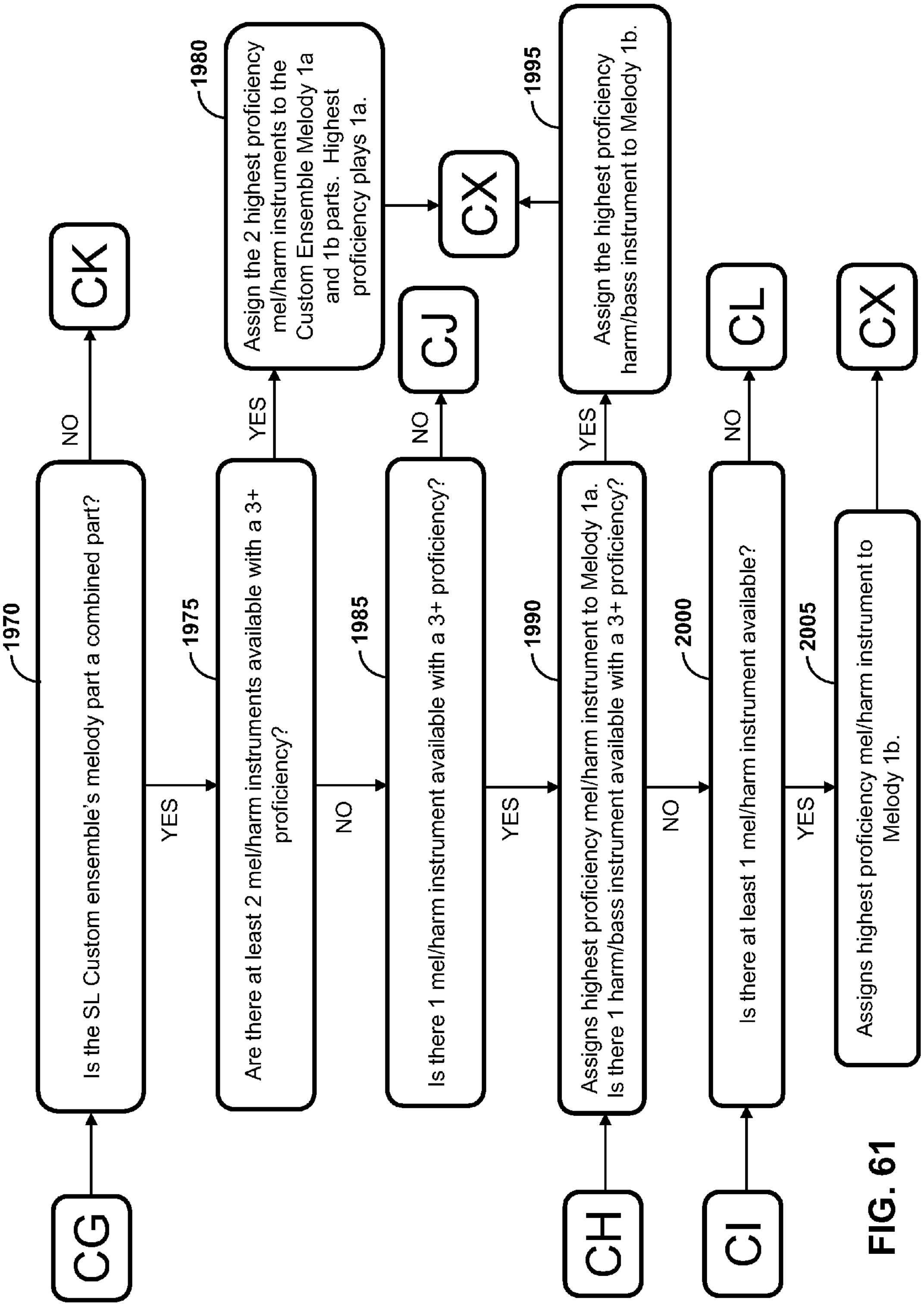
Figure 62:
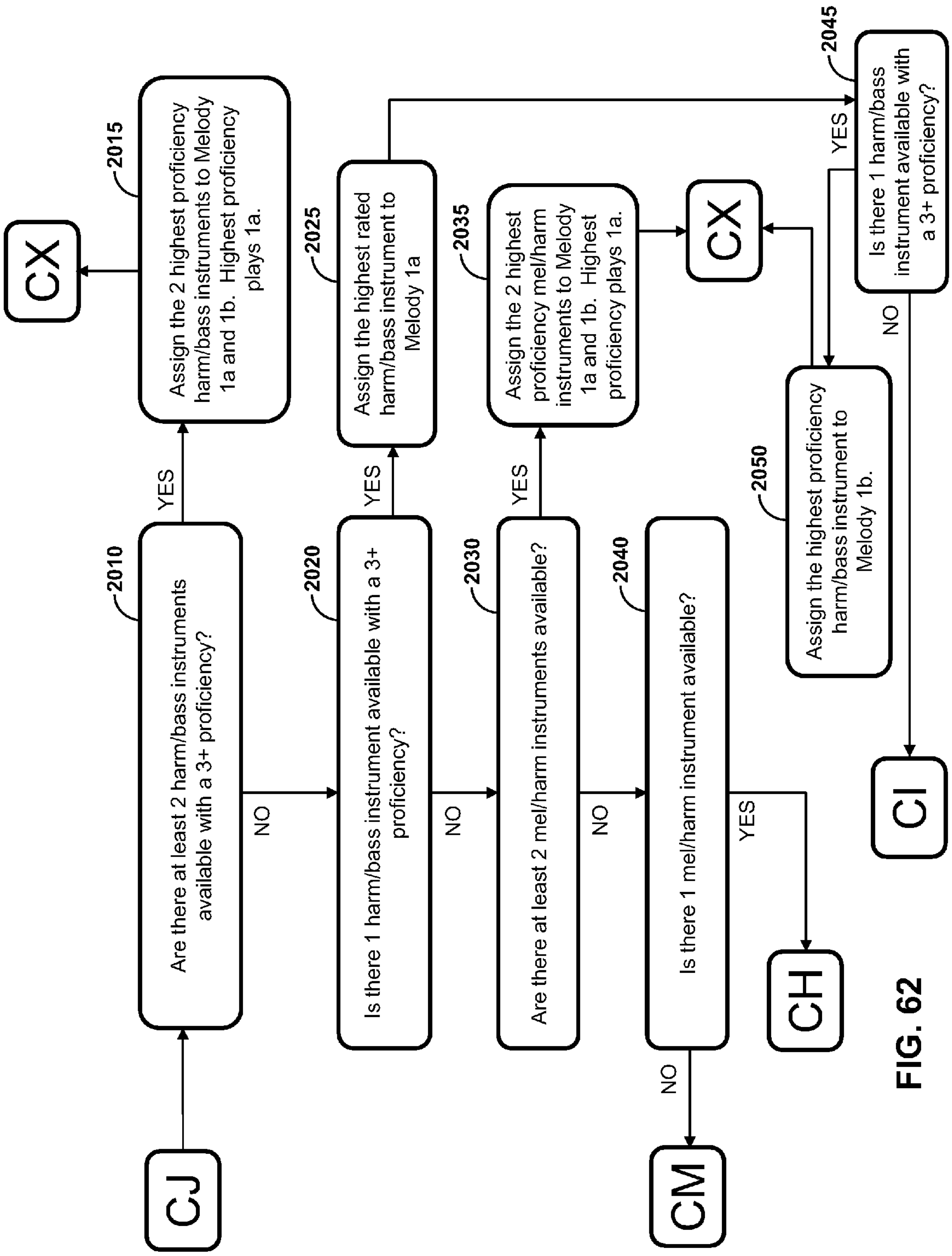
Figure 63:
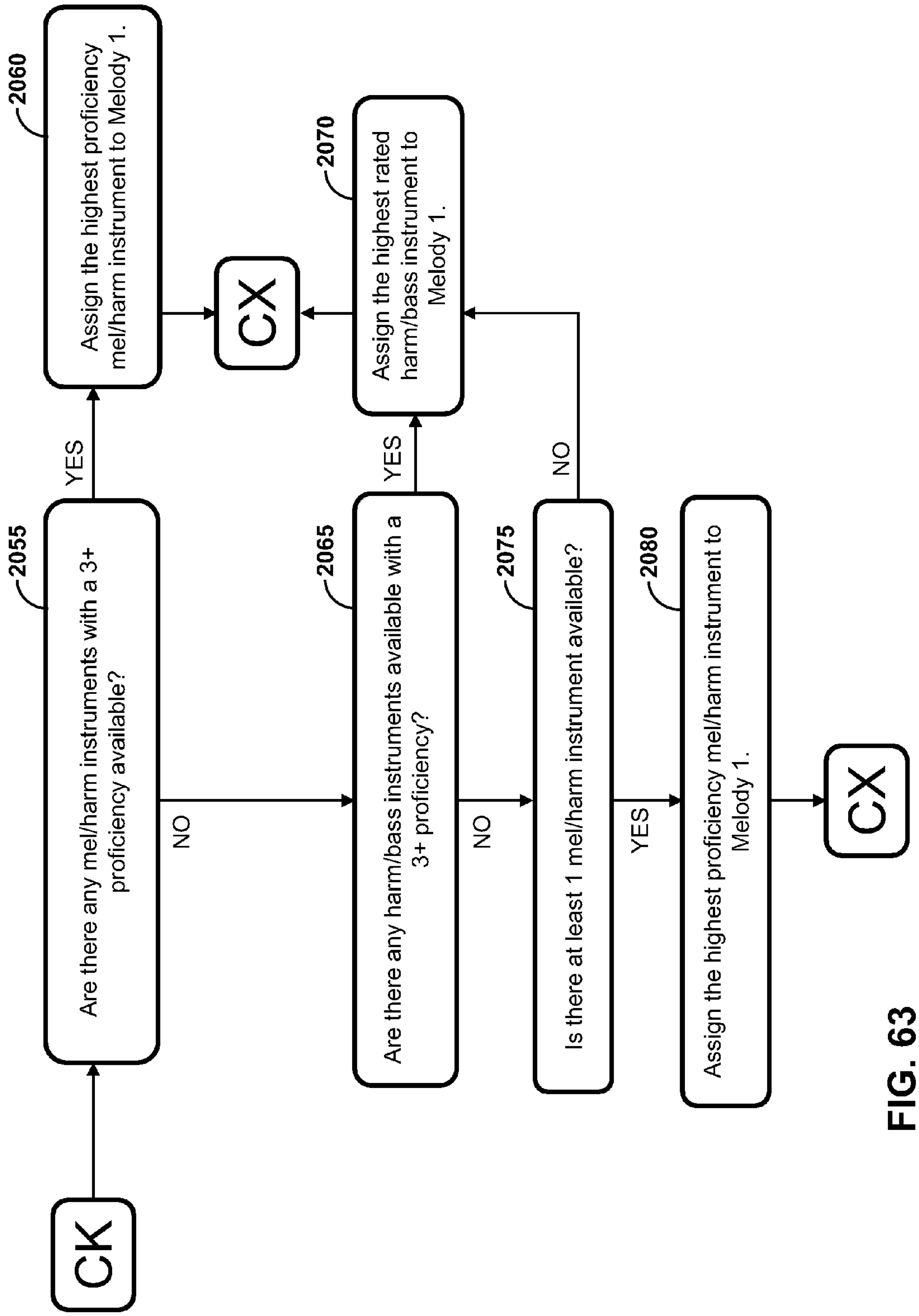
Figure 64:
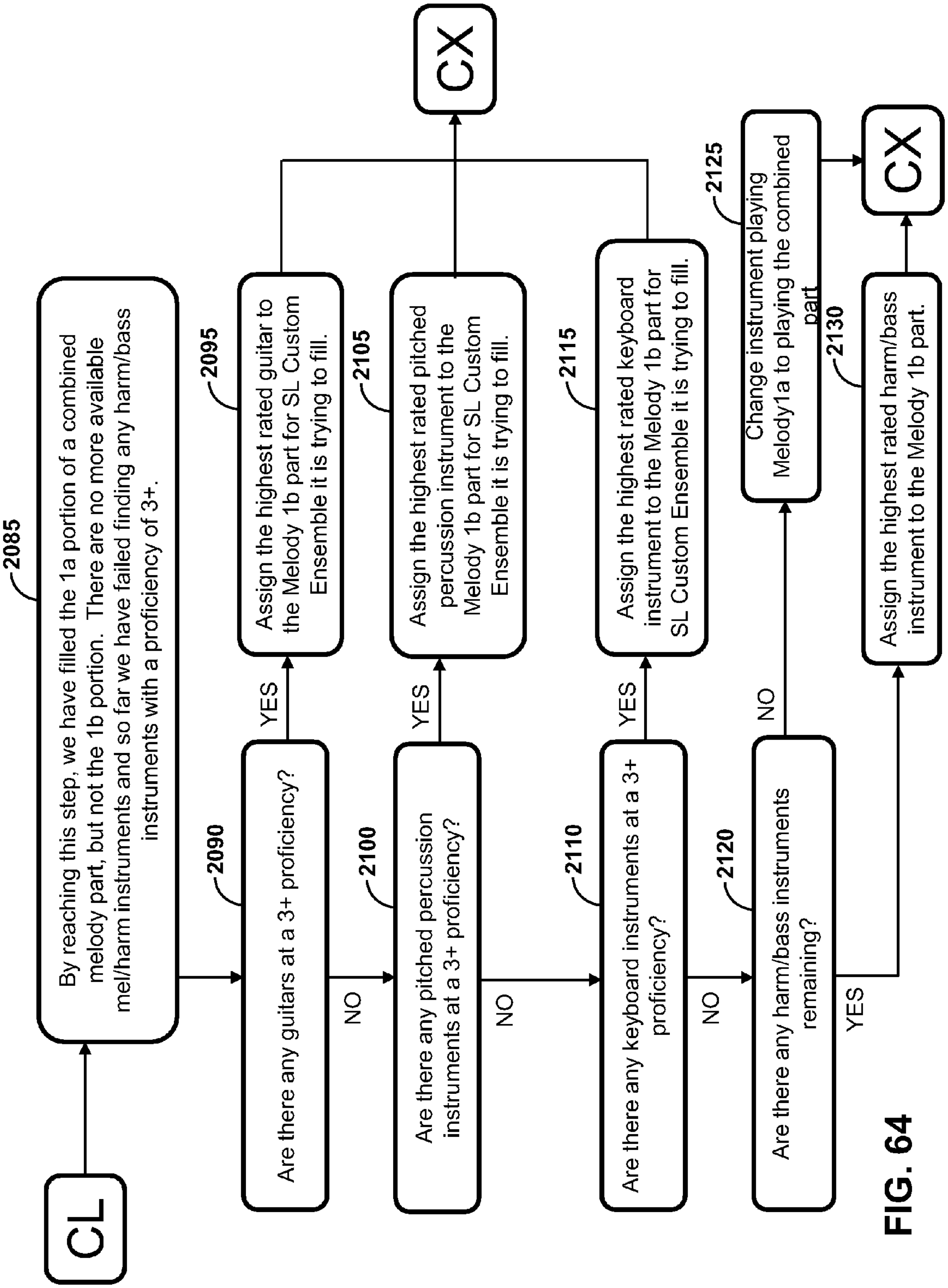
Figure 65:
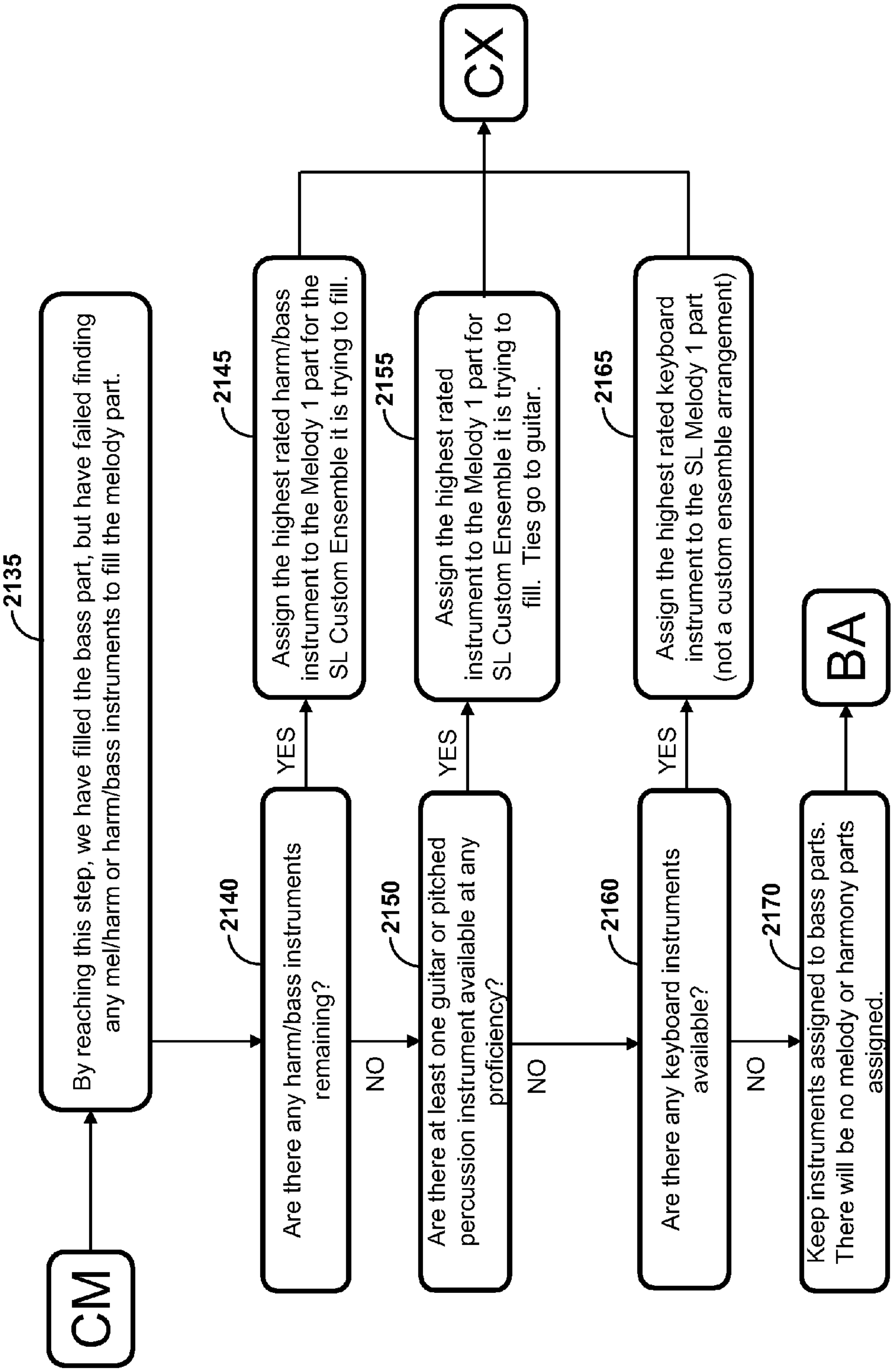
Figure 66:
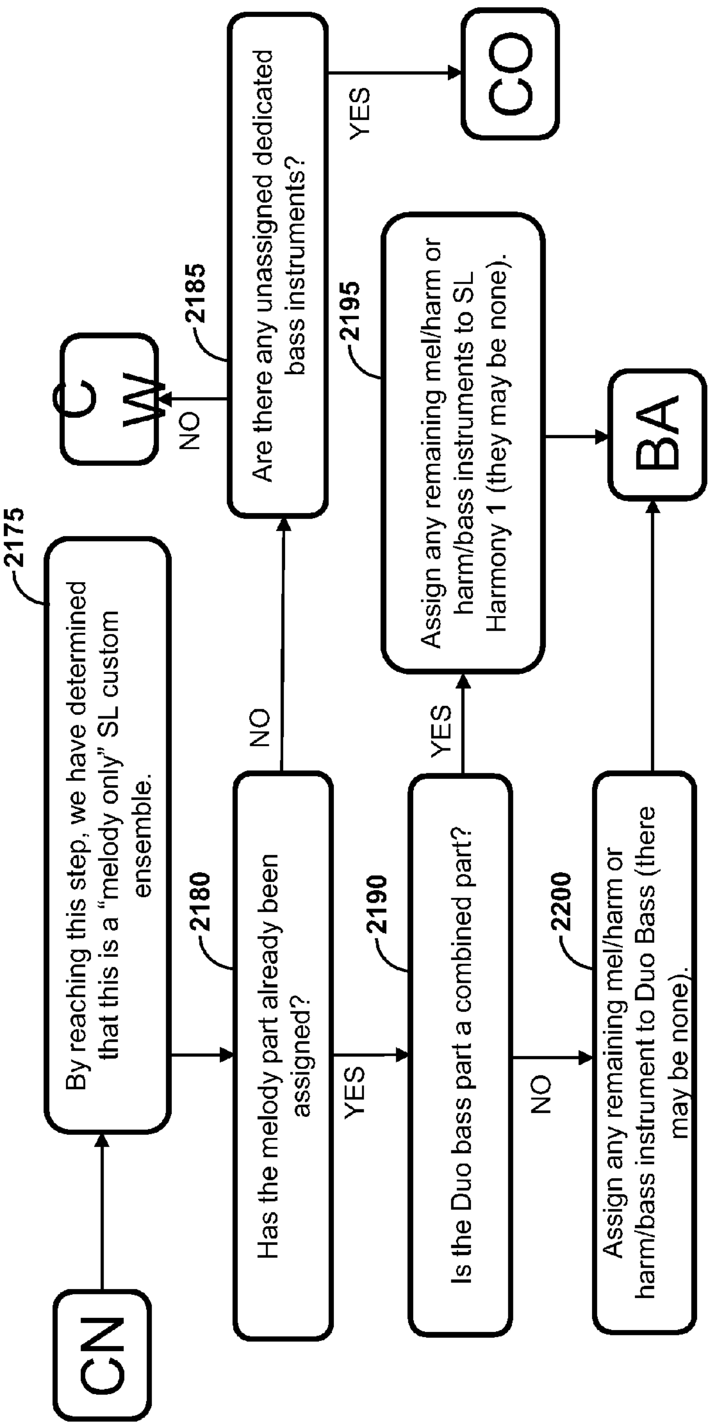
Figure 67:
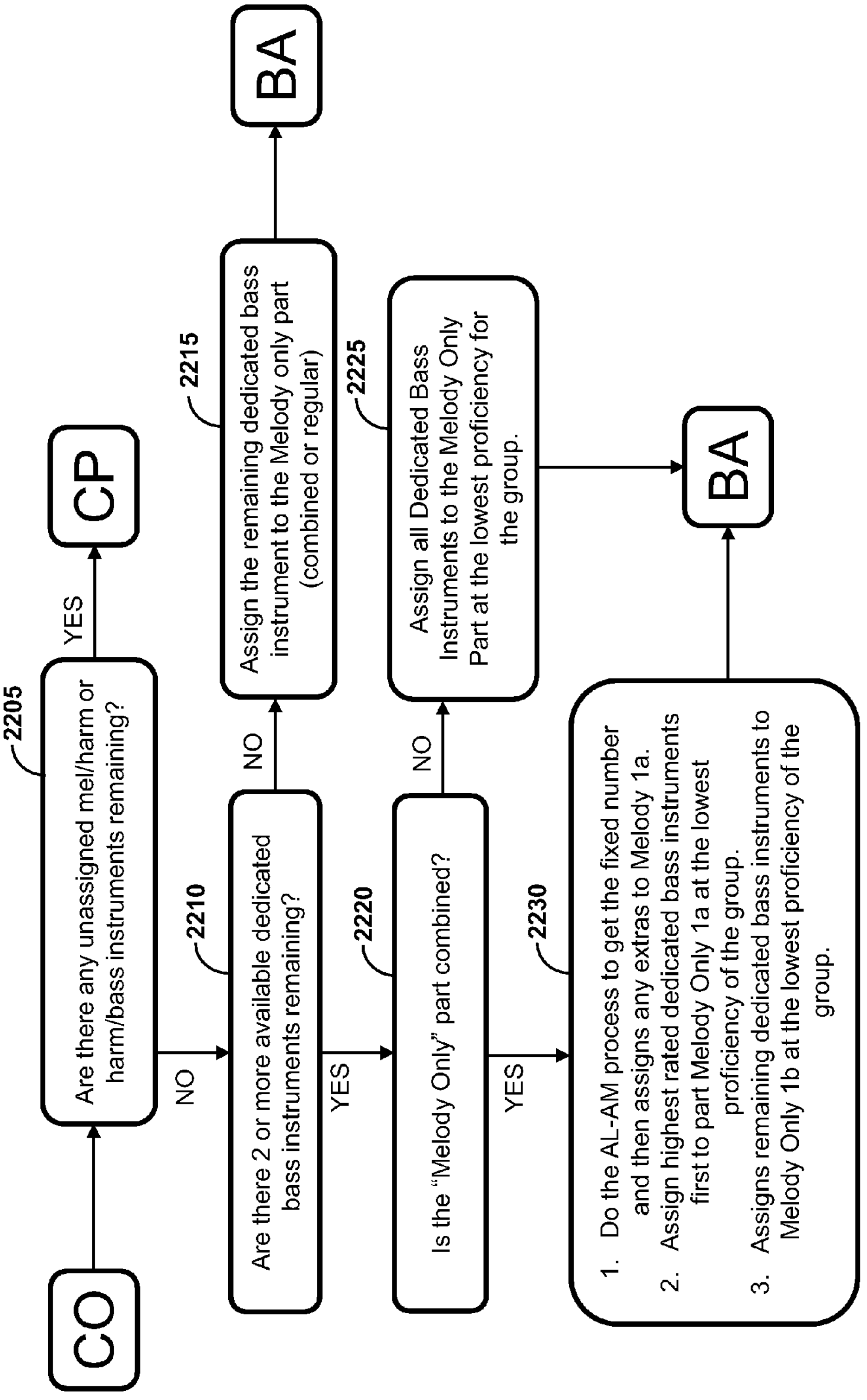
Figure 68:
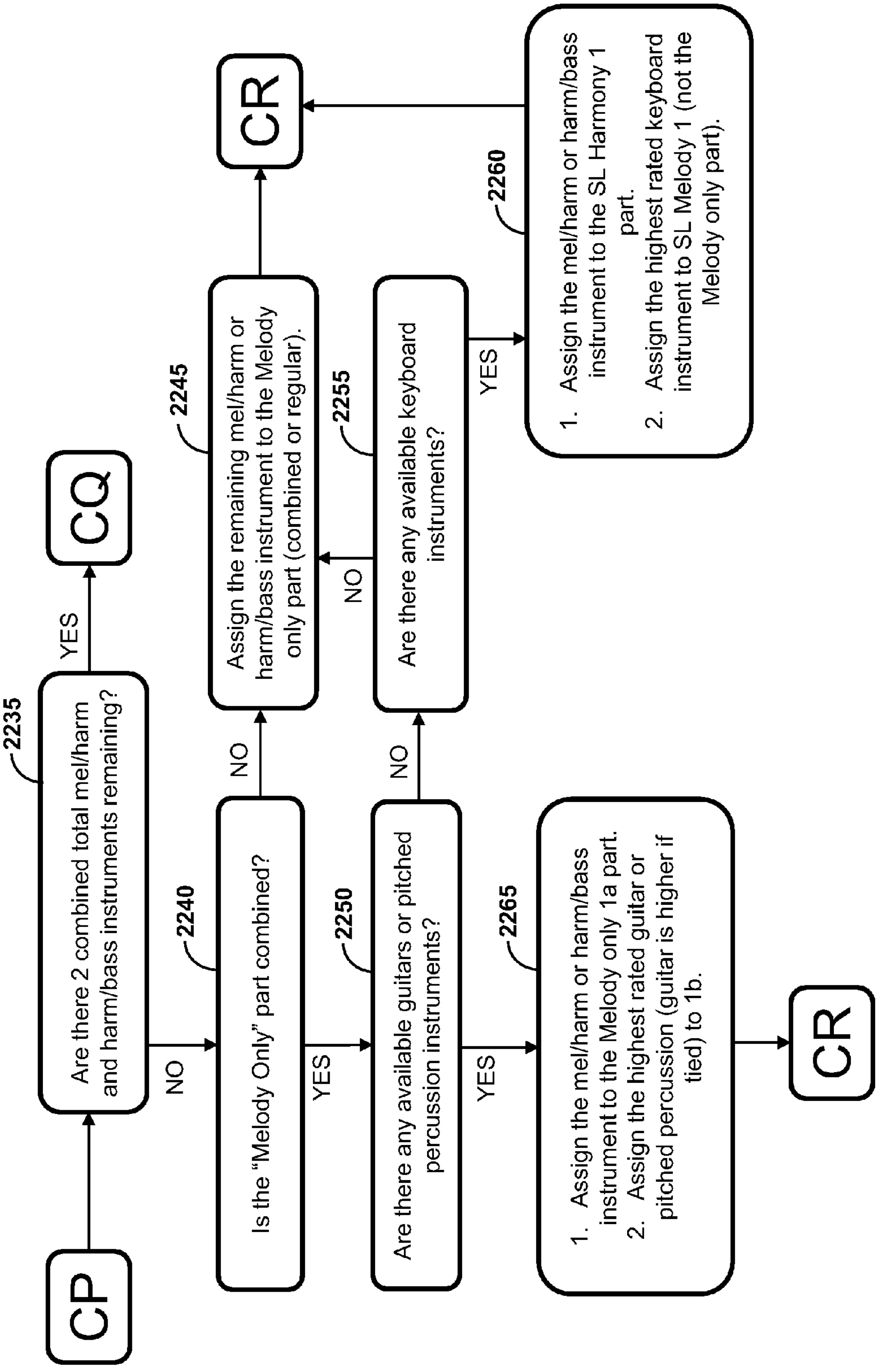
Figure 69:
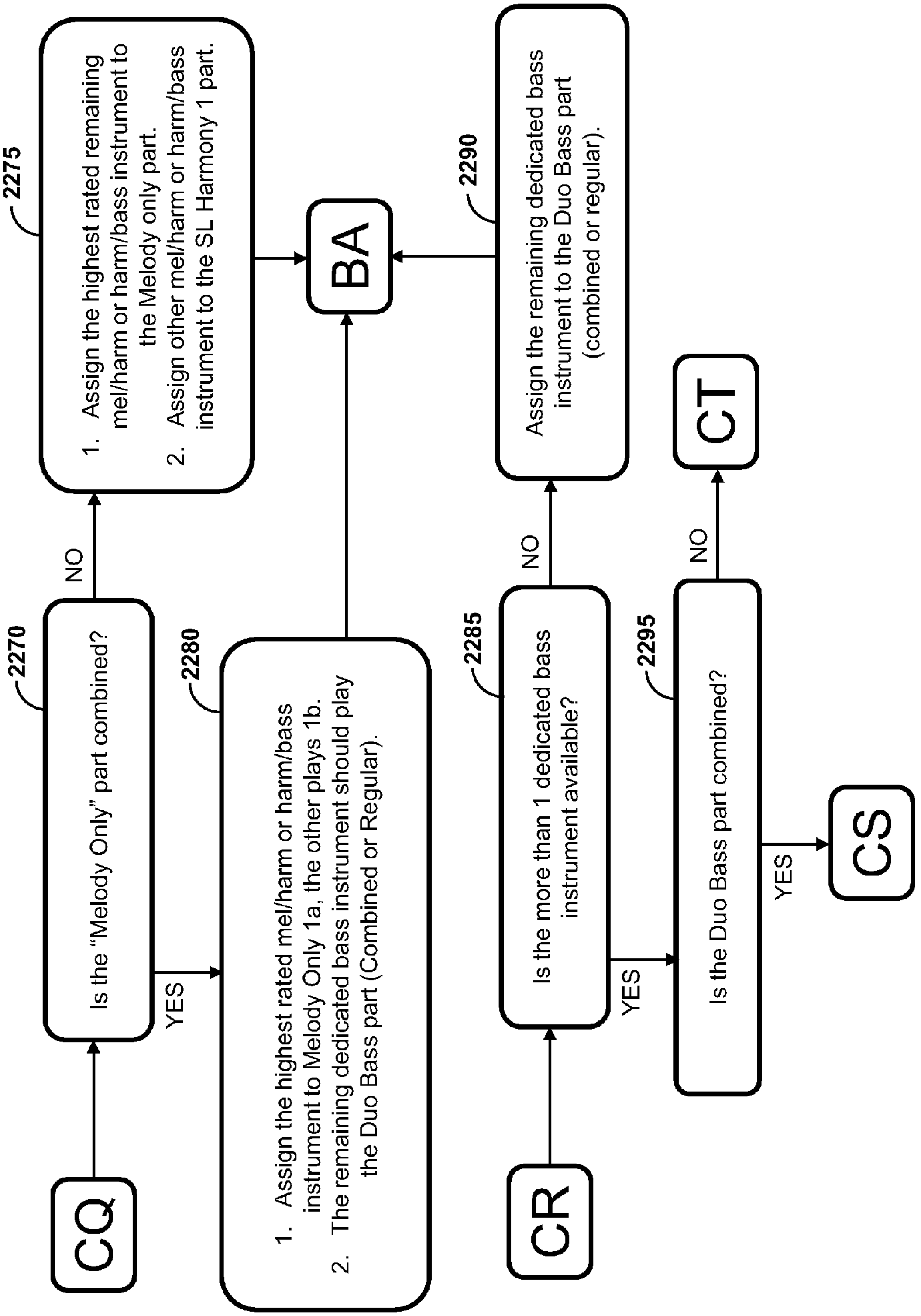
Figure 70:
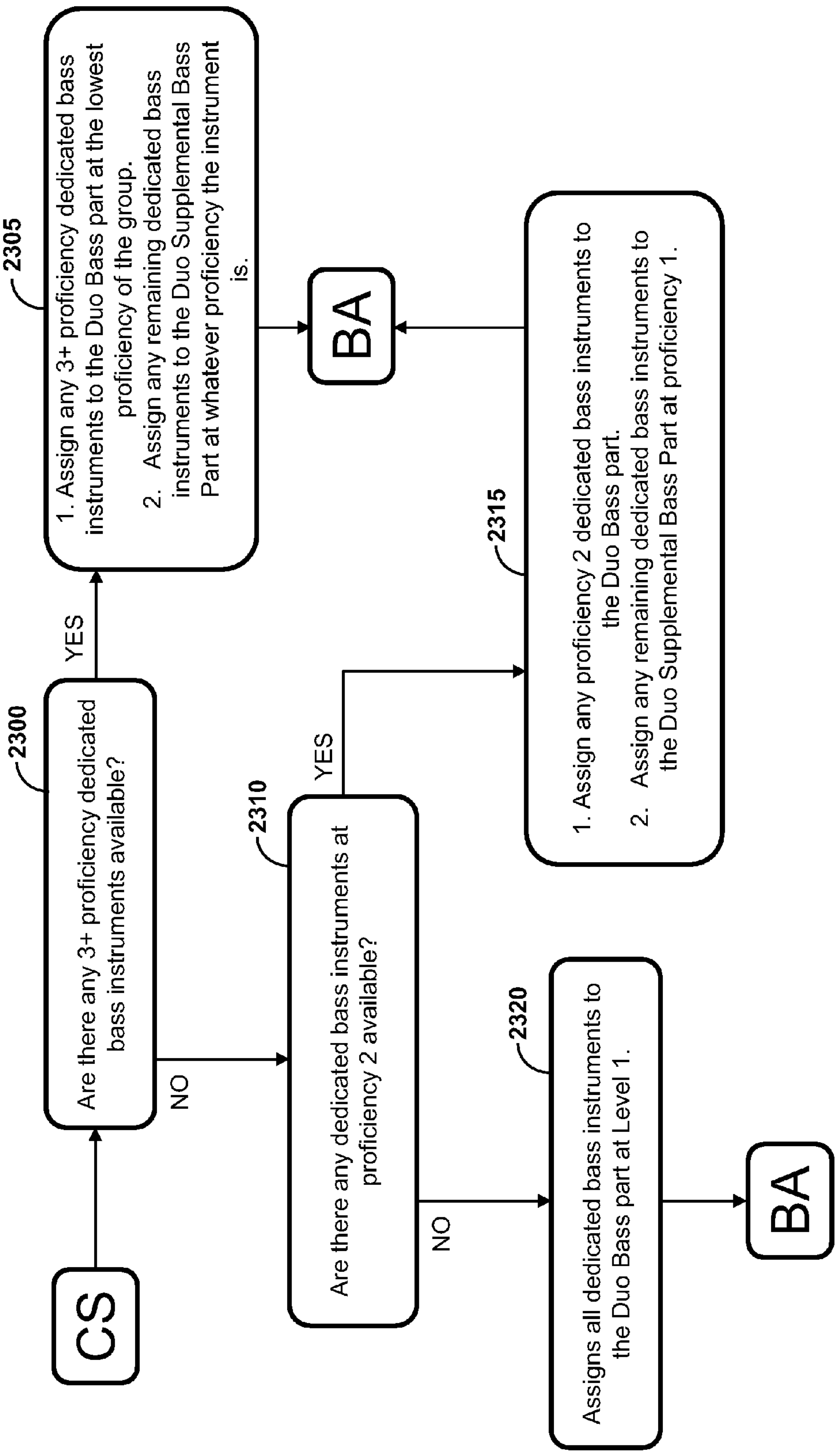
Figure 71:
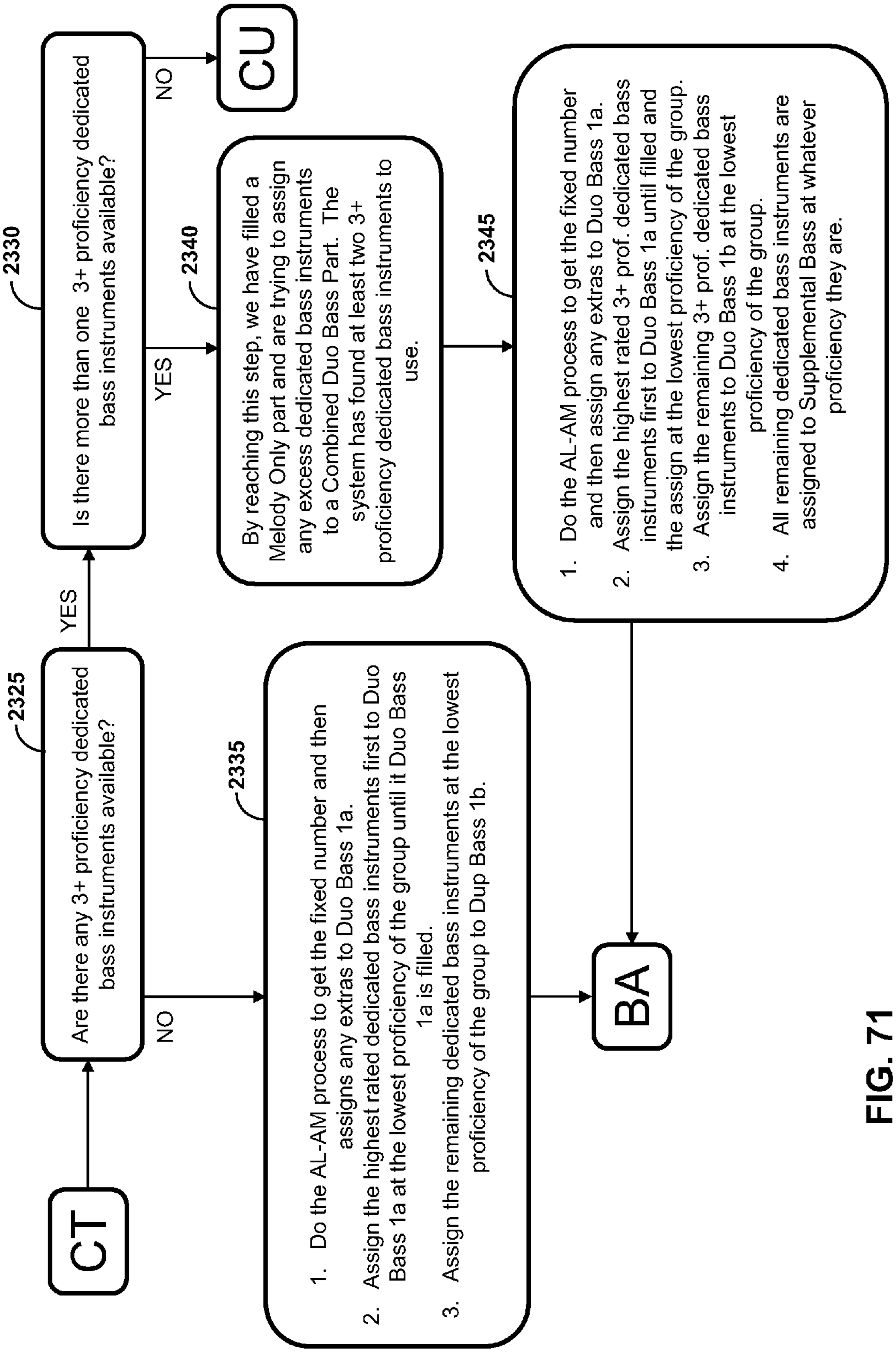
Figure 72:
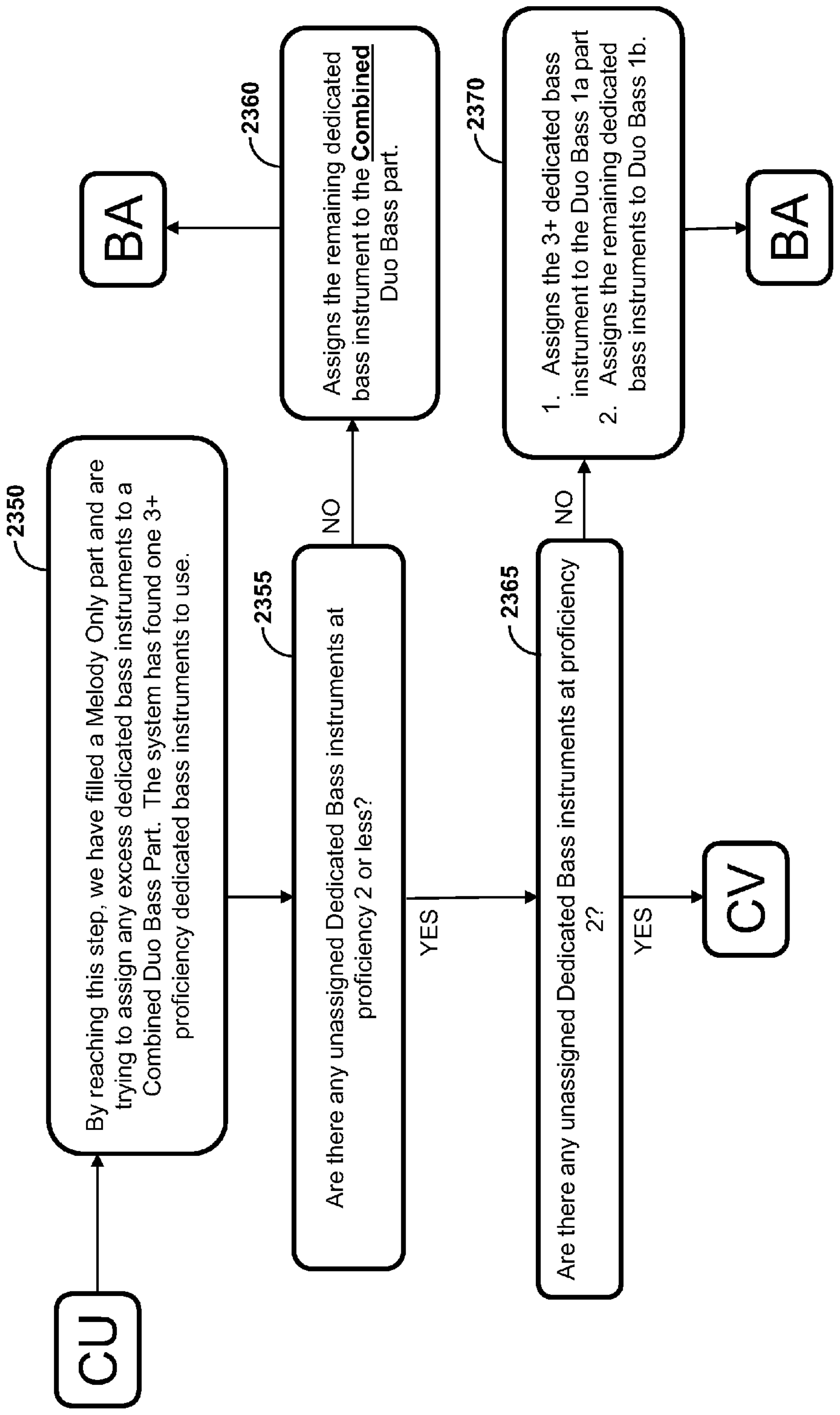
Figure 73:
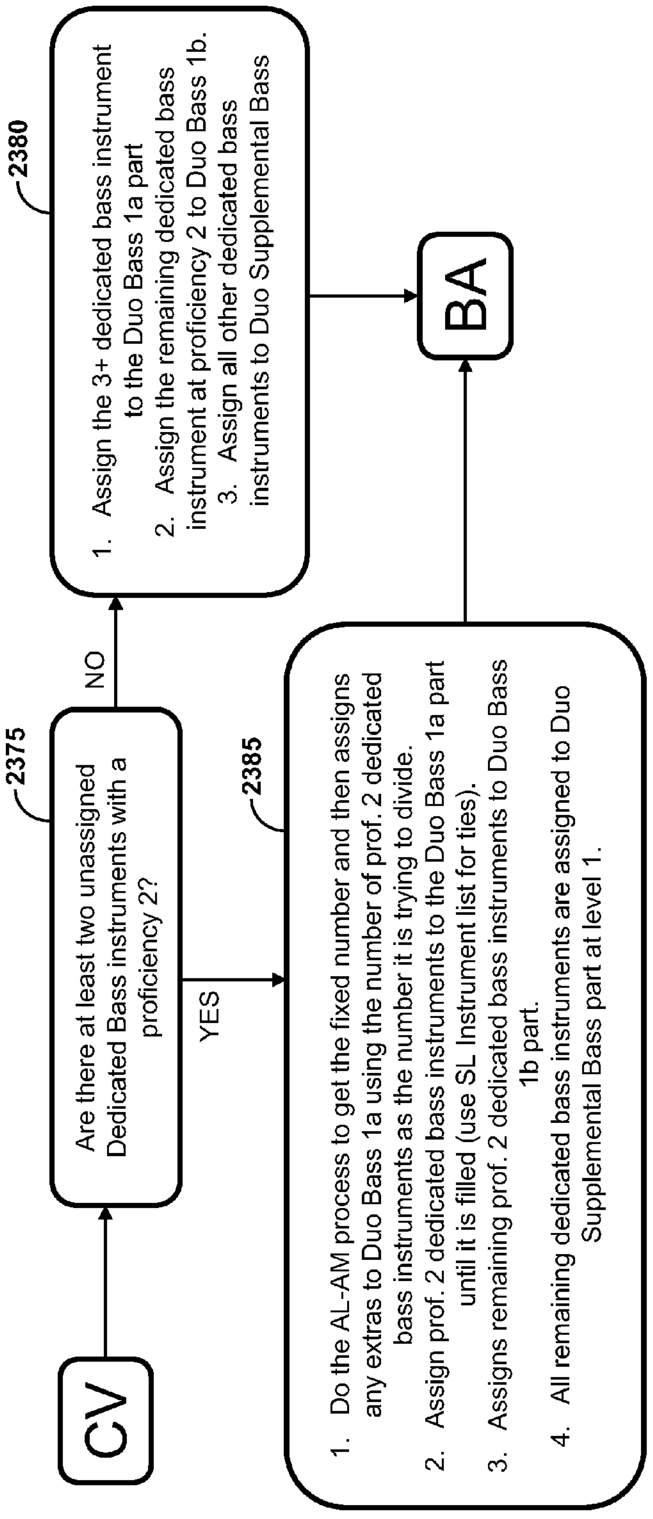
Figure 74:
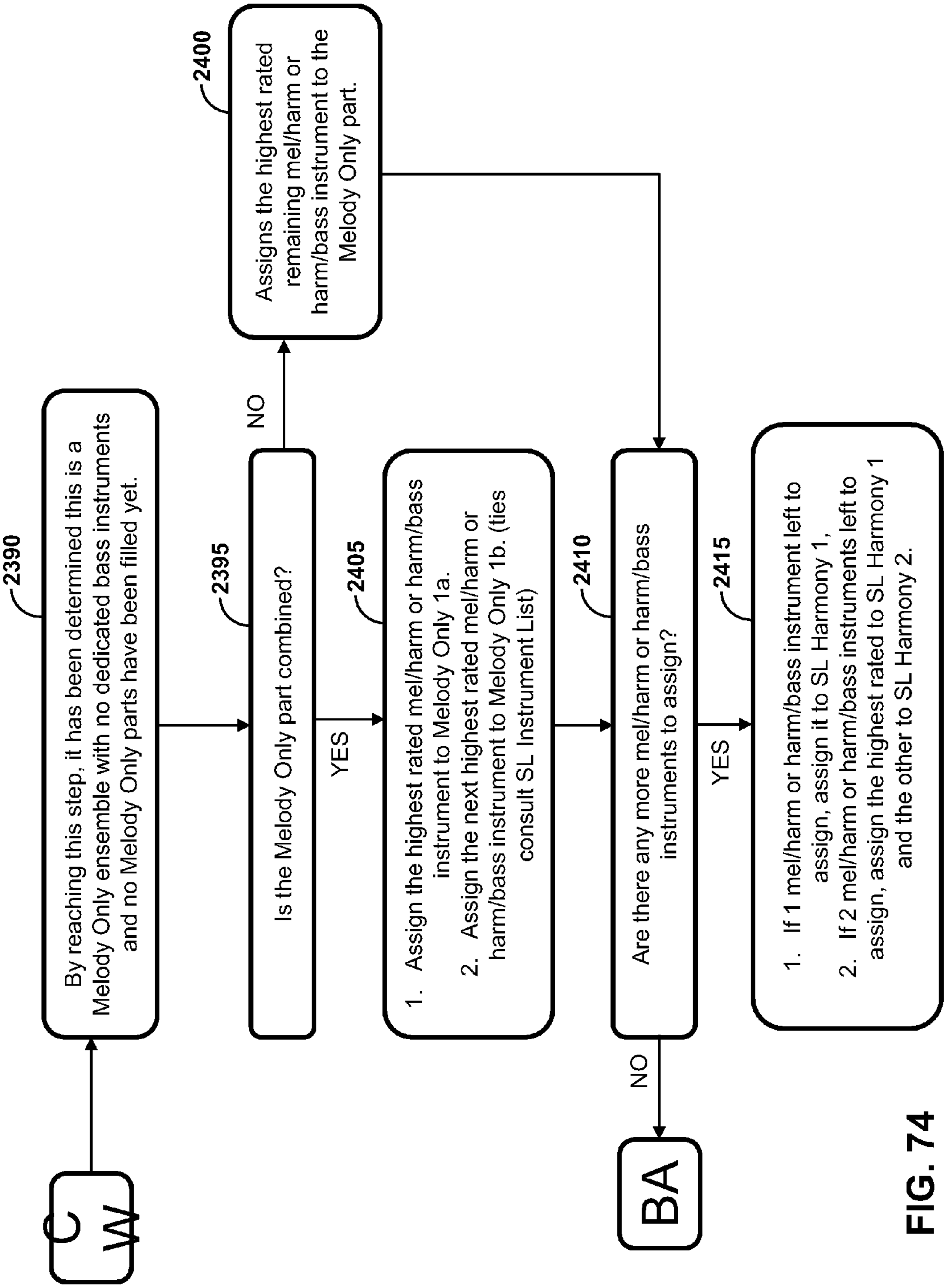
Figure 75:
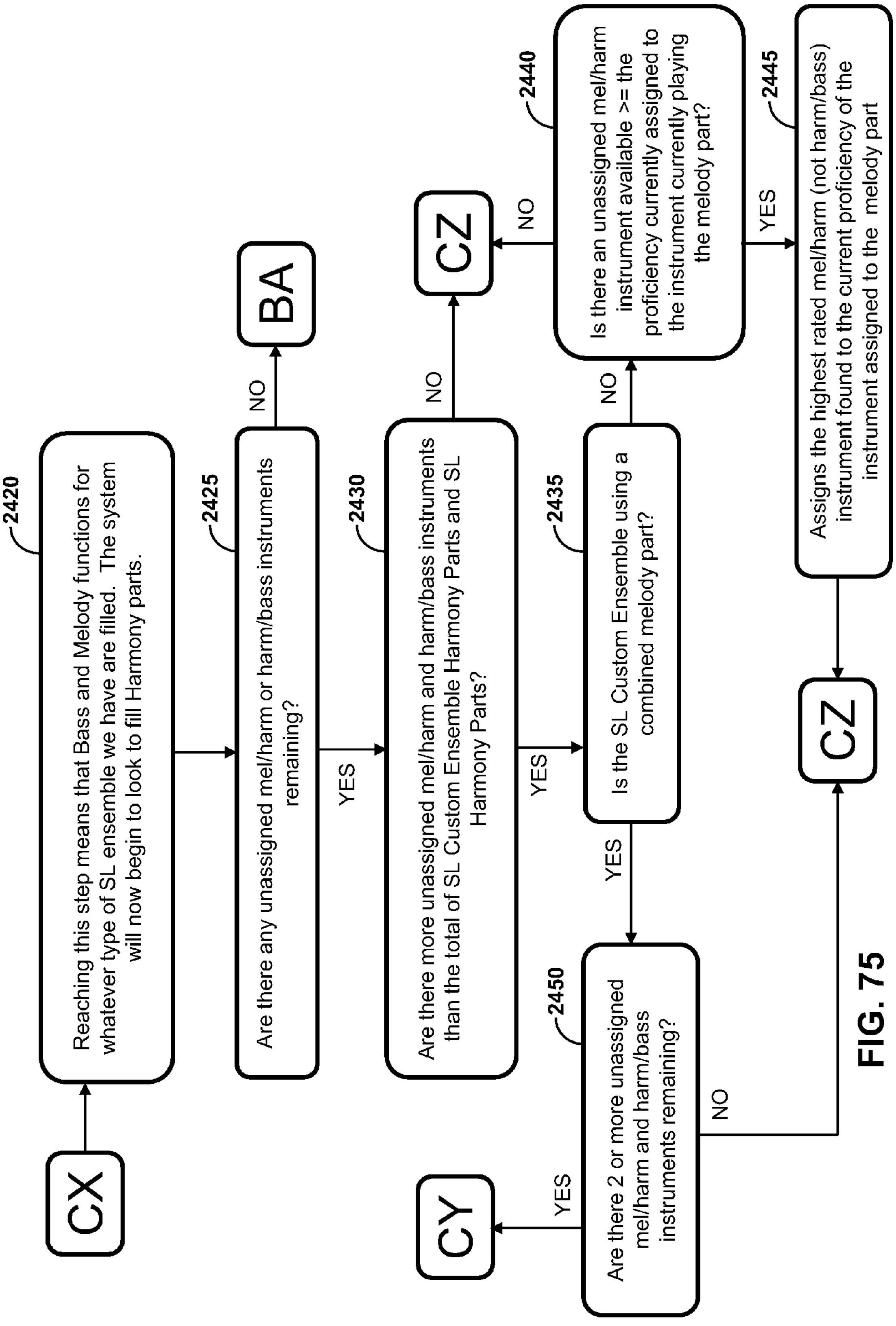
Figure 76:
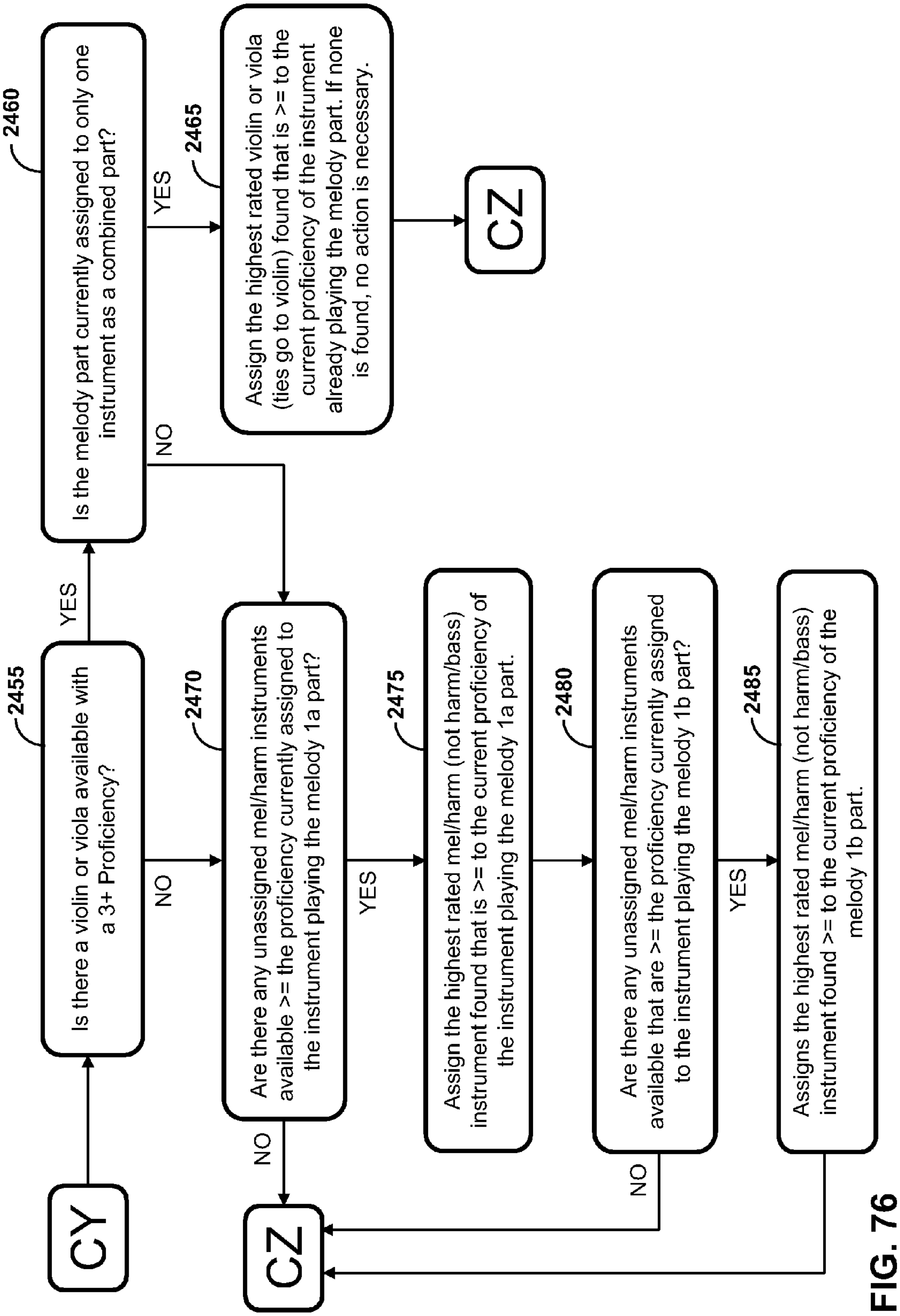
Figure 77:
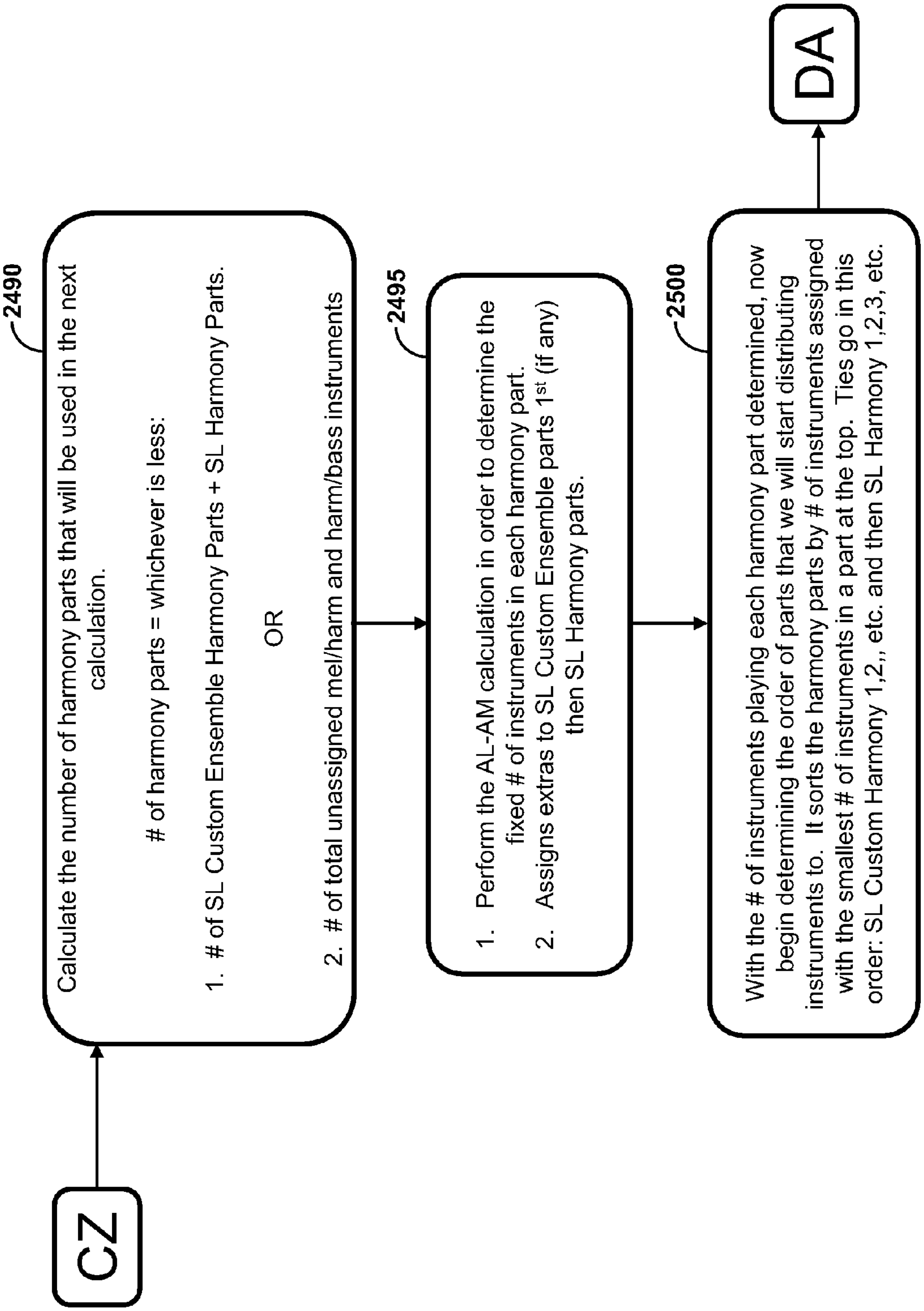
Figure 78:
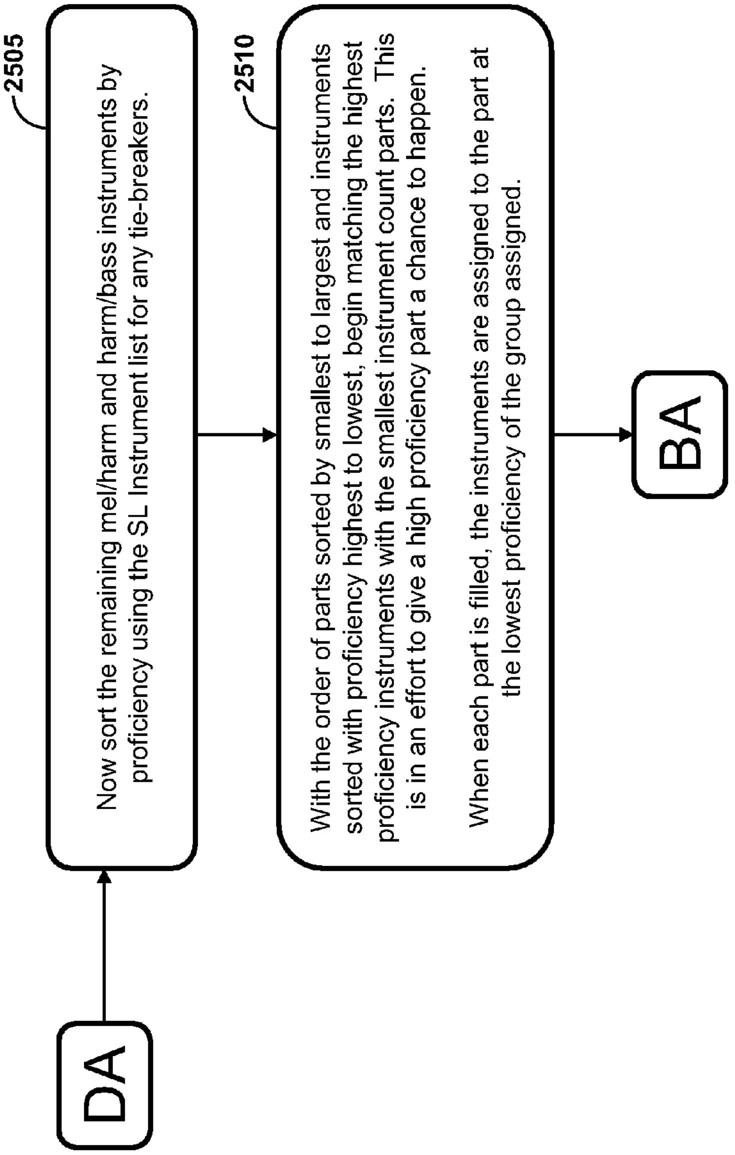

By reaching step 1315 (FIG. 41), it has been determined that the present ensemble is a Small Ensemble (SL). If there are solo parts in this piece, the instrument(s) being used have already been flagged, but no other instruments should be flagged for any particular role besides solo instrument parts.

First, it is determined whether the ensemble is a low proficiency ensemble. If so, a shorter arrangement is selected. If the ensemble is deemed a low proficiency ensemble (step 1315) the label of the ensemble is changed from SL to ELSL. With the type of ensemble clarified, it is now appropriate to assign any instruments flagged for the solo part (if used) to the correct ensemble type (step 1320).

The SL arrangement process introduces several additional concepts. The first is the manner in which combined parts are used. As previously discussed, in non-SL ensembles, combined parts are used only in connection with solo parts. In SL ensembles, any part type may be combined. As discussed, with non-SL solo parts, one use of a combined solo part is to break out solo lines that are usually played by keyboard instruments. In a variation of this concept, two separate lines, originally played by a single keyboard player, could be broken out to be played by two less-skilled keyboard players, or by instruments that can only play one note at a time.

In the SL environment, combined parts do not contain multiple parts, but instead would be best played by string instruments, which do not need to be concerned with breath control. That is, a string instrument (such as a violin, viola, cello, or double bass) can play continuously without resting, but wind instruments need breaks to rest and breathe. A string instrument that is at a proficiency of 3 and above is deemed capable of playing combined parts without having to break them apart.

Another aspect of the ensemble process is the concept of SL Custom Ensembles. These are sub-ensembles within SL or ELSL ensembles. Small ensembles present a particular set of challenges, and therefore the manner in which a two part ensemble is written can vary greatly when compared to how a four part ensemble is written. As a result, a "Max SL Custom Ensemble" is chosen as the highest sub-ensemble and all others will be available under that number. For example, if the Max Custom Ensemble is a quintet, the number would be five. That means we have a special custom ensemble for a quartet (4), trio (3), duo (2) and Melody Only. Note that sub-ensembles are considered apart from of solo parts, which have already been assigned.

SL Custom Ensemble parts will be labeled and those specific parts are incorporated into the final score. For example, "SL Trio Melody Combined—Proficiency 3" may be assigned to an instrument, or if broken out, "SL Trio Melody 1*a*" and "SL Trio Melody 1*b*" may be assigned. An SL Instrument List may be consulted. This list is more comprehensive than solo, melody, and featured harmony lists seen earlier. It includes guitar, keyboards, pitched percussion, and bass instruments and is used as a tie-breaker when two or more instruments all have the same proficiency.

SL Custom Ensembles follow the same types of parts, regardless of the composition. That is, a Duo will have a melody part and bass part, and a Trio will have a Melody, Bass, and Harmony part.

When there are no melody/harmony or harmony/bass available to use in the SL (or ELSL) Ensemble, the SL Custom Ensembles are not used. Rather, melody, harmony and bass parts simply labeled as SL or ELSL are used. Occasionally, these types are used in conjunction with SL Custom ensembles, and it is typically used when the max SL Custom ensemble is being used and there some leftover parts to assign. The SL Harmony parts may be used to add new parts onto the arrangement. If for example the Max SL Custom ensemble includes five instruments, and the HS/EL process requires at least eight total instruments, there can be ensemble numbers caught in the middle and that is when we typically see SL Custom Ensemble and SL Harmony parts mixed together (see, e.g., step 2430).

The process for SL Ensembles is detailed in steps 1315-2515 (FIGS. 41-78). In the interest of brevity and minimizing discussion of repetitive or redundant aspects of the present embodiment arising from all the different scenarios which can occur, an example process flow is described below. Alternative process flows will be apparent to the skilled artisan upon studying the drawings in view of the present description.

Various scenarios that can occur are: 1. No available melody/harmony or harmony/bass instruments as seen in FIGS. 42-46 (steps 1345-1520); Melody/harmony or harmony/bass instruments available with no dedicated bass instruments available as seen in FIGS. 47-52 (steps 1525-1740); Melody/harmony or harmony/bass instruments and dedicated bass instruments are available as seen in FIGS. 52-65 (steps 1710-2170); the SL Custom Ensemble is "Melody Only" as seen in FIGS. 66-74 (steps 2175-2415); Assignment of harmony parts to an SL custom ensemble where the melody and bass parts have been filled as depicted in FIGS. 75-78 (steps 2420-2510).

After completing the SL Process, steps 1265-1310 (FIGS. 39 and 40) are executed to complete the assignment of any instruments that are remaining, thereupon processing continues with step 2515 (FIG. 79).

Instrument Part Number Assignment

Turning now to FIG. 79 (step 2515), in order for parts to make sense in an ensemble environment, parts must be enumerated in a way that makes sense to different instrument sections. Customarily, the best players (e.g., highest proficiency players) are given the highest instrument parts, and the lower rated players are given lower numbers. Note that it is acceptable to have more than one performer playing the same instrument part. For example, the best two flautists in the ensemble may be assigned to the same part, and the next-best two may be assigned to play different parts even if they are the same proficiency. In this case the results may include: Flute 1 part played by two proficiency 4 flutes, a Flute 2 part played by a proficiency 3 flute, and Flute 3 part played by a proficiency 3 flute also.

The order of parts are assigned by part role, and since instruments are assigned in this order (by trying to make sure the best players are available for the high-profile parts), the part enumerations are ordered in a similar manner: Solos, Featured Harmony, Melody/Tethered Harmony, Harmony, Bass, Supplemental Bass, Level 1 Harmony, and, lastly, all other functions.

Final User Selections

Figure 80:
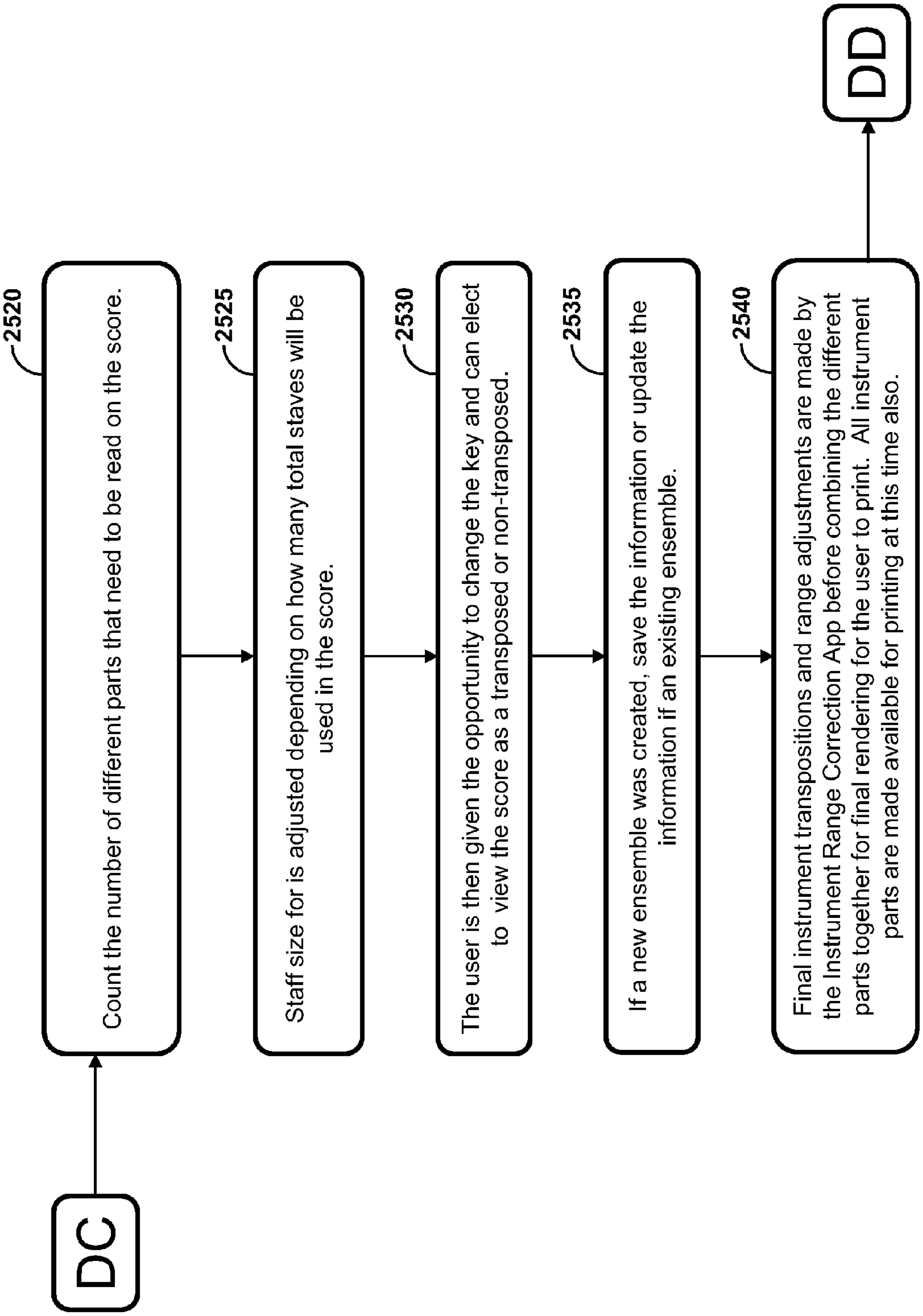
Figure 81:
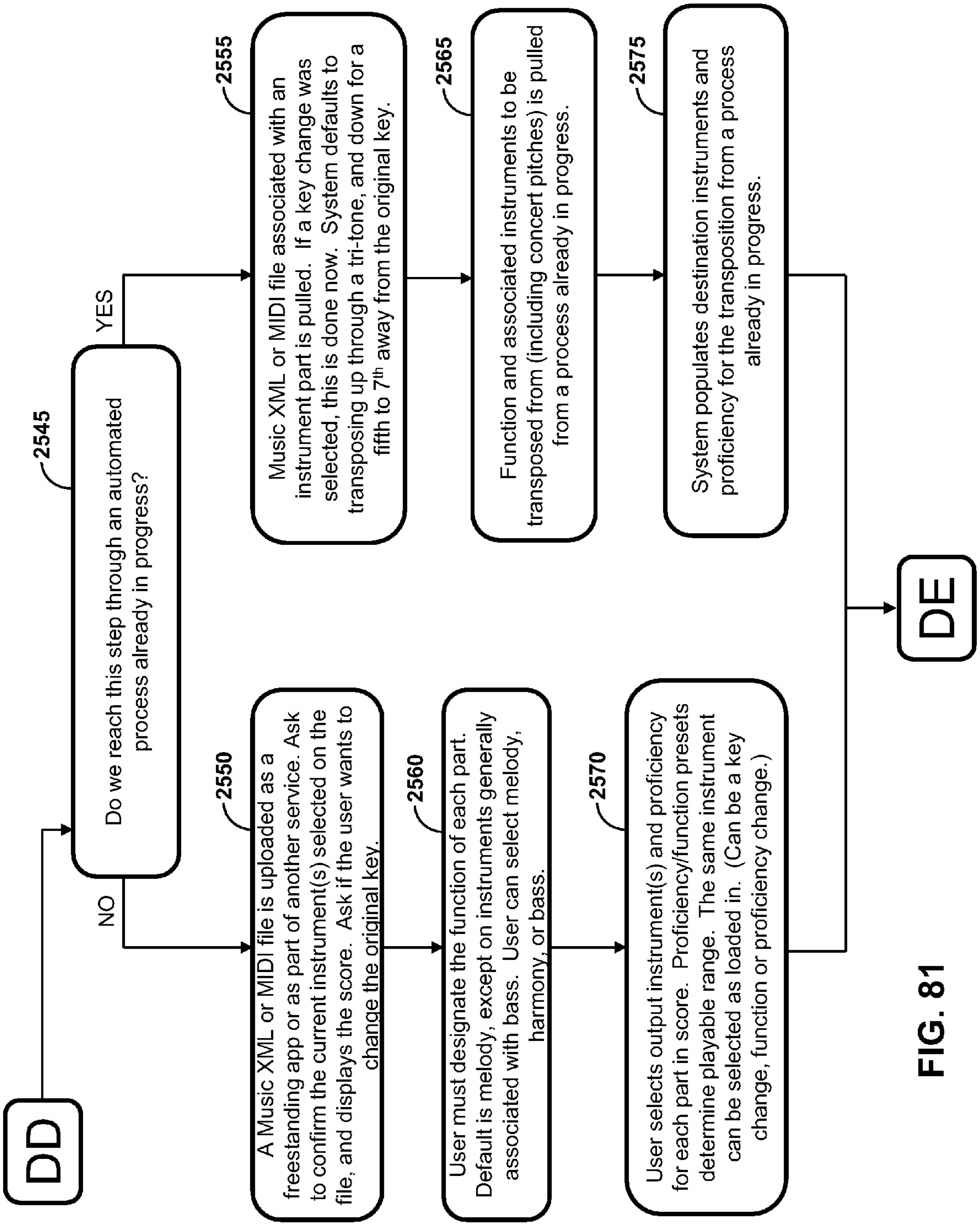
FIGS. 81-93 depict a detailed flowchart of a method for performing instrument range correction according to an embodiment of the present disclosure.
Figure 82:
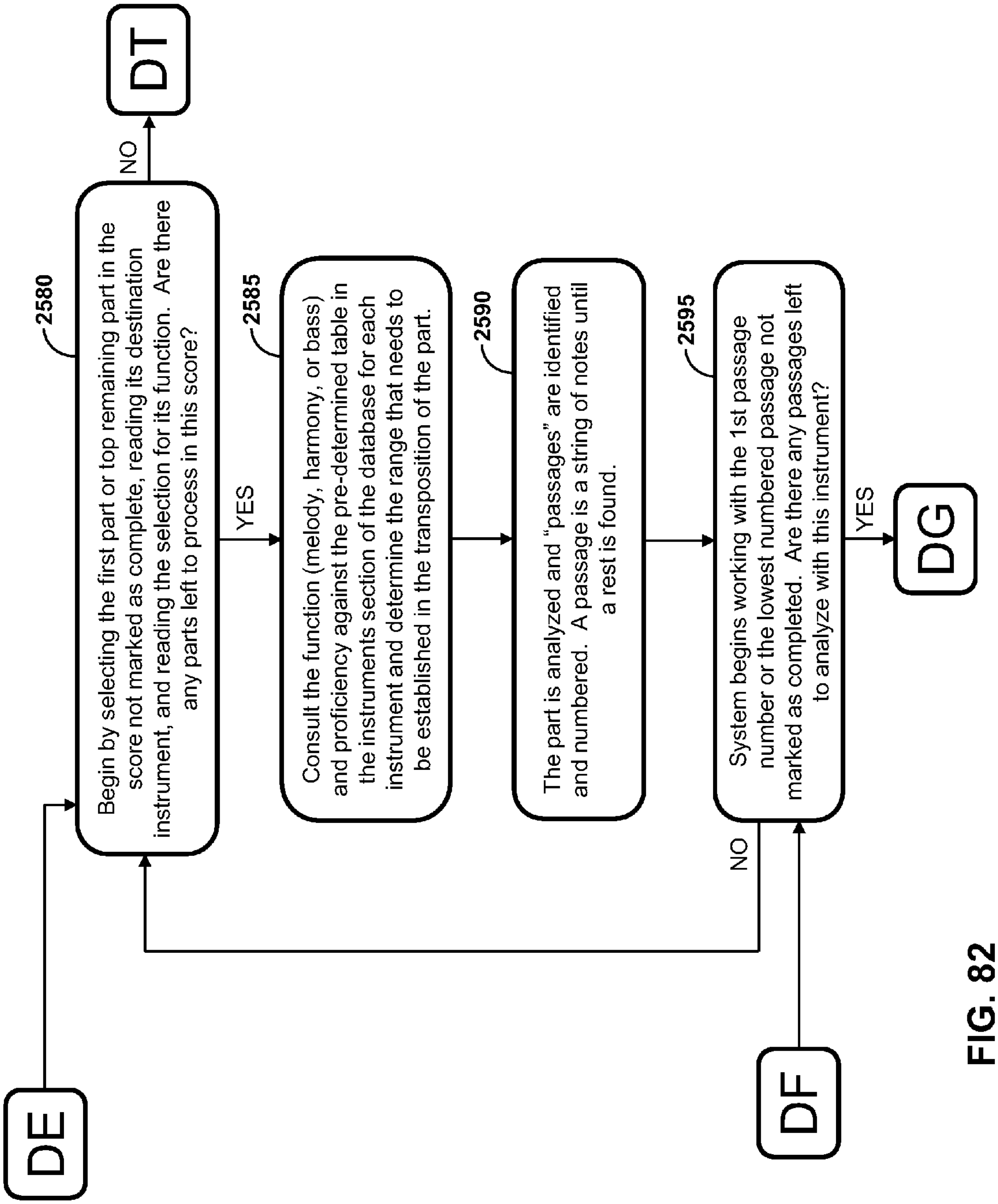

After all instruments in the ensemble have been assigned to parts, the score is nearly complete. At this point (FIG. 80), a number of finalization steps are performed. In step 2520, the distinct parts that need to be presented in the score are identified and counted. For example, if four violin players are assigned to a "violin 2" part, only one violin 2 part needs to be shown in the score. Once the number of parts is determined, which corresponds to the number of staves in the conductor's score, the staff size of the conductor's score is established (step 2525). This count will influence the staff sizing allowing the display to be appropriately sized. For example, if there are only 6 instruments in the ensemble, the size of the staves and notes can be larger than if 10 instruments need to be displayed on the same page.

In step 2530 the user may define the score as transposed or non-transposed. That is, that the pitches will either be displayed in their concert pitches or transposed pitches. For example, a concert C would read as a written D on a trumpet part, because a trumpet transposes up a major second.

In step 2535, if the ensemble was newly-created or modified, the ensemble profile information is saved or updated. The use may change the concert key of the entire arrangement (step 2540). That is, the default key which is determined at least in part by the arrangement parameters, and by decisions made during the assignment process, may be overridden by the user in order to better accommodate the final arrangement as played by the target ensemble.

With the concert key established and instruments assigned to parts with proficiencies, final range correction modifications to the individual instrument parts may be performed before displaying the final arrangement for printing Instrument Range Correction Process With reference now to FIGS. 81-93, the instrument range correction process is described. Instrument range correct can function as part of the entire process for creating automated custom arrangements, or can be a stand-alone application on its own. The objective of instrument range correction is to change selections having in a first, original range of notes into a selection having a second, target range of notes that better suits fit the role of an instrument as well as the player's proficiency level.

In one aspect, complexity informs the proficiency necessary to perform a part in terms of rhythmic demands (for instance, using nothing smaller than quarter notes for low proficiency players, adding ⅛$^{th}$ and 1/16$^{th}$ notes for better players, and including any rhythms for the highest-rated players). However, note range is also a factor in terms of playability, and therefore, proficiency rating. Typically, a beginning player learns a limited range of notes of the instrument, and gradually takes on the full range of the instrument as skill increases. For example, when learning a brass instrument, gaining lip strength is important before tackling to play higher notes especially. When changing keys and instruments it is important to factor in the ability of the player in terms of how the new part should be displayed.

Besides proficiency, part role also helps determine an instrument's ideal range. If an instrumentalist is playing a melody, solo, tethered harmony, or featured harmony part, it is important that the player take advantage of the full range of the instrument (of course accounting for proficiency). For harmony parts that are not the focus of the piece, one would typically arrange these as mid-range parts so that, ideally, melody parts will be above the harmony part. For bass parts (especially when non-bass instruments are employed to play these parts), one would keep the range as low as possible on the instrument to best mimic a bass instrument and keep the harmony and melody parts written above the bass part.

The instrument range correction logic consults the instrument list and contains range information per instrument for each proficiency and role. Because the logic may be employed in various scenarios, FIG. 81 details two potential starting points for the process. If operating outside of another automated process (e.g., not in the context of creating a customized arrangement), the process would start with a uploading a file and inputting the instrument, proficiency and role of the part (steps 2550-2570).

If, on the other hand, instrument range correction is being performed in the context of creating a customized arrangement, the instrument, proficiency and role information will be known from the earlier process. Both starting points consult instrument list range information.

With the necessary data at hand, the score is analyzed to identify how many different instrument parts must be processed (FIG. 82) and begin identifying "passages" within the first selected part. A passage is a term used in this process to describe a series of notes between rests. The part is analyzed and the passages are labeled within the part (steps 2580-2585).

Figure 83:
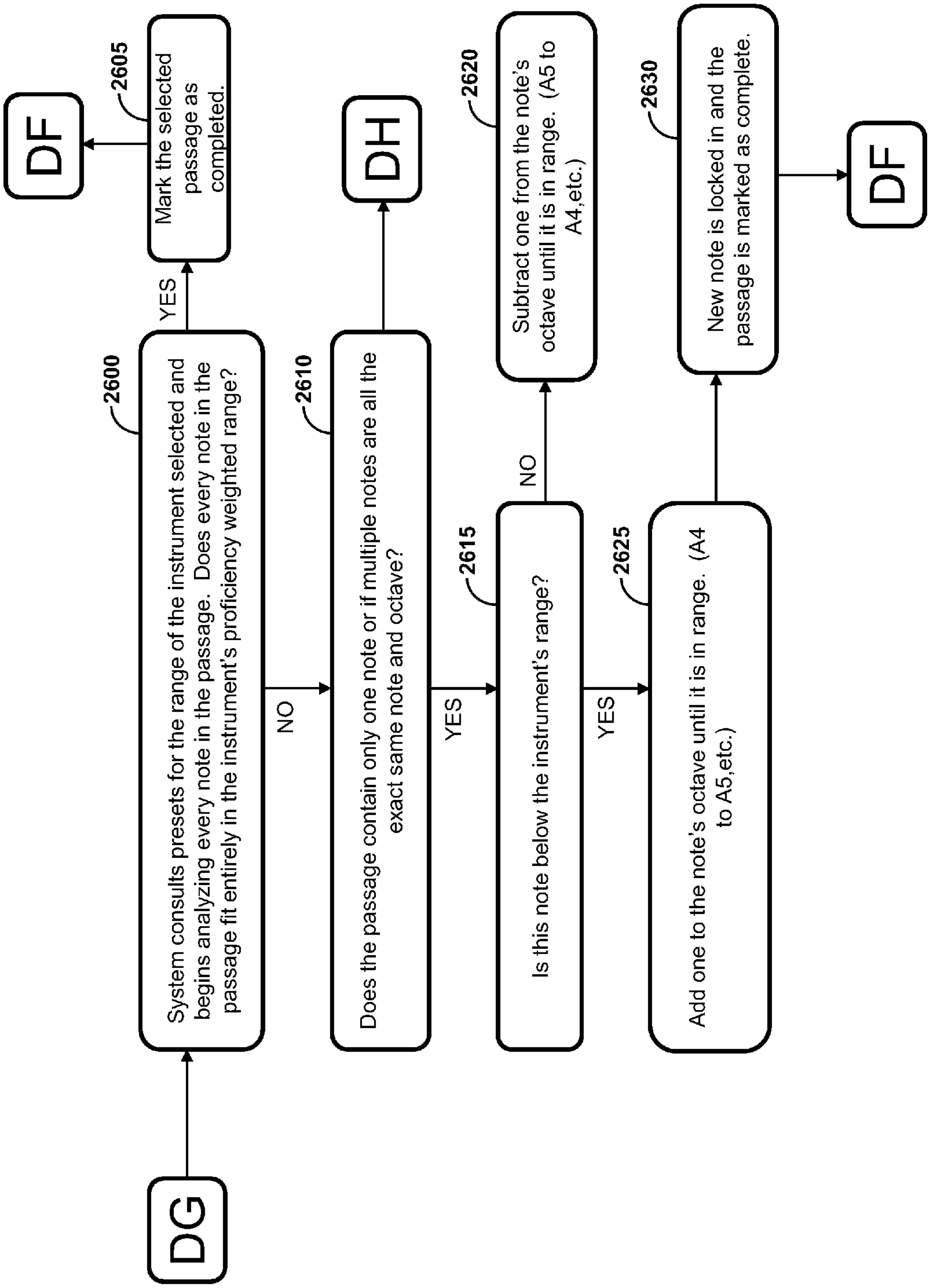
Figure 84:
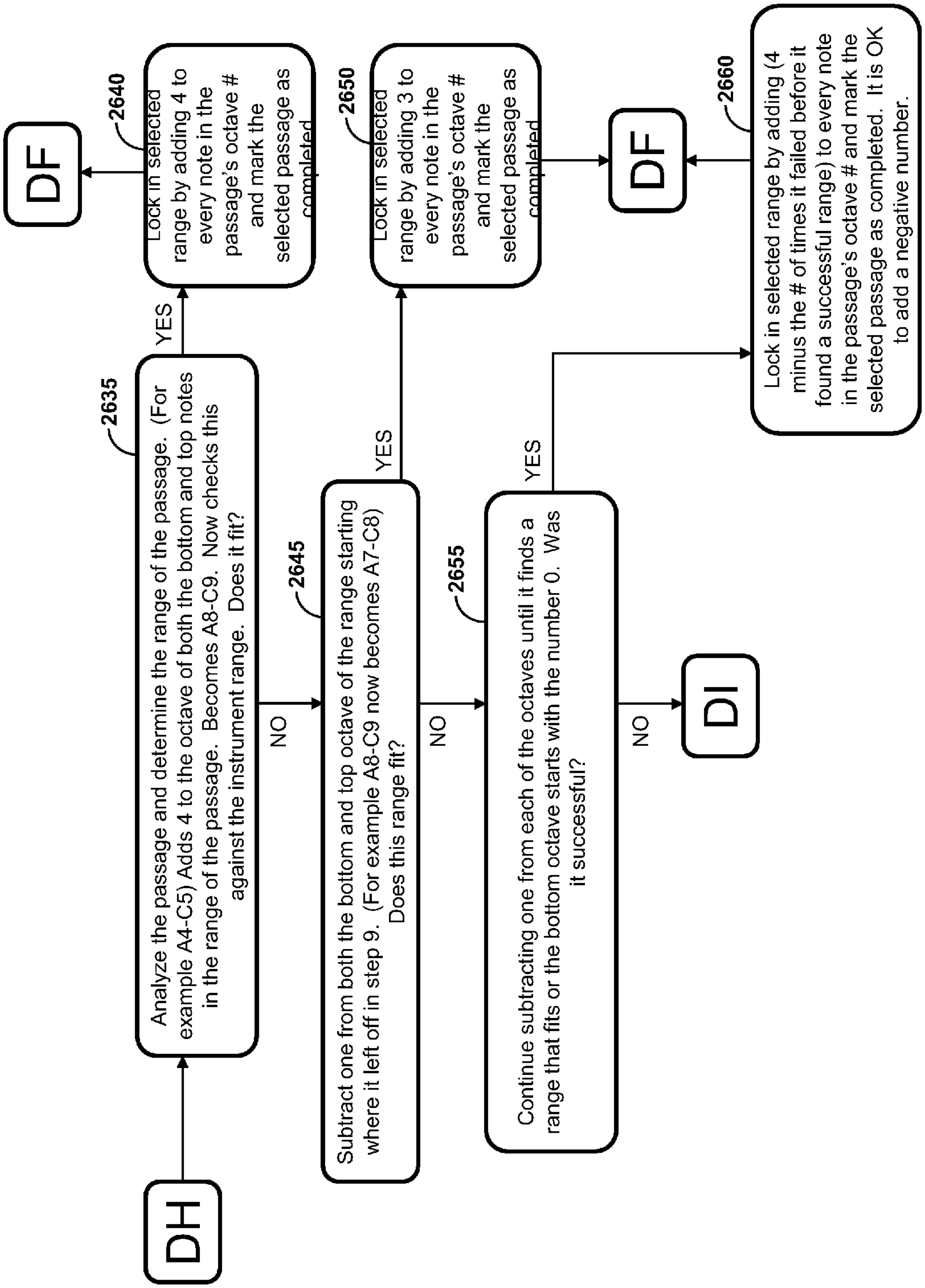
Figure 85:
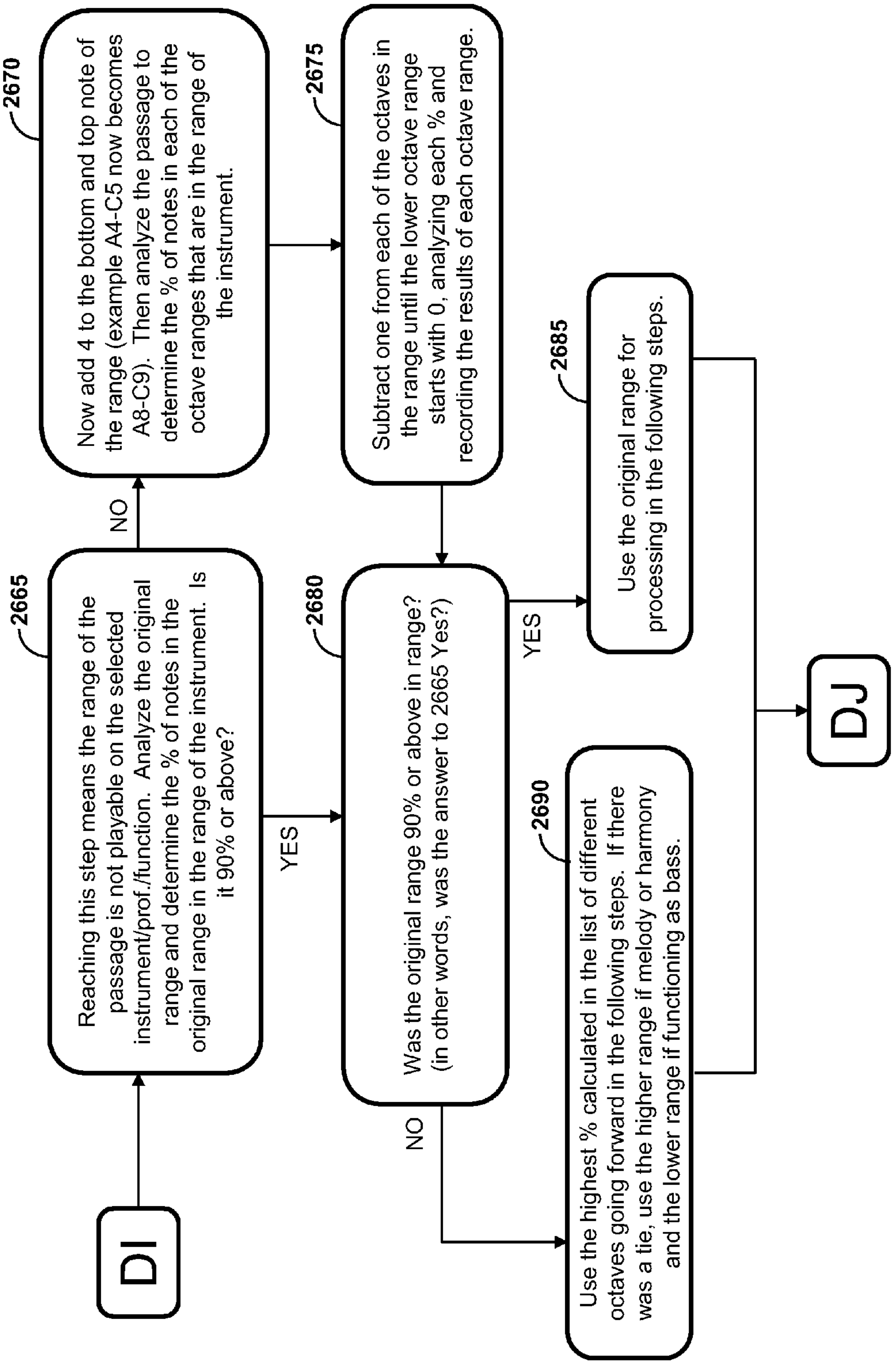

Referring now to FIGS. 83-85, notes within the selected passage are compared to the target range. If the passage contains only one note out of range (which may be repeated multiple times), the note is transposed by one or more octaves to place it within the target range (steps 2600-2630). As will be appreciated by those skilled in the art, "interval" is a musical term for the distance between two notes. The smallest interval in western music is the half step. The interval name for the distance of two half steps is a whole step. There are twelve half steps in an octave.

In FIG. 84, the passage as a whole is examined to determine its lowest and highest note. If moving the range up or down by an octave will enable the passage to fit within the target range, the part is transposed accordingly (steps 2635-2660). If an octave transposition does not fix the out-of-range notes (FIG. 85), the set of notes is adjusted through several octave ranges (preserving its original melodic contour), and analyzed to determine which octave range has the highest percentage of notes in the target note range (steps 2665-2690).

Figure 86:
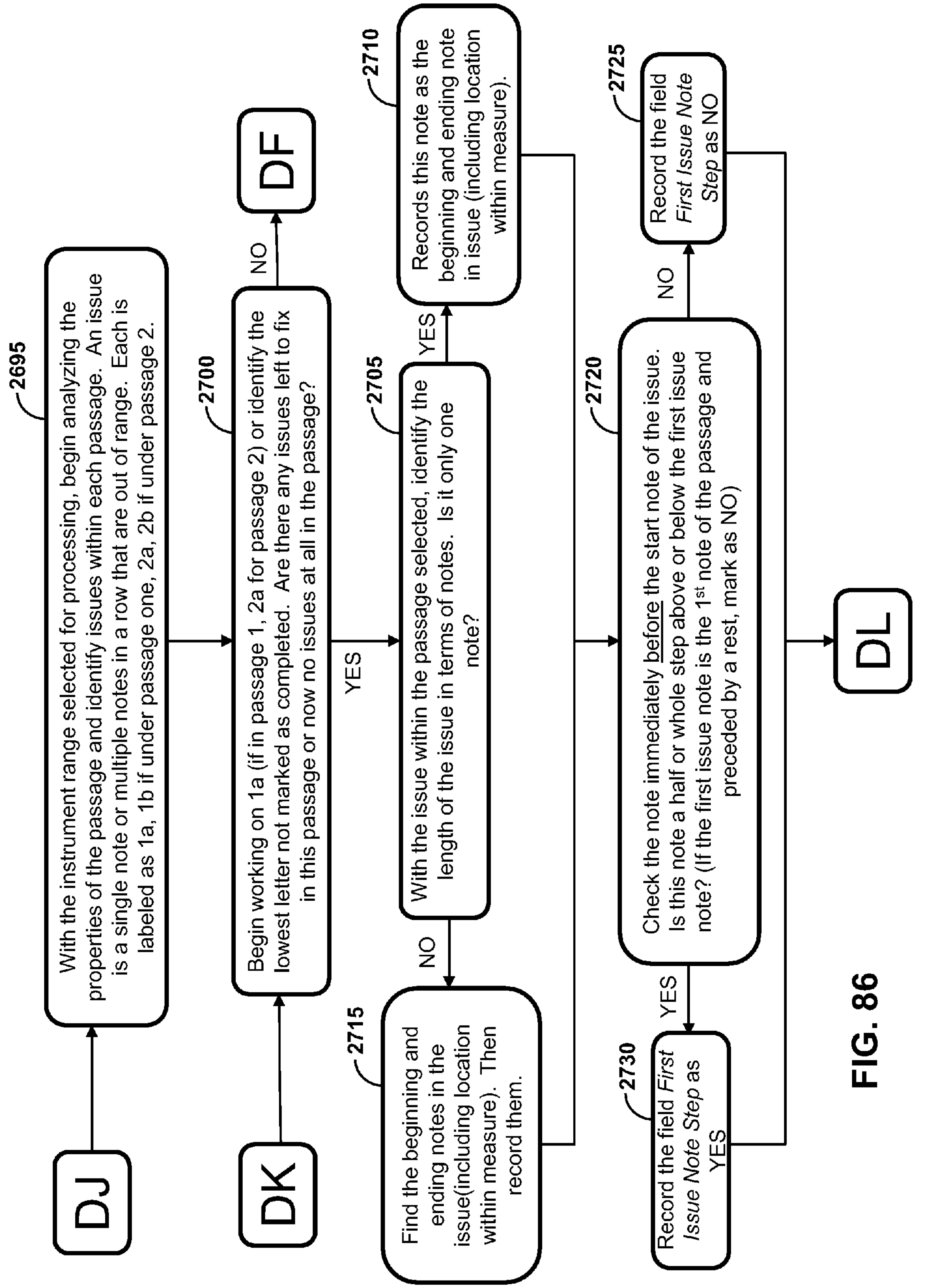
Figure 87:
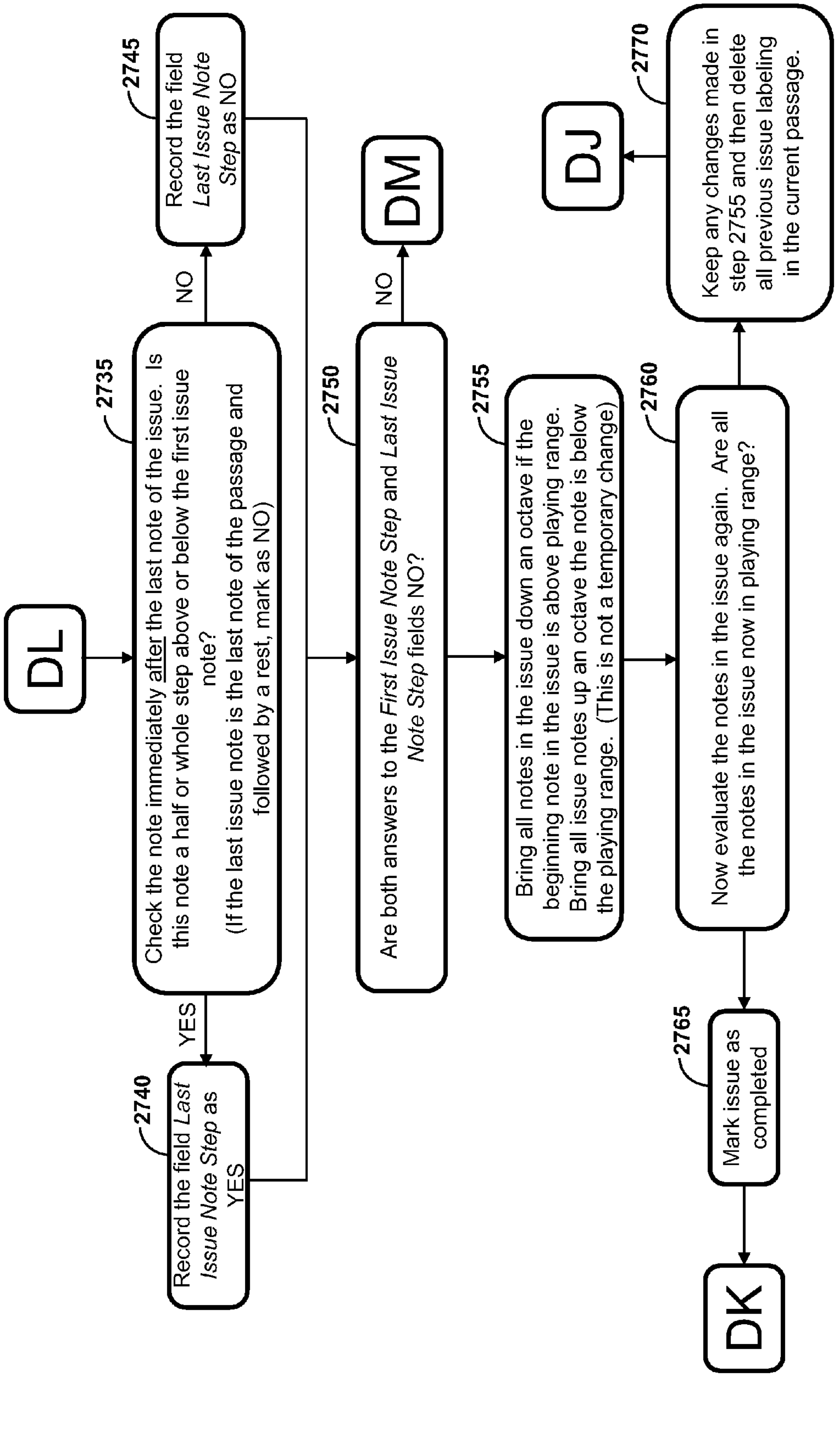
Figure 88:
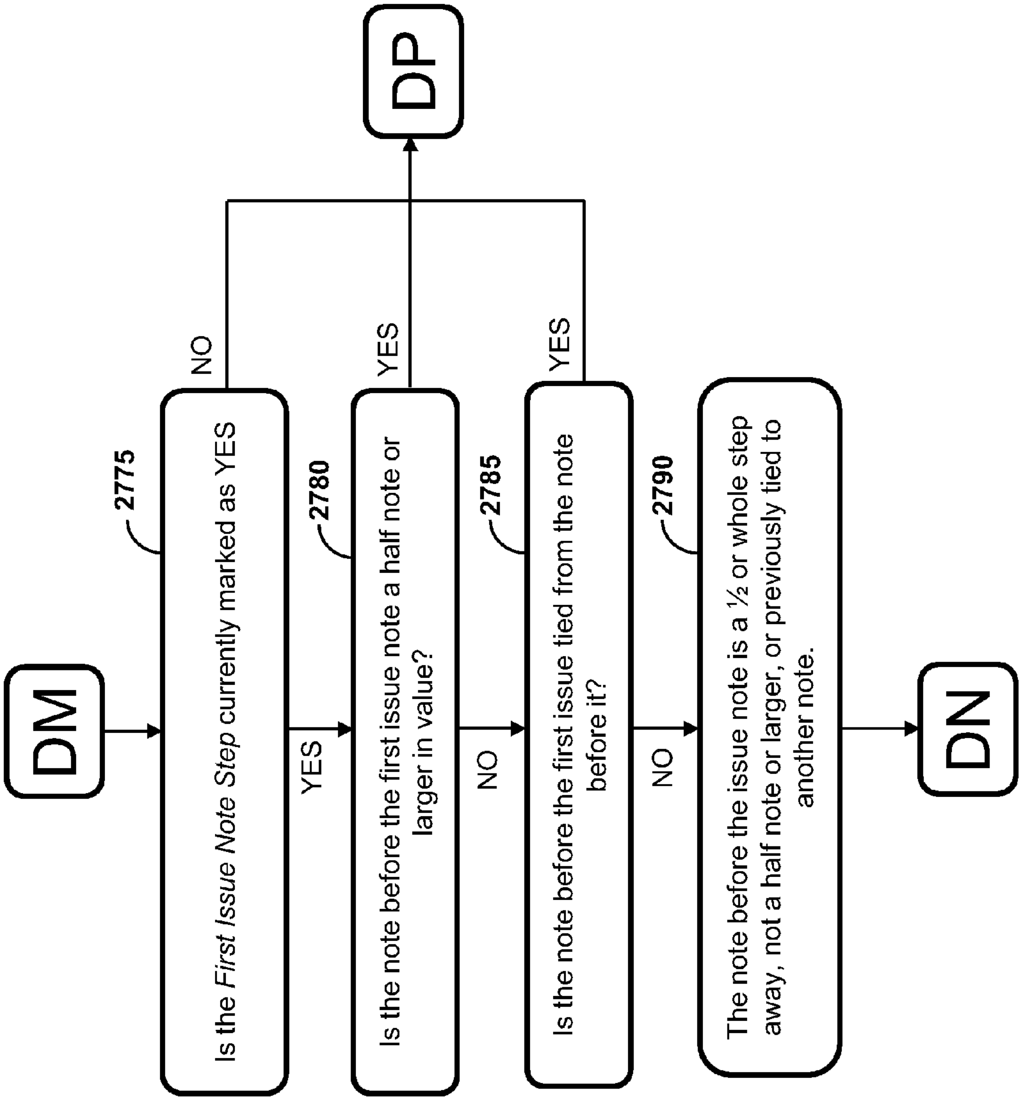
Figure 89:
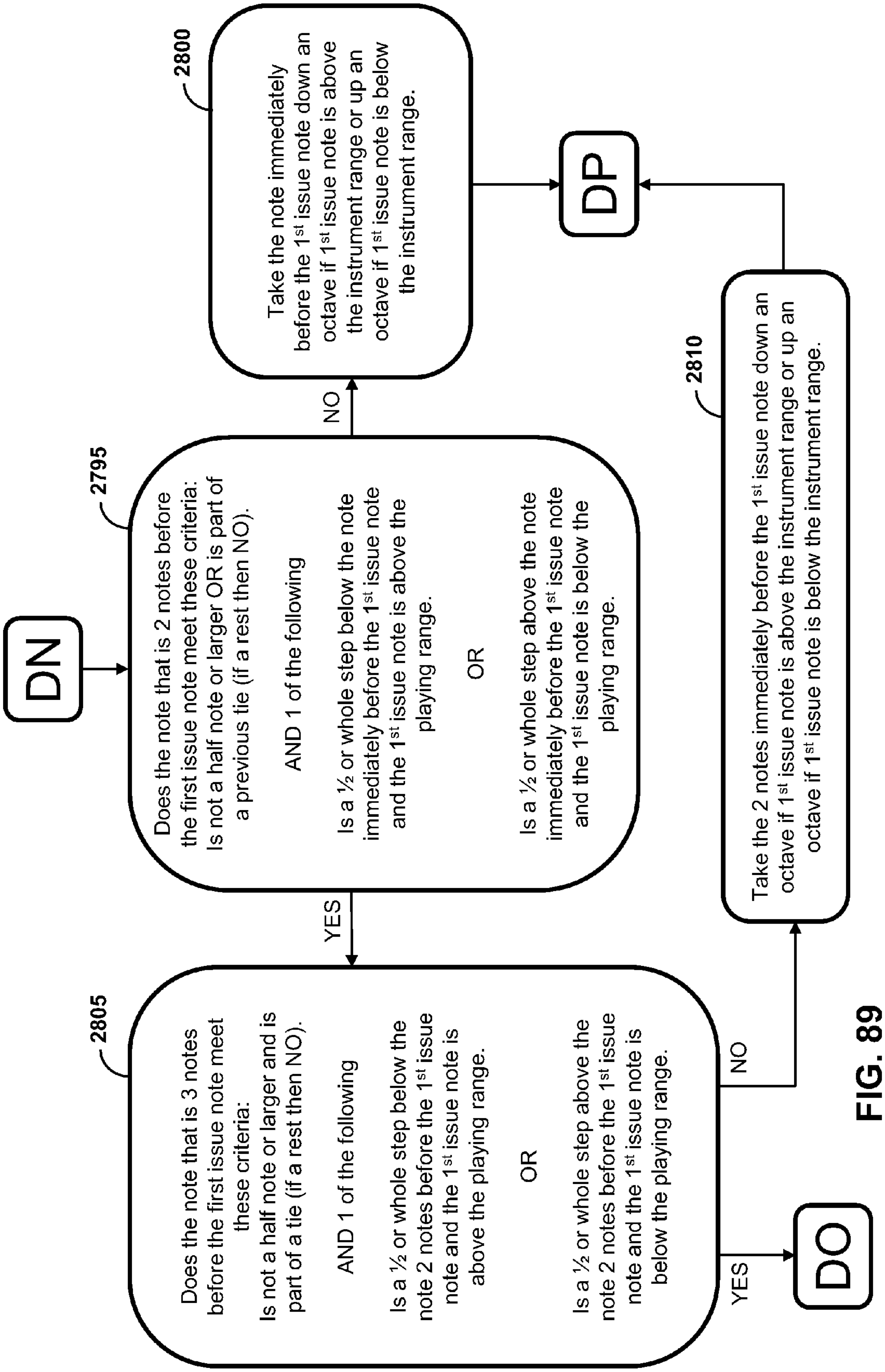
Figure 90:
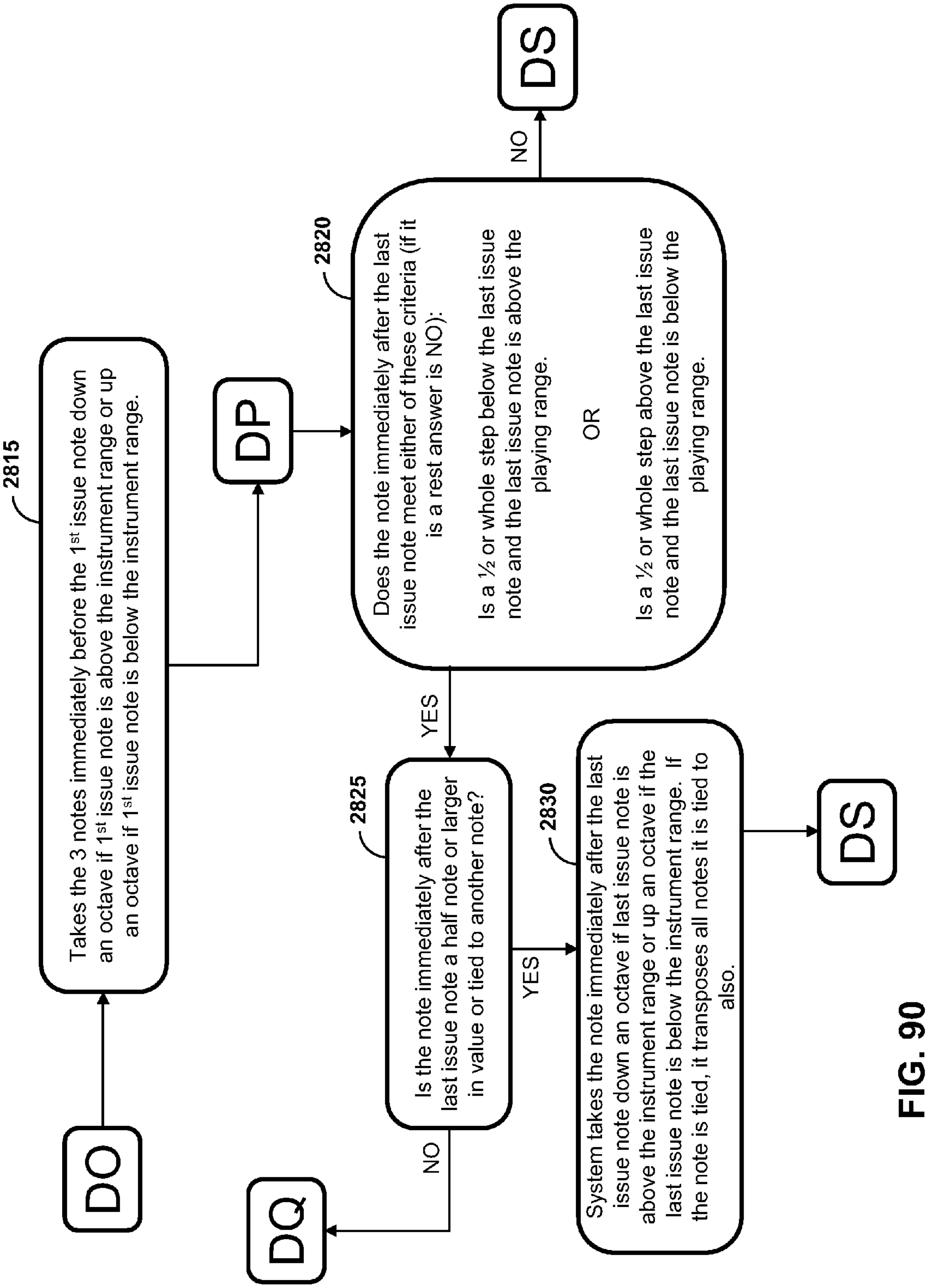
Figure 91:
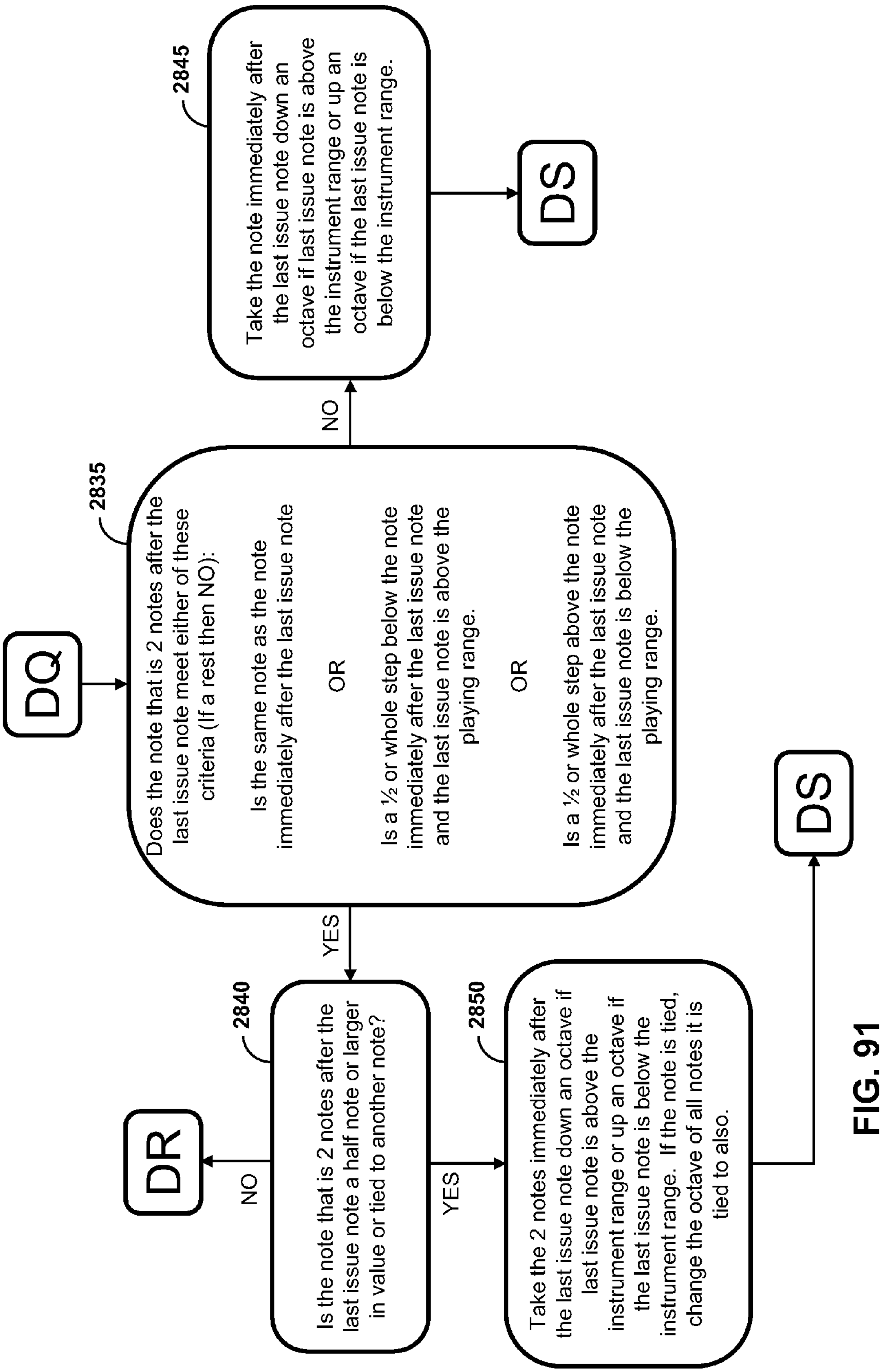
Figure 92:
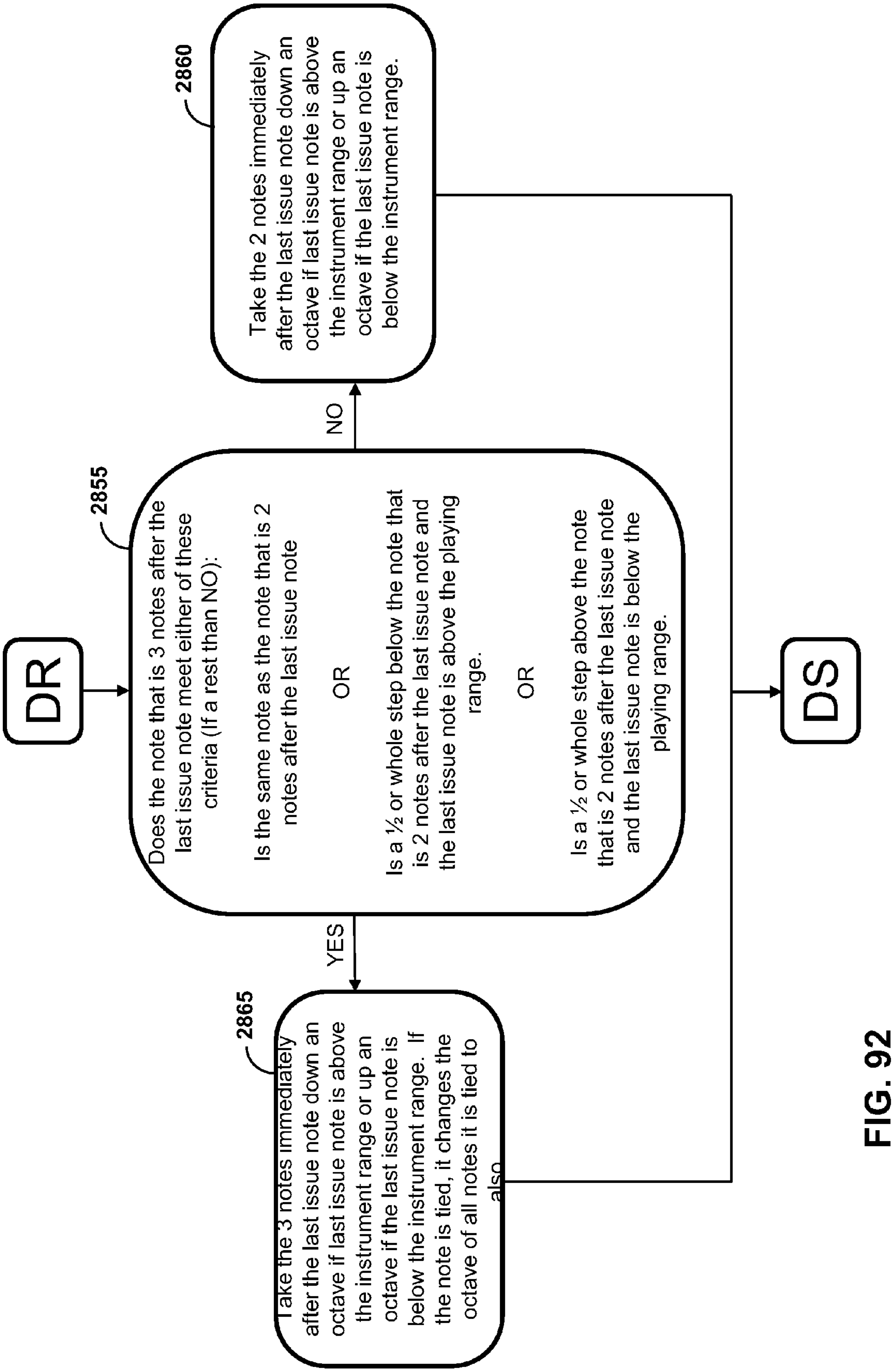
Figure 93:
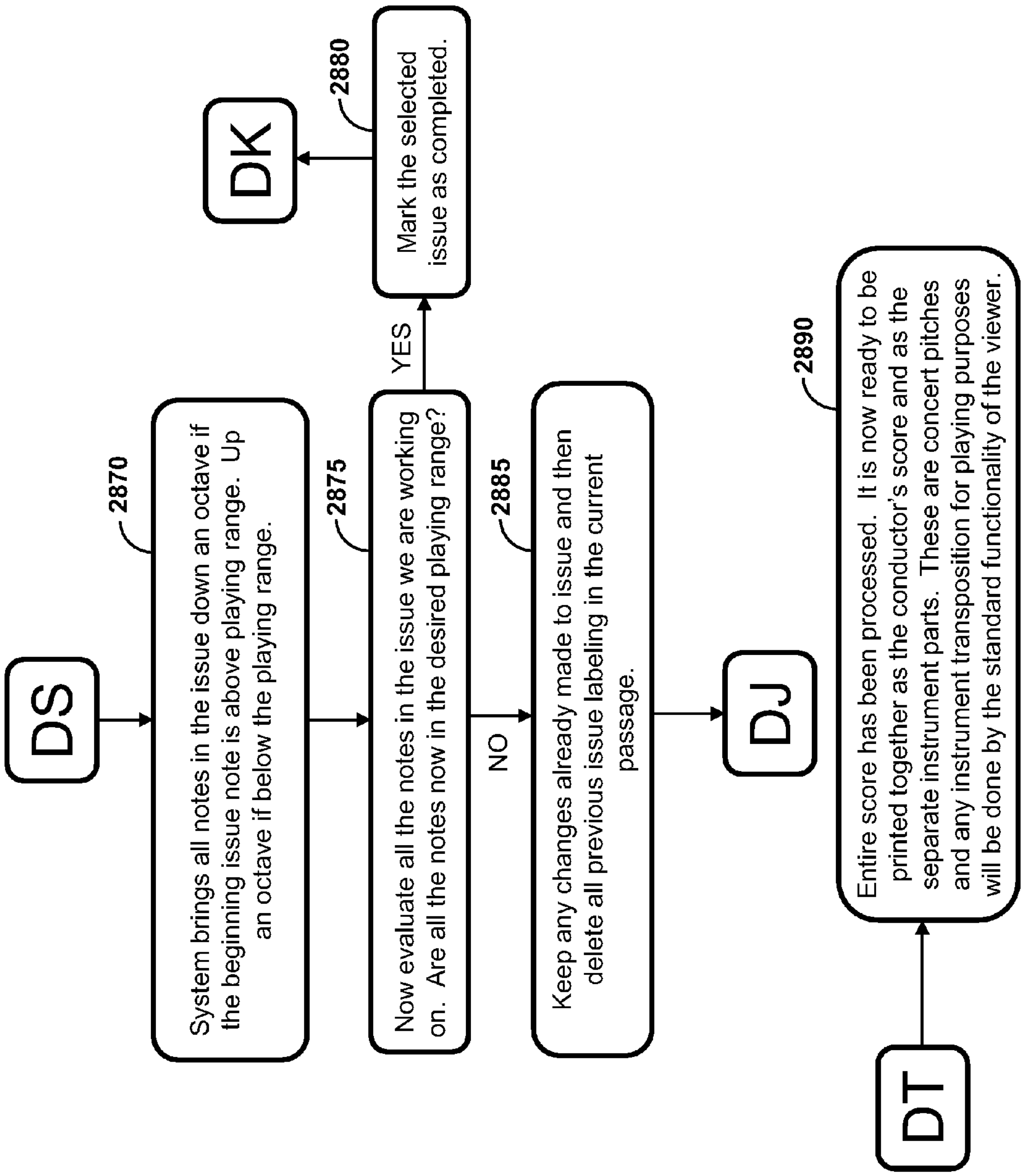

In FIG. 86, note groups ("issues") within the selected passage which are characterized by single or consecutive notes that are outside the target instrument range are identified and labeled (step 2695). Beginning in step 2720 and continuing through step 2885 (FIGS. 86-92), the process seeks to identify whether the notes in question are part of a smooth line starting before the first note in the issue, or continuing after the last note in the issue. The objective here is to achieve a flowing part that best represents the shape and contour of the original line, e.g., to avoid a sudden jump in the line of the transposed part that is not characteristic of the original shape of the instrumental line. This aspect of the present disclosure prevents the transposition from becoming "jumpy-sounding" and also prevents the part from becoming awkward to play. The notes preceding and following the first and last notes, respectively, of the issue are analyzed to determine if a half- or whole step interval is found (if so, simply transposing the issue notes down an octave will not help achieve the smooth transition found in the original contour of the instrumental line). For example, if an issue note which is in range is followed by another note just above it that is out of range, both the issue notes and the identified non-issue note(s) are lowered one octave in order to create a smoother transition (steps 2720-2770). If the first note of the issue is preceded by a rest, or the last note of the issue is followed by a rest, then the preceding or following note is categorized as not being a half- or whole step interval (steps 2720-2745). If either the preceding or following notes are a half- or whole step interval, the issue notes are transposed an octave in the appropriate direction, and re-evaluated (steps 1750-2770).

Steps 2775-2860 (FIGS. 90-92) analyze one, two, and three notes before and after the first or last issue notes, respectively, in further attempts to make the line as smooth as possible by transposing varying groups of notes by an octave in order to achieve the desired smoothness criteria. After this processing stage, the passage or even individual issues may be improved but not be entirely remedied. For example, in FIG. 93 (steps 2870-2880), the entire issue may be transposed up or down an octave. In some instances, this will be sufficient to address many elements of the issue, but can potentially create new issues. For this reason, the process iterates to the step 2695 in an attempt to bring all the notes in each issue into the target range. Once an issue has been processed successfully, e.g., the notes are within the target range, the process iterates to the step 2700 whereupon the next issue is processed. After all issues have been processed, the instrument range correction process concludes, and the score is ready for delivery to the user.

Exemplary System Configuration

Figure 94:
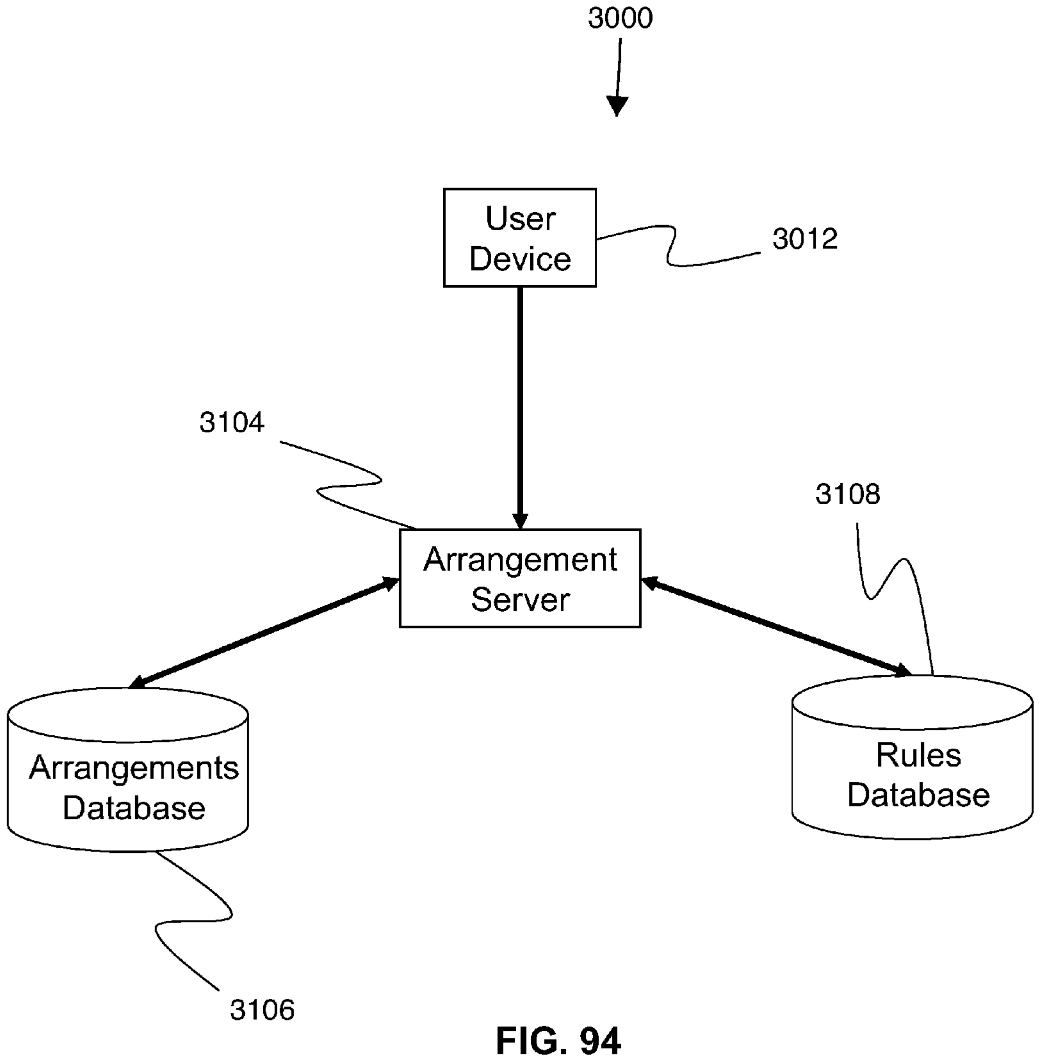
FIG. 94 is a block diagram illustrating aspects of a musical arrangement and note transposition system according to an embodiment of the present disclosure.

FIG. 94 illustrates one embodiment of a system for creating customized musical arrangements, where a user utilizes a device 3102 to interface with an arrangement server 3104. A user interacts with the system through the user device 3102 to input the ensemble information at the user device 3102, select music and receive the resulting customized arrangements. The ensemble information and other information input by the user will then be transmitted to the arrangement server 3104. The user device 3102 may be any type of computing device, such as a desktop computer, laptop computer, tablet, smartphone or other electronic device. The user device 3102 may be running an application locally on the user device or providing an internet browser-based interface run by arrangement server 3104 and displayed at user device 3102 through an internet browser application. User device 3102 may also include a simple interface device, such as a touchscreen monitor, which is operatively coupled with arrangement server 3104 and displays a graphical user interface from the arrangement server 3104 for display on the interface device and for interaction with the user.

The arrangement server 3104 will be responsible for receiving the ensemble information input by the user at the user device 3102 and creating the appropriate arrangements. The arrangement server 3104 may include one or more computing devices, as described below, and will also be connected with one or more databases which store the arrangements, arrangement rules and received input information. In one embodiment, an arrangements database 3106 is connected with the arrangement server 3104 and stores information on all of the possible musical selections and arrangements for each musical selection. A rules database 3108 may store the rules described above for selecting a particular arrangement for a particular musical instrument, musical part in the arrangement and any other relevant criteria utilized for selecting the appropriate arrangement based on the input ensemble information. It is understood that the information stored in the arrangements database 3106 and the rules database may be stored in a single database and utilize multiple relational database tables. Additional databases and/or database tables may be utilized to store additional information understood by one of skill in the art, such as user account information, rights information, graphical user interface data, etc.

The arrangement server 3104 may then be configured to output the customized music arrangements to the user device 3102, where the user can view, print, download or otherwise receive the arrangements. In one embodiment, the arrangement server 3104 may be connected with a plurality of user devices such that each musician in the arrangement has a user device (such as a tablet or monitor) which will display their own customized arrangement. Thus, the arrangements could be created and displayed to the members of the arrangement on their user devices in real-time.

Computer-Implemented Embodiment

Figure 95:
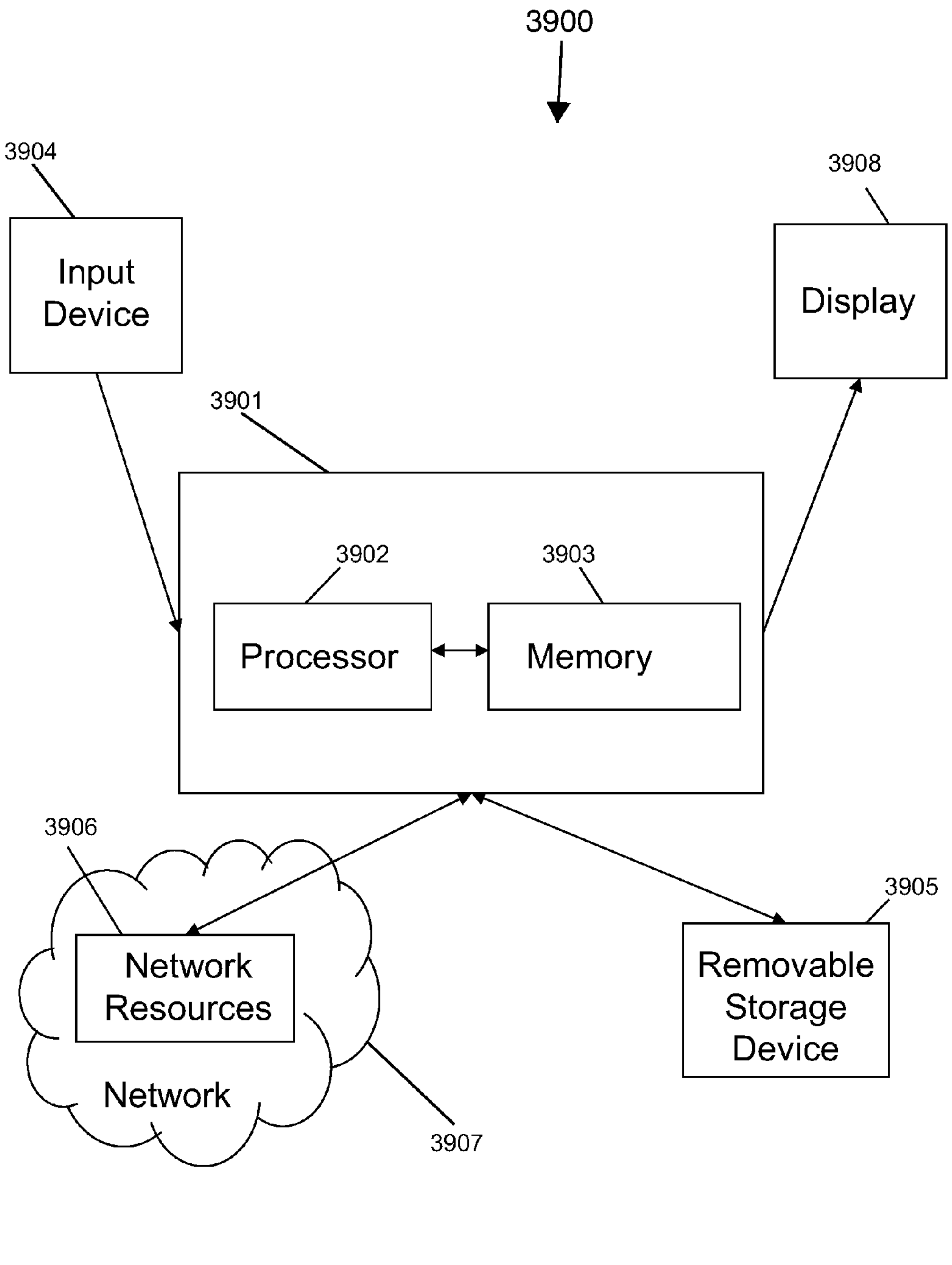
FIG. 95 is a block diagram that illustrates other aspects of a musical arrangement and note transposition system according to an embodiment of the present disclosure.

FIG. 95 is a block diagram that illustrates an embodiment of a computer/server system 3900 upon which an embodiment of the inventive methodology may be implemented. The system 3900 includes a computer/server platform 3901 including a processor 3902 and memory 3903 which operate to execute instructions, as known to one of skill in the art. The term "computer-readable storage medium" as used herein refers to any tangible medium, such as a disk or semiconductor memory, that participates in providing instructions to processor 3902 for execution. Additionally, the computer platform 3901 receives input from a plurality of input devices 3904, such as a keyboard, mouse, touch device or verbal command. The computer platform 3901 may additionally be connected to a removable storage device 3905, such as a portable hard drive, optical media (CD or DVD), disk media or any other tangible medium from which a computer can read executable code. The computer platform may further be connected to network resources 3906 which connect to the Internet or other components of a local public or private network. The network resources 3906 may provide instructions and data to the computer platform from a remote location on a network 3907. The connections to the network resources 3906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 3901. The computer interacts with a display 3908 to output data and other information to a user, as well as to request additional instructions and input from the user. The display 3908 may therefore further act as an input device 3904 for interacting with a user.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of generating a musical score for an ensemble of instruments, each instrument having an instrument characteristic and an instrument proficiency, comprising:

generating a first arrangement based upon the predetermined ensemble characteristic of the ensemble of instruments; and assigning an instrument of the ensemble to a part of the first arrangement in accordance with at least one of the instrument characteristic or the instrument proficiency.

2. The method in accordance with claim 1, wherein the predetermined ensemble characteristic includes an aggregate proficiency.

3. The method in accordance with claim 1, wherein the predetermined ensemble characteristic includes an ensemble size.

4. The method in accordance with claim 1, further comprising generating a second arrangement in response to a determination that the number of available parts in the first arrangement exceeds the number of instruments in the ensemble having an instrument proficiency exceeding a predetermined proficiency threshold.

5. The method in accordance with claim 1, further comprising characterizing the parts of the first arrangement as one of a melody part, a harmony part, a tethered harmony part, a non-tethered harmony part, a bass part, a solo part, an improvisation part, a pitched percussion part, or a non-pitched percussion part.

6. The method in accordance with claim 5, further comprising generating a second arrangement in response to a determination that the number of melody and tethered harmony parts in the first arrangement exceeds the number of instruments in the ensemble whose instrument proficiency exceeds a predetermined proficiency threshold.

7. The method in accordance with claim 5, further comprising characterizing the instruments of the ensemble as one of a non-bass instrument or a bass instrument.

8. The method in accordance with claim 7, further comprising assigning a guitar instrument of the ensemble to a bass part of the first or second arrangement in response to a determination that the number of bass parts in the first or second arrangement exceeds the number of bass instruments in the ensemble.

9. The method in accordance with claim 7, further comprising:

characterizing the instruments of the ensemble as a melody/harmony instrument or a harmony/bass instrument; and assigning one of a melody/harmony or a harmony/bass instrument of the ensemble to a bass part of the first or second arrangement in response to a determination that the number of bass parts in the first or second arrangement exceeds the number of bass instruments in the ensemble.

10. The method in accordance with claim 1, further comprising delivering the generated musical score to a user device in a format selected from the group consisting of Portable Document Format, Music XML format, and MIDI file format.

11. A system for generating a musical score for an ensemble of instruments, comprising:

a processor;

a memory in operable communication with the processor storing a set of executable instructions which, when executed by the processor, cause the processor to:

generate a first arrangement based upon the predetermined ensemble characteristic of the ensemble of instruments;

assign an instrument of the ensemble to a part of the alternative arrangement in accordance with the instrument proficiency of the instrument; and transmit the generated musical score to a user device.

12. The system in accordance with claim 11, wherein the memory further stores executable instructions which, when executed by the processor, cause the processor to generate a second arrangement in response to a determination that the number of available parts in the first arrangement exceeds the number of instruments in the ensemble having an instrument proficiency exceeding a predetermined proficiency threshold.

13. The system in accordance with claim 11, wherein the memory further stores executable instructions which, when executed by the processor, cause the processor to:

characterize the parts of the first arrangement as one of a melody part, a harmony part, a tethered harmony part, a bass part, or a solo part; and generate a second arrangement in response to a determination that the number of melody and tethered harmony parts in the first arrangement exceeds the number of instruments in the ensemble whose instrument proficiency exceeds a predetermined proficiency threshold.

14. The system in accordance with claim 11, wherein the memory further stores executable instructions which, when executed by the processor, cause the processor to assign a guitar instrument of the ensemble to a bass part of the first arrangement in response to a determination that the number of bass parts in the first arrangement exceeds the number of bass instruments in the ensemble.

15. The system in accordance with claim 11, wherein the memory further stores executable instructions which, when executed by the processor, cause the processor to:

characterize the instruments of the ensemble as one of a melody/harmony instrument, a harmony/bass instrument, a guitar instrument, or a bass instrument; and assign one of a melody/harmony or a harmony/bass instrument of the ensemble to a bass part of the first arrangement in response to a determination that the number of bass parts in the first arrangement exceeds the number of bass instruments in the ensemble.

16. A method for performing instrument range correction in a musical part, comprising:

defining a target note range based at least in part upon instrument, proficiency and part role;

identifying a passage within the musical part;

identifying one or more notes within the passage which fall outside a target note range;

transposing, by an octave, the identified notes into the target note range in response to a determination that the identified notes are of the same pitch; and transposing, in accordance with a transposition function, the identified notes toward the target note range in response to a determination that the identified notes are not of the same pitch.

17. The method in accordance with claim 16, wherein the transposition function comprises transposing, by an octave, the passage towards the target note range in response to a determination that all identified notes fall outside the target note range.

18. The method in accordance with claim 16, wherein the transposition function comprises identifying an issue within the passage characterized by one or more consecutive notes which fall outside the target range.

19. The method in accordance with claim 18, wherein the transposition function comprises:

identifying a sub-passage consisting of the issue and a note group immediately preceding the first note of the issue; and transposing, by an octave, the sub-passage toward the target note range in response to a determination that the interval between any two consecutive notes of the note group and the first note of the issue is no greater than a whole step.

20. The method in accordance with claim 18, wherein the transposition function comprises:

identifying a sub-passage consisting of the issue and a note group immediately following the last note of the issue; and transposing, by an octave, the sub-passage toward the target note range in response to a determination that the interval between any two consecutive notes of the note group and the last note of the issue is no greater than a whole step.

* * * * *